United States Patent
Gioscia et al.

(10) Patent No.: US 8,234,509 B2
(45) Date of Patent: Jul. 31, 2012

(54) PORTABLE POWER SUPPLY DEVICE FOR MOBILE COMPUTING DEVICES

(75) Inventors: Richard Gioscia, Santa Clara, CA (US); Manjirnath Chatterjee, San Francisco, CA (US); John Tang, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 393 days.

(21) Appl. No.: 12/621,087

(22) Filed: Nov. 18, 2009

(65) Prior Publication Data

US 2010/0146308 A1 Jun. 10, 2010

Related U.S. Application Data

(63) Continuation-in-part of application No. 12/478,766, filed on Jun. 4, 2009, which is a continuation-in-part of application No. 12/239,656, filed on Sep. 26, 2008.

(60) Provisional application No. 61/142,560, filed on Jan. 5, 2009, provisional application No. 61/142,194, filed on Dec. 31, 2008, provisional application No. 61/142,195, filed on Jan. 1, 2009, provisional application No. 61/142,602, filed on Jan. 5, 2009.

(51) Int. Cl.
*G06F 1/00* (2006.01)
*H02J 7/00* (2006.01)

(52) U.S. Cl. ........ 713/300; 320/107; 320/108; 320/114; 320/115

(58) Field of Classification Search ........................ None
See application file for complete search history.

(56) References Cited

U.S. PATENT DOCUMENTS

| | | | |
|---|---|---|---|
| 5,375,226 A | 12/1994 | Sano et al. |
| 5,455,466 A | 10/1995 | Parks et al. |
| 5,596,567 A | 1/1997 | deMuro et al. |
| 5,600,225 A | 2/1997 | Goto |
| 5,666,530 A | 9/1997 | Clark et al. |
| 5,733,313 A | 3/1998 | Barreras et al. |
| 5,760,580 A | 6/1998 | Tyren |
| 5,831,348 A | 11/1998 | Nishizawa |
| 5,958,051 A | 9/1999 | Renaud et al. |
| 6,006,274 A | 12/1999 | Hawkins et al. |
| 6,138,245 A | 10/2000 | Son et al. |
| 6,184,651 B1 | 2/2001 | Fernandez et al. |
| 6,266,539 B1 | 7/2001 | Pardo |
| 6,330,436 B1 | 12/2001 | Zidel |
| 6,389,423 B1 | 5/2002 | Sakakura |
| 6,405,049 B2 | 6/2002 | Herrod et al. |
| 6,436,299 B1 | 8/2002 | Baarman et al. |

(Continued)

FOREIGN PATENT DOCUMENTS

CN 1592197 A 3/2005

(Continued)

OTHER PUBLICATIONS

U.S. Appl. No. 11/430,786, filed May 8, 2006, Baraban et al.

(Continued)

*Primary Examiner* — Ji H Bae

(57) ABSTRACT

A portable power supply device for a mobile computing device is provided. The portable power supply device comprises a retention structure to retain the mobile computing device, a power source, and an inductive signal interface. The inductive signal interface is used to inductively signal power from the power source to a corresponding inductive signal interface of the mobile computing device.

30 Claims, 42 Drawing Sheets

U.S. PATENT DOCUMENTS

| | | |
|---|---|---|
| 6,445,936 B1 | 9/2002 | Cannon et al. |
| 6,501,364 B1 | 12/2002 | Hui et al. |
| 6,510,424 B1 | 1/2003 | Ford et al. |
| 6,532,152 B1 | 3/2003 | White et al. |
| 6,673,250 B2 | 1/2004 | Kuennen et al. |
| 6,731,071 B2 | 5/2004 | Baarman |
| 6,795,110 B1 | 9/2004 | Kossin |
| 6,803,744 B1 | 10/2004 | Sabo |
| 6,806,649 B2 | 10/2004 | Mollema et al. |
| 6,810,405 B1 | 10/2004 | LaRue et al. |
| 6,812,645 B2 | 11/2004 | Baarman |
| 6,825,620 B2 | 11/2004 | Kuennen et al. |
| 6,831,417 B2 | 12/2004 | Baarman |
| 6,888,438 B2 | 5/2005 | Hui et al. |
| 6,917,163 B2 | 7/2005 | Baarman |
| 6,975,198 B2 | 12/2005 | Baarman et al. |
| 6,986,051 B2 | 1/2006 | Le Pennec et al. |
| 7,065,658 B1 | 6/2006 | Baraban et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,132,918 B2 | 11/2006 | Baarman et al. |
| 7,149,473 B1 | 12/2006 | Lindlar et al. |
| 7,164,255 B2 | 1/2007 | Hui |
| 7,248,017 B2 | 7/2007 | Cheng et al. |
| 7,262,700 B2 | 8/2007 | Hsu |
| 7,271,569 B2 | 9/2007 | Oglesbee |
| 7,286,880 B2 | 10/2007 | Olson et al. |
| 7,331,793 B2 | 2/2008 | Hernandez et al. |
| 7,375,492 B2 | 5/2008 | Calhoon et al. |
| 7,382,636 B2 | 6/2008 | Baarman et al. |
| 7,385,357 B2 | 6/2008 | Kuennen et al. |
| 7,392,059 B2 | 6/2008 | White et al. |
| 7,414,380 B2 | 8/2008 | Tang et al. |
| 7,446,672 B2 | 11/2008 | Johnson et al. |
| 7,454,170 B2 | 11/2008 | Goossens et al. |
| 7,462,951 B1 | 12/2008 | Baarman |
| 7,471,986 B2 | 12/2008 | Hatlestad |
| 7,495,414 B2 | 2/2009 | Hui |
| 7,521,890 B2 | 4/2009 | Lee et al. |
| 7,576,514 B2 | 8/2009 | Hui |
| 7,743,151 B2 | 6/2010 | Vallapureddy et al. |
| 7,791,311 B2 * | 9/2010 | Sagoo ............................ 320/108 |
| 7,855,529 B2 * | 12/2010 | Liu ................................ 320/108 |
| D640,976 S | 7/2011 | Matsuoka |
| 8,026,693 B2 * | 9/2011 | Burley ............................ 320/108 |
| 2002/0084698 A1 | 7/2002 | Kelly et al. |
| 2002/0103008 A1 | 8/2002 | Rahn et al. |
| 2003/0214255 A1 | 11/2003 | Baarman et al. |
| 2003/0233455 A1 | 12/2003 | Leber et al. |
| 2004/0088012 A1 | 5/2004 | Kroll et al. |
| 2004/0130915 A1 | 7/2004 | Baarman |
| 2004/0130916 A1 | 7/2004 | Baarman |
| 2004/0150934 A1 | 8/2004 | Baarman |
| 2004/0222751 A1 | 11/2004 | Mollema et al. |
| 2004/0232845 A1 | 11/2004 | Baarman et al. |
| 2004/0259499 A1 | 12/2004 | Oba et al. |
| 2005/0007067 A1 | 1/2005 | Baarman et al. |
| 2005/0093475 A1 | 5/2005 | Kuennen et al. |
| 2005/0116650 A1 | 6/2005 | Baarman |
| 2005/0122058 A1 | 6/2005 | Baarman et al. |
| 2005/0122059 A1 | 6/2005 | Baarman et al. |
| 2005/0127849 A1 | 6/2005 | Baarman et al. |
| 2005/0127850 A1 | 6/2005 | Baarman et al. |
| 2006/0041420 A1 | 2/2006 | Martin et al. |
| 2006/0061958 A1 | 3/2006 | Solomon et al. |
| 2006/0123055 A1 | 6/2006 | Atkinson et al. |
| 2006/0132045 A1 | 6/2006 | Baarman |
| 2006/0145660 A1 * | 7/2006 | Black et al. .................... 320/108 |
| 2007/0024238 A1 * | 2/2007 | Nakade et al. ................. 320/108 |
| 2007/0035917 A1 | 2/2007 | Hotelling et al. |
| 2007/0064406 A1 | 3/2007 | Beart |
| 2007/0120752 A1 | 5/2007 | Takasu |
| 2007/0182367 A1 | 8/2007 | Partovi |
| 2007/0188284 A1 | 8/2007 | Dobbs |
| 2007/0246546 A1 | 10/2007 | Yoshida |
| 2007/0290654 A1 | 12/2007 | Govari et al. |
| 2008/0133918 A1 | 6/2008 | You et al. |
| 2008/0196086 A1 | 8/2008 | Shintani et al. |
| 2008/0231537 A1 | 9/2008 | Rofougaran et al. |
| 2008/0278894 A1 | 11/2008 | Chen et al. |
| 2009/0001932 A1 | 1/2009 | Kamijo et al. |
| 2009/0001941 A1 | 1/2009 | Hsu et al. |
| 2009/0008148 A1 | 1/2009 | Mashino |
| 2009/0069869 A1 | 3/2009 | Stouffer et al. |
| 2009/0088077 A1 | 4/2009 | Brown et al. |
| 2009/0096413 A1 * | 4/2009 | Partovi et al. .................. 320/108 |
| 2009/0106567 A1 | 4/2009 | Baarman |
| 2009/0170433 A1 | 7/2009 | Rhodes et al. |
| 2009/0212637 A1 | 8/2009 | Baarman et al. |
| 2009/0212737 A1 | 8/2009 | Johnson et al. |
| 2010/0007449 A1 | 1/2010 | Tait et al. |
| 2010/0021176 A1 | 1/2010 | Holcombe et al. |
| 2010/0045269 A1 | 2/2010 | LaFranchise et al. |
| 2010/0070219 A1 | 3/2010 | Azancot et al. |
| 2010/0076524 A1 | 3/2010 | Forsberg et al. |
| 2010/0081377 A1 | 4/2010 | Corbridge et al. |
| 2010/0081473 A1 | 4/2010 | Chatterjee et al. |
| 2010/0081483 A1 | 4/2010 | Chatterjee et al. |
| 2010/0083012 A1 | 4/2010 | Corbridge et al. |
| 2010/0121965 A1 | 5/2010 | Chatterjee |
| 2010/0131691 A1 | 5/2010 | Chatterjee et al. |
| 2010/0156193 A1 | 6/2010 | Rhodes et al. |
| 2010/0172090 A1 | 7/2010 | Chatterjee |
| 2010/0177476 A1 | 7/2010 | Hotelling et al. |
| 2010/0194336 A1 | 8/2010 | Azancot et al. |
| 2010/0283599 A1 * | 11/2010 | Ma et al. ..................... 340/539.1 |

FOREIGN PATENT DOCUMENTS

| | | |
|---|---|---|
| EP | 0396469 | 10/1990 |
| FR | 2601161 | 1/1988 |
| GB | 2389720 B | 9/2005 |
| GB | 2399466 B | 11/2005 |
| GB | 2389767 B | 4/2006 |
| JP | 09-259241 A | 10/1997 |
| JP | 11-354348 A | 12/1999 |
| JP | 3161388 B2 | 2/2001 |
| KR | 10-0836634 B1 | 6/2008 |
| WO | WO 95/03686 | 2/1995 |
| WO | WO 2004/098079 A1 | 11/2004 |
| WO | WO 2005/024865 A2 | 3/2005 |
| WO | WO 2008/033670 A2 | 3/2008 |
| WO | WO 2008/044875 A1 | 4/2008 |
| WO | WO 2008/133806 A1 | 11/2008 |
| WO | WO 2009/057771 A1 | 5/2009 |
| WO | WO 2010/005324 A1 | 1/2010 |
| WO | WO 2010/062198 A1 | 6/2010 |
| WO | WO 2010/068062 A2 | 6/2010 |
| WO | WO 2010/068062 A3 | 7/2010 |
| WO | WO 2010/091269 A1 | 8/2010 |

OTHER PUBLICATIONS

U.S. Appl. No. 12/628,401, filed Dec. 1, 2009, Chatterjee.
U.S. Appl. No. 12/840,241, filed Jul. 20, 2010, Chatterjee.
U.S. Appl. No. 12/841,001, filed Jul. 21, 2010, Chatterjee.
Final Office Action mailed Jan. 8, 2009 in U.S. Appl. No. 11/430,786.
Final Office Action mailed Oct. 25, 2004 in U.S. Appl. No. 09/861,658 10 pgs.
Final Office Action mailed Jul. 9, 2007 in U.S. Appl. No. 11/430,786.
Final Office Action mailed Jul. 19, 2010 in U.S. Appl. No. 11/430,786.
Final Office Action mailed Dec. 30, 2009 in U.S. Appl. No. 11/430,786.
Hui et al., "A New Generation of Universal Contactless Battery Charging Platform for Portable Consumer Electronic Equipment," IEEE Trans Power Electronics, 20(3):620-627 (2005).
International Search Report and Written Opinion dated Jul. 21, 2010 in International Application No. PCT/US2009/068328.
International Search Report and Written Opinion dated Jul. 28, 2010 in International Application No. PCT/US2009/068332.
International Search Report and Written Opinion dated Aug. 20, 2010 in International Application No. PCT/US2009/069847.
International Search Report and Writen Opinion dated Aug. 31, 2010 in International Application No. PCT/US2010/020054.

International Search Report and Written Opinion dated Apr. 20, 2010 in International Application No. PCT/US2009/055928.

Kean, Steven, "Powermat Portable Wireless Charging Mat", pp. 1-12 dwnloaded from http://www.bigbruin.com/content/powermat_1 on Sep. 29, 2010.

Liang et al., "An implantable bi-directional wireless transmission system for transcutaneous biological signal recording," Physiol. Meas. 26:83-97 (2005).

Mel, B. W. et al., "Tablet: Personal Computer in the Year 2000", Communications of the Association for Computing machinery, New Your, NY vol. 31, No. 6, Jun. 1, 1988, 639-646 XP000047633ISSN: 0001-0782.

Non-Final Office Action mailed Mar. 24, 2010 in U.S. Appl. No. 11/430,786.

Non-Final Office Action mailed Jul. 25, 2008 in U.S. Appl. No. 11/430,786.

Non-Final Office Action mailed Sep. 30, 2010 in U.S. Appl. No. 11/430,786 7 pgs.

Non-Final Office Action mailed Jan. 25, 2008 in U.S. Appl. No. 11/430,786.

Non-Final Office Action mailed Oct. 5, 2006 in U.S. Appl. No. 11/430,786.

Non-Final Office Action mailed Apr. 22, 2004 in U.S. Appl. No. 09/861,658 7 pgs.

Non-Final Office Action mailed Apr. 7, 2005 in U.S. Appl. No. 09/861,658 11 pgs.

Non-Final Office Action mailed Jun. 11, 2009 in U.S. Appl. No. 11/430,786.

Notice of Allowance mailed Jan. 9, 2006 in U.S. Appl. No. 09/861,658 12 pgs.

Opticon Users manual DWT 7133, Nov. 2000.

Non-Final Office Action mailed Nov. 3, 2010 in U.S. Appl. No. 12/478,616 12 pgs.

U.S. Appl. No. 12/916,388, filed Oct. 29, 2010, Chatterjee et al.

U.S. Appl. No. 12/975,335, filed Dec. 21, 2010, Oh et al.

U.S. Appl. No. 12/987,940, filed Jan. 10, 2011, Chatterjee et al.

* cited by examiner

PORTABLE POWER SUPPLY DEVICE FOR MOBILE COMPUTING DEVICES

RELATED APPLICATIONS

This application is a continuation-in-part of U.S. patent application Ser. No. 12/478,766, filed Jun. 4, 2009, entitled INDUCTIVE SIGNAL TRANSFER SYSTEM FOR COMPUTING DEVICES; which is a continuation-in-part of U.S. patent application Ser. No. 12/239,656, filed Sep. 26, 2008, entitled ORIENTATION AND PRESENCE DETECTION FOR USE IN CONFIGURING OPERATIONS OF COMPUTING DEVICES IN DOCKED ENVIRONMENTS, which claims benefit of priority to the following applications: Provisional U.S. Patent Application No. 61/142,560, filed Jan. 5, 2009, entitled ELECTRICAL APPARATUS FOR REAL TIME WIRELESS POWER DELIVERY; Provisional U.S. Patent Application No. 61/142,194, filed Dec. 31, 2008, entitled PROTOCOL FOR REAL TIME POWER AND ACCESSORY DATA CONNECTION; Provisional U.S. Patent Application No. 61/142,195, filed Jan. 1, 2009, entitled TECHNIQUES FOR MAGNETICALLY COUPLING CHARGING CIRCUITS AND DEVICES; Provisional U.S. Patent Application No. 61/142,602, filed Jan. 5, 2009, entitled MAGNETIC CLASP WITH MULTIPLE ORIENTATIONS AND ORIENTATION DETECTION; all of the aforementioned priority applications being hereby incorporated by reference in their entirety.

TECHNICAL FIELD

The disclosed embodiments relate to a portable power supply device for a mobile computing device.

BACKGROUND

The use of docking stations and other accessory devices in connection with mobile computing devices (e.g. smart phones, media players etc.) is well known. Traditionally, docking stations are used to (i) recharge or supply power to the mobile computing device, (ii) enable the computing device to communicate with other devices connected to the docking station (e.g. synchronization with a personal computer), or (iii) use additional resources provided with the docking station (e.g. speakers for audio output).

In a traditional scheme, docking stations and mobile computing devices connect using insertive male/female connectors. Numerous factors come into consideration when mobile devices are designed with connectors for use with docking stations. For example, such connectors typically take into account the ease by which users may establish the connection (e.g. can the user simply drop the device into the cradle), as well as the mechanical reliability of the connectors. When users repeatedly mate devices with docking stations, both the mating action and the removal of the device from the docking station can strain the connector structure and its elements.

Connectors also restrain the amount by which a device's form factor can be reduced in thickness and/or other dimensions. Connector schemes (particularly those that abide by an industry standard) have constraints that dictate the physical dimensions of the male and female ends of the connectors. As devices get smaller, accommodating the size constraints of the connectors has become more challenging.

DETAILED DESCRIPTION

Figure 1A:
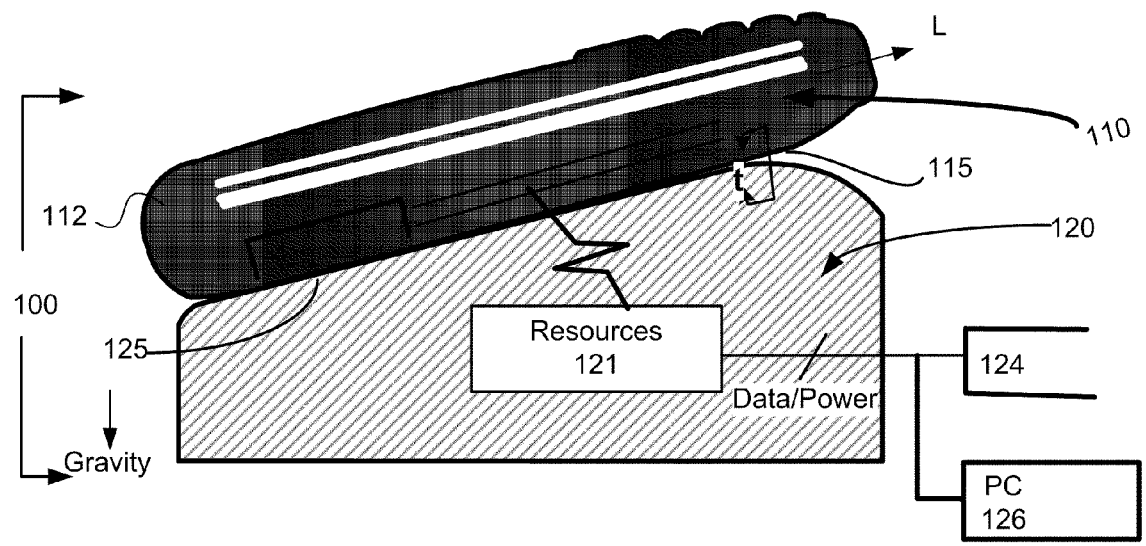
FIG. 1A is a representative diagram illustrating two computing devices that can be inductively linked to provide a power and/or data signal to the other device, according to an embodiment.

Embodiments described herein enable a device to be inductively linked with another device in order to exchange or leverage functionality amongst the two devices. Some embodiments provide for an inductive link to be established amongst two computing devices. The inductive link is used to signal power and/or data. As described by numerous embodiments, the inductive link may be used to configure functionality or operations on one or all of the inductively linked devices.

Embodiments described herein provide for a computing system or devices that comprise part of the computing system In an embodiment, a docking station is provided for a computing device. The docking station may be used by, for example, a mobile computing device, such as a cellular or wireless telephony/messaging device. The docking station includes a housing comprising a receiving surface top receive and retain the mobile computing device. An inductive signal transfer interface is included with the housing to inductively signal at least one of power or data to the mobile computing device. The docking station further provides an output component and processing resources. The processing resources are configured to detect placement of the mobile computing device on the receiving surface. The data is received from the mobile computing device, and an output is signaled to the output component based on the received data.

According to some embodiments, the docking station is an audio dock-so as to include speakers as output devices. Other examples of docking stations are recited herein.

Still further, embodiments described herein include a computer system that includes a first computing device and a second computing device that are inductively linked to one another. One of the two devices inductively signals an identifier to the other device. Upon receiving the identifier, the other device configures one or more operations. The operations are selected or otherwise configured based on the signaled identifier.

According to one embodiment, a mobile computing device ('MCD') and docking station ('dock') are individually equipped with features and components that enable charging/ power signals to be communicated from the dock to the MCD without use of connectors. As an addition or an alternative, the dock and/or MCD may exchange or transmit data signals to the other device when the MCD is retained against the dock (i.e. 'docked').

Some embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Some embodiments described herein may generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances or laptop computers. Thus, memory, processing and network resources may all be used in connection with the establishment, use or performance of any embodiment described herein (including with the performance of any method or with the implementation of any system).

Furthermore, some embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

FIG. 1A is a representative diagram illustrating two computing devices that can be brought into contact for purpose of enabling one device to provide a power and/or data signal to the other device, according to an embodiment. Numerous embodiments described herein, including an embodiment such as described with FIG. 1, reference a MCD and dock as two devices that are brought into contact with one another for purpose of power/data transfer without use of traditional insertive or mechanically coupled connectors. However, different kinds of devices (e.g. portable devices and accessory devices) may be used with embodiments described herein. In many of the examples provided herein, two devices that are inductively coupled correspond to a mobile computing device (also referred to as an MCD) and an accessory device (specifically a dock or docking station). However, embodiments may also be implemented using other types of devices. In one implementation, the MCD is a multi-purpose device having cellular data and telephonic capabilities, while the accessory device corresponds to, for example, a docking station (for communications and power supply), sticky (or piggy)-back accessory, a light projector, a speaker set, or headset station. As an addition or alternative to cellular telephony/data capabilities, the MCD may include, for example, functionality for use as a media player, a camera or video recorder, a global positioning unit, an ultramobile personal computer, a laptop computer, or a multi-purpose computing device. Numerous other examples and implementations are described herein, including embodiments in which three or more devices are interconnected through one or more connector-less connections.

Accordingly, a system 100 includes a MCD 110 that is supported or otherwise retained by a dock 120. The manner in which the MCD 110 is supported may vary. Moreover, as described with one or more embodiments, the orientation of the MCD on the dock may be changed by the user for purpose of configuring operations or behavior of one or both devices. According to an orientation of an embodiment shown, the MCD 110 is supported on the dock 120 in a partially upright position along its length axis (L). Such an orientation may correspond to a 'portrait' position. In an embodiment in which alternative orientations are possible, one or more 'landscape' positions, or positions in between the portrait and landscape positions may be possible.

According to an embodiment, the dock 120 utilizes physical support structures (not shown), such as shelves, platforms, hooks or mechanical retention features, to retain the MCD 110 in a docked or mated position. In another embodiment, magnetic clasps may be included or provided the dock 120 and/or the MCD 110 to secure retention of the MCD against the dock. Priority U.S. patent application Ser. No. 12/239,656, which is incorporated by reference herein in its entirety, details the use of magnetic clasps and ferrous (or other) material in order to physically retain the MCD 110 in a docked position with the dock 120.

The dock 120 may include resources 121 for generating or extending power and/or data signals to the MCD 110. For example, the dock 120 may be mated with a power outlet 124 or another computer 126 (e.g. desktop computer) to extend power and/or data signals. The resources 121 may include circuitry or hardware, such as AC/DC converters and regulators. In order to enable the dock 120 to receive electrical power from a personal computer or other computing station, one implementation provides for the dock 120 to include a physical connector port, such as provided by a Universal Serial Bus (USB) connector. Additionally, the dock 120 may include data acquisition capabilities, provided through connector ports with the computer 126, wireless ports (e.g. cellular, WiMax connection, Bluetooth), Internet ports, and media feeds (e.g. provided through television tuner and cable).

As shown by an embodiment of FIG. 1, the MCD 110 has a housing shell 112 having a thickness (t). The housing shell 112 may be used to retain internal components of the MCD 110, such as a circuit board, processor, memory, or components of a display assembly. The MCD 110 may be structured so that a primary facade 115 (e.g. the back panel) of the housing shell 112 rests on a receiving surface 125 of the dock 120.

Embodiments described herein provide a system and technique for delivering electrical power over short distances without the use of electrical conductors In one embodiment, the MCD 110 and dock 120 are inductively coupled. The MCD 110 may be placed physically on the dock 120 to inductively couple one or both of a power and data signal. In other embodiments, the MCD 110 and dock 120 may be placed near one another without physical contact.

As an alternative or addition, the MCD may be equipped with orientation sensors such as accelerometers in order for the device to detect its own orientation with reference to gravity. The MCD 110 may include functionality that enables or automatically performs based on its orientation on the dock 120 (e.g. landscape or portrait). In one embodiment, the device communicates its orientation to the dock (e.g. inductively or through wireless (RF) communication medium) so that the dock 120 can facilitate or perform functions that are consistent with the operations the MCD performs in a given orientation. In order to enable the accelerometer (or other sensor) of the MCD to detect its own position, the angle of support provided by the dock 120 may be such that the sensor is operable. For example, some embodiments described herein employ accelerometers, in which case the angle with the horizontal in which the MCD 110 is supported in place is at least 22.5 degrees.

Alternative Housing Implementation and Configuration

While many examples described elsewhere specifically recite implementations in which inductive charging occurs between two devices that are a mobile computing device and dock (or docking station), the recited embodiments may be equally applied between devices that are more generically recited as being either a power supply or power receiving device. Some embodiments recognize that inductive charging can be performed by or with other types of computing devices. For example, rather than use a docking station which supports the mobile computing device in some operable decision, the accessory device can have an alternative form factor that enables it to be carried on the device.

Figure 1B:
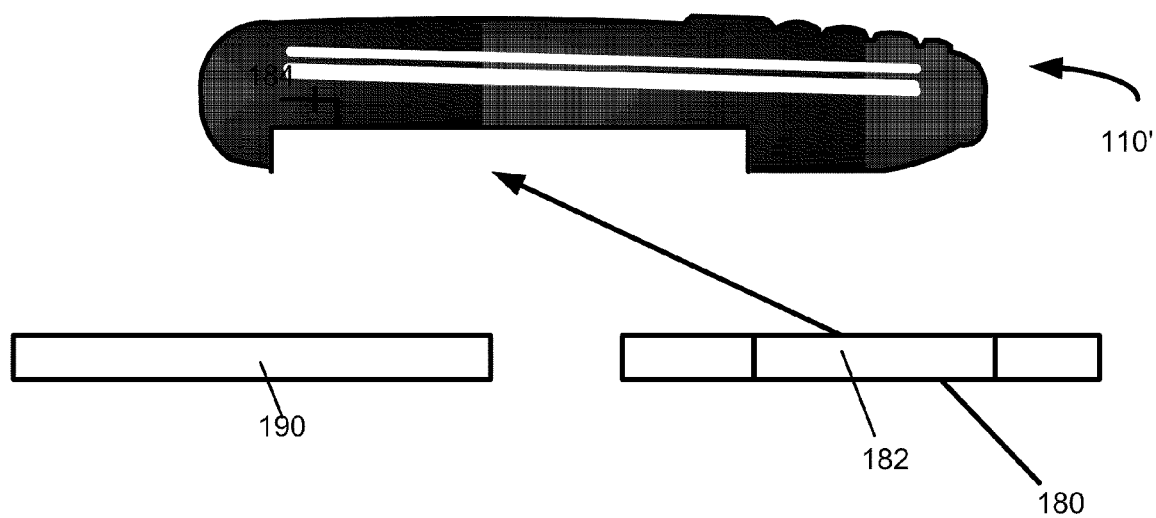
FIG. 1B illustrates a housing segment for a mobile computing device that is modularized to configure the computing device to establish an inductive link with another device, under an embodiment.

Likewise, the mobile computing device can carry inductive charging capabilities as an accessory feature. FIG. 1B, for example, illustrates a housing segment 180 that can be overlaid onto, or assembled in place of an existing housing segment 190 on the mobile computing device 110'. The housing segment 180 includes signal handler resources 182 (as described with embodiments of FIG. 7A and elsewhere in this application) for enabling inductive signal transfer with another device. The housing segment 180 may be purchased separately from the MCD 110, and assembled onto the MCD by the user to enable the MCD to have capabilities of inductive charging (power receive), inductive power signaling, and/or inductive data transfer. In one embodiment, the housing segment 180 is a battery cover for the MCD. A data and power buss 184 may interconnect the inductive signaling resources 182 of the housing segment with a battery and other electronic components of the computing device.

In an embodiment in which the MCD 110 is coupled to the dock using magnetic clasps, the exterior surface of the housing segment 180 may include some or all of the ferrous material (or magnets) that device 110' needs to magnetically couple with the dock or accessory. As an alternative, the ferrous material may be provided on other portions of the housing of the MCD, other than the segment 180. For purpose of applications described herein, reference to a mobile computing device with inductive signal receiving/transmitting capabilities may include a device that has its housing accessorized or replaced in part post-manufacturing or sale.

Inductive Signal Path

Figure 2A:
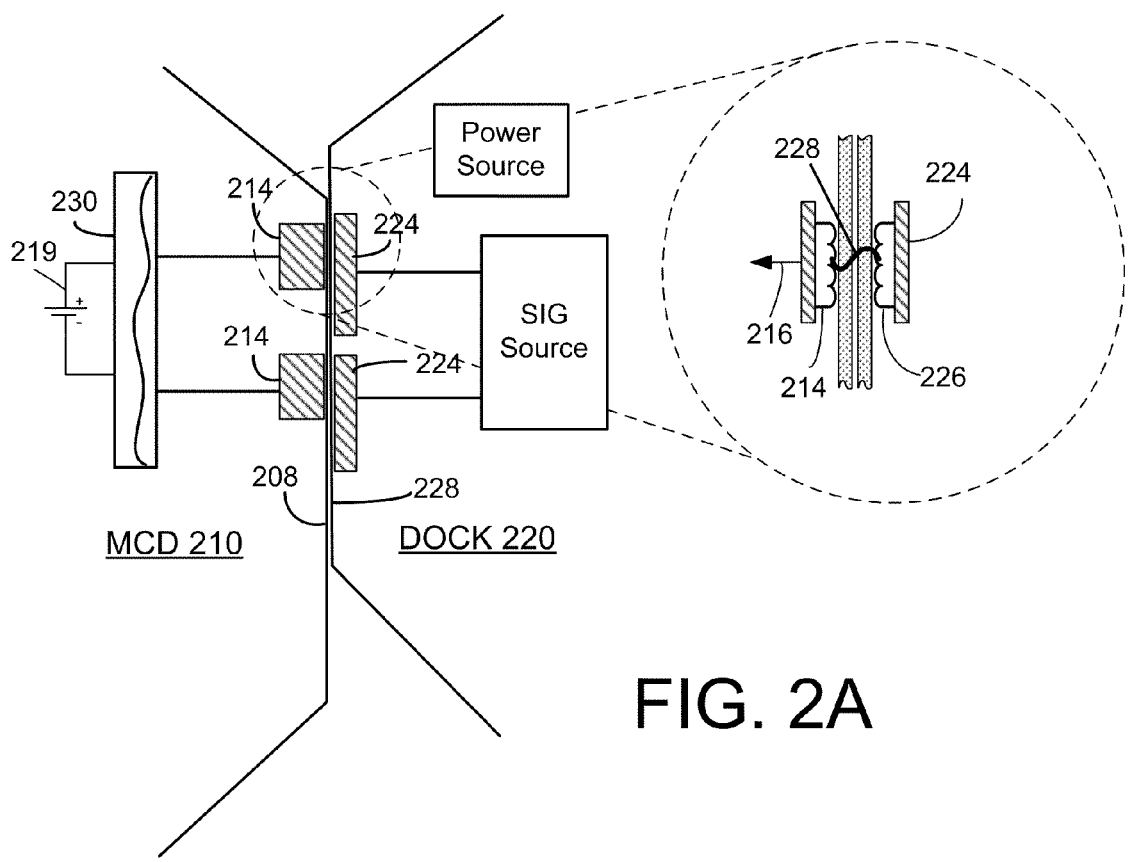
FIG. 2A is a simplified block diagram of two devices that are inductively linked, in accordance with one or more embodiments.

FIG. 2A is a simplified block diagram of a MCD 210 and dock 220, where one or both devices are configured to communicate signals on a signal path that has an inductive signal path portion, so as to form a partially inductive signal path. According to an embodiment, the MCD 210 may be placed in contact with the dock 220, such as in a manner described with other embodiments (such as described with FIG. 1). The result is that a device exterior 208 (e.g. rear facade) comes into contact with a receiving surface 228 of the dock. Alternatively, the two devices may be brought into close proximity, but not necessarily in contact, in order for inductive signal communication to take place. While exterior surfaces 208, 228 of MCD 210 and dock 220 respectively may be in contact as a result of the retention of the MCD by the dock, the contact is not made to conductively transfer signals between the devices. Rather, a signal source 224 on the dock 220 (e.g. such as a power inlet) may generate a signal 228 (e.g. power) that is transformed through a magnetic coil 226 or other inductive mechanism into a magnetic field. A corresponding coil 214 or inductive receiving component may be provided on the MCD 210 to transform the signal 228 into an electrical signal 216. The electrical signal 216 may be treated by various circuit elements and components in order to power components of the MCD 210, and/or to charge a battery module 219 of the device 210.

Figure 2B:
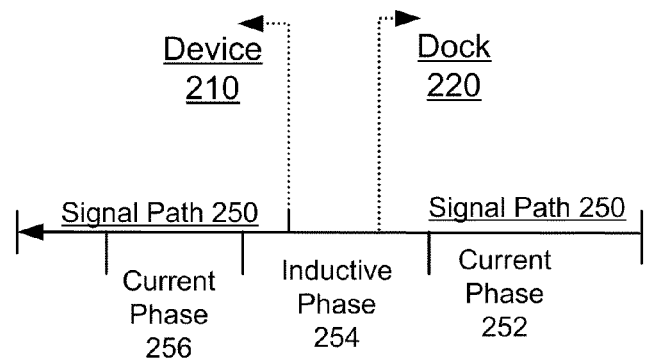
FIG. 2B illustrates an inductive signal path, as extended from or between two devices that are inductively linked, according to one or more embodiments.

FIG. 2B illustrates an inductive signal path 250, as extended from or between the dock 220 to the MCD 210, using a combination of magnetic/inductive and conductive elements provided on both devices. On the dock, the signal path 250 includes a current phase 252 and an inductive (or magnetic field) phase 254. The inductive phase 254 carries the signal across boundaries of respective housings using magnetic field. Thus, on the device 210, the signal path 250 includes an inductive phase 254, followed by a current phase 256. The reverse path may also be possible, such as in the case when the MCD supplies power and/or data to the docking station or another accessory device.

Inductive Coil Arrangements

The inductive conveyance of power and/or data signals may be achieved through use of coils, provided on each device that is to be coupled to transmit or receive such signals. Various coil configurations are possible to enable conveyance of power and/or data, either uni-directionally or bi-directionally.

Figure 3A:
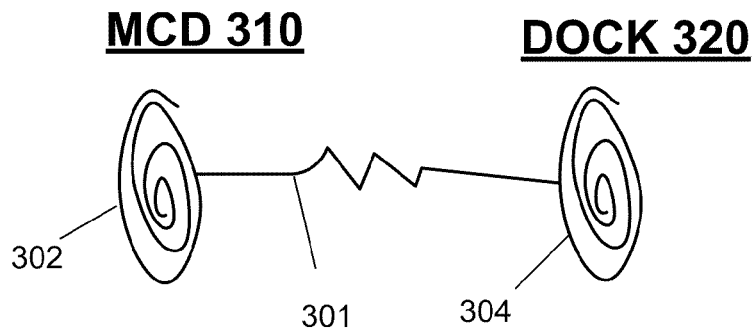
FIG. 3A through FIG. 3C illustrate different coil distribution implementations for inductive signal conveyance, under different embodiments or variations.
Figure 3B:
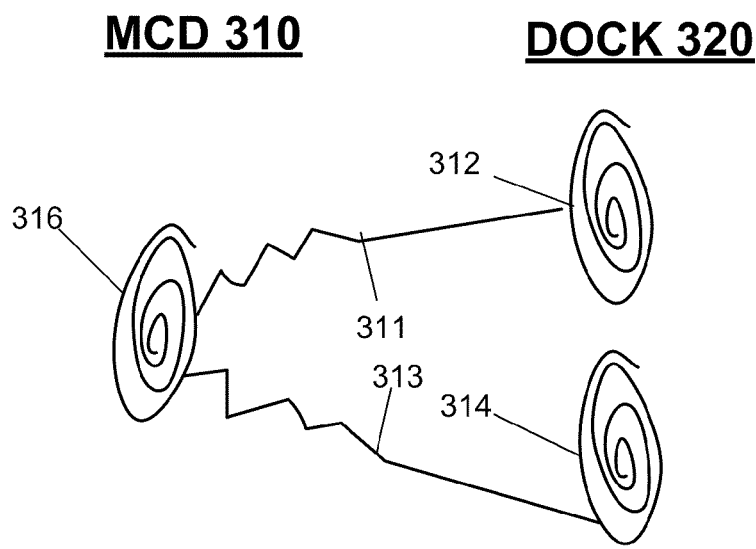
Figure 3C:
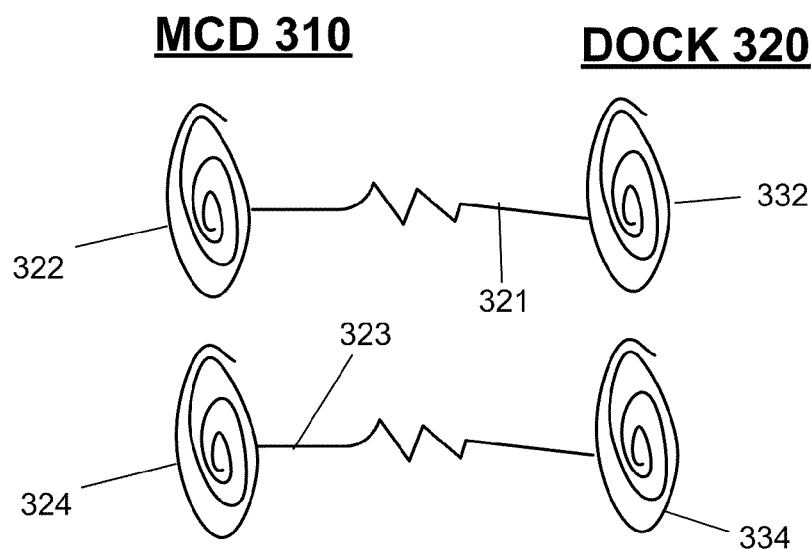

FIG. 3A through FIG. 3C illustrate different coil distribution implementations for inductive signal conveyance, under different embodiments or variations. In particular, FIG. 3A illustrates a system or sub-system that includes two coils, one on each device. The two coils 302, 304 may be used to convey power and/or data in one signal 301 that is exchanged between the two devices. Moreover, the conveyance of either power or data may be bi-directional.

FIG. 3B illustrates a three-coil implementation, where one of the two devices (e.g. the dock 220) includes two coils 312, 314, and the other device (e.g. MCD 210) includes just one coil 316. Such an embodiment may provide the advantage of lessening the weight or size required from the MCD, while enabling separate data and power exchange. In one embodiment, the coil 316 of the MCD 210 receives power 311 from one coil 312 on the dock, and data 313 from the other coil 314. Optionally, either the power 311 or the data 313 signals may be bi-directional, meaning the coil 316 on the MCD 210 may communicate the signals back to the dock 220. In one implementation, the coil on the MCD 210 signals data to the independent data coil on the dock 220.

FIG. 3C illustrates another implementation in which each of the dock 320 and MCD 310 include two coils. In particular, power and data coils 322, 324 on the dock 320 may communicate power 321 and data 323 signals to respective coils 332, 334 on the MCD 310. In an embodiment, the power and data communications are bi-directional.

Computer System Using Inductive Signal Path

Figure 4:
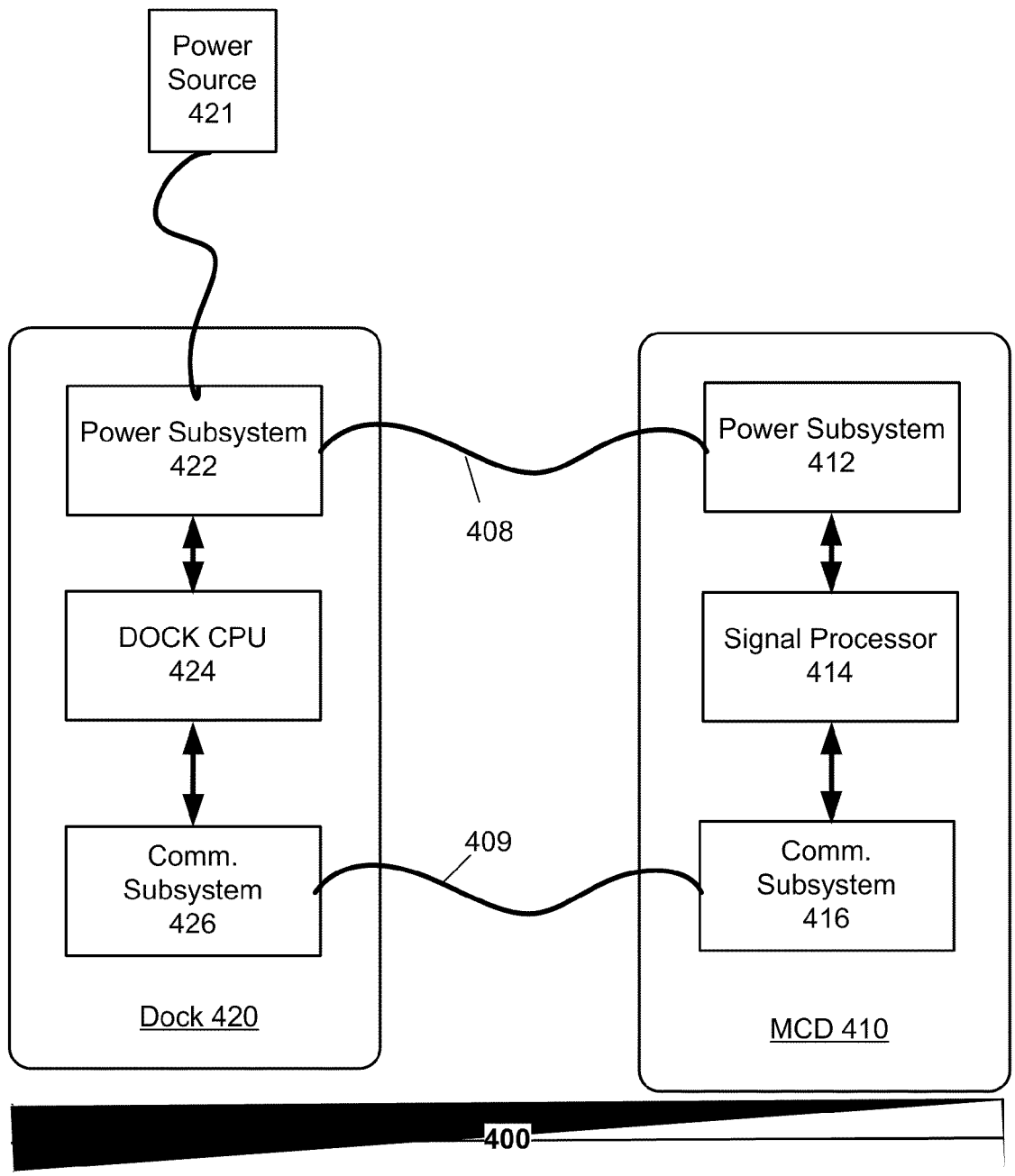
FIG. 4 illustrates a simplified block diagram of a computing system that provides for inductive conveyance of power and/or data signals, under an embodiment.

FIG. 4 illustrates a simplified block diagram of a computing system that provides for inductive conveyance of power and/or data signals, under an embodiment. The computing system 400 includes MCD 410 and dock 420 that are structured to enable inductive signal transfer exchange, in accordance with numerous embodiments described herein. In an embodiment, the dock 420 includes a central processor 424, a power subsystem 422 and a communication subsystem 426. The MCD 410 includes a power subsystem 412, a signal processor 414, and a communication subsystem 416. Additionally, the MCD 410 (and optionally the dock 420) includes numerous other components, such as a central processor and memory resources for enabling application executions, cellular and data communications, and numerous other functions that are part of the usage of the MCD 410.

On the dock 420, the power subsystem 422 includes a connection to a continuous power supply 421, such as a wall outlet. Additionally, the power subsystem 422 includes components for converting and regulating the signals from the power supply into a form that is suitable for conveyance using, for example, an inductive medium. Additionally, the power subsystem 422 includes one or more coils for converting an electrical signal originating from the power supply 421 into an inductive signal. The communication subsystem 426 may include wireless or wireline port(s) to receive and send data to other devices, including with other computers or data sources (e.g. media feeds from other devices, such as set-top boxes) or media output devices. In an embodiment, the communication subsystem 426 also enables inductive data handling from data communicated by one of the inductive signal paths that extend between the two devices. As mentioned, such data may be conveyed by either modulating an inductive power signal or using a separate data signal path.

The central processor 424 of the dock 420 may be configured to handle incoming data signals from the communication subsystem 426, whether from the other resource or from the MCD 410. Additionally, the central processor 424 may control data that is communicated out, either to the other resource or to the MCD 410 (using the inductive signal path).

On the MCD 410, an embodiment provides that the power subsystem 412 receives an incoming power signal 408 from the dock 420 and distributes the power signal in modified or regulated form to either other components or to the battery for recharge. The power signal 408 is signaled through an inductive path from the dock 420 to the MCD 410, in a unidirectional fashion. The communication subsystem 416 is configured to communicate with the dock 420 to receive and/or transmit data signal 409. One embodiment provides that the communication subsystem 416 may include resources to demodulate data carried on the power signal. In particular, the communication subsystem 416 may use its resources to implement one or more protocols, such as (i) a protocol for regulating the inductive delivery of power with exchange of data that communicates current/voltage information (e.g. use levels) on the receiving device, (ii) a credential protocol for retrieving and using credential information (e.g. preliminary data for establishing subsequent wireless communications) from characteristics of modulations in the power signal 408. One or both protocols may further provide for the communication subsystem 416 to switch to, for example, a standardized wireless communication medium (e.g. BLUETOOTH) using the credential information and/or other data communicated by the power signal 408. Still further, another embodiment may provide for the communication subsystem 416 to be enabled to generate modulated power or other signals to communicate to the dock 420 or other device. For example, as shown by FIG. 3B, two coils may be used on the dock, including one coil that communicates both power and data and another that receives data from the MCD 410. The communication subsystem 416 may perform functions of both retrieving data from the modulated data signal and communicating data out to the data receiving coil on the MCD 410.

As described with some other embodiments, data signal 409 is also combined with the power signal 408 by modulating the power signal. In one implementation, the dock 420 signals data 409 with the power signal 408 as a preliminary step to establishing a different wireless communication relationship. In another embodiment, the data signal 409 may be communicated to or from the MCD separate from the power signal.

Device Block Diagrams

Figure 5:
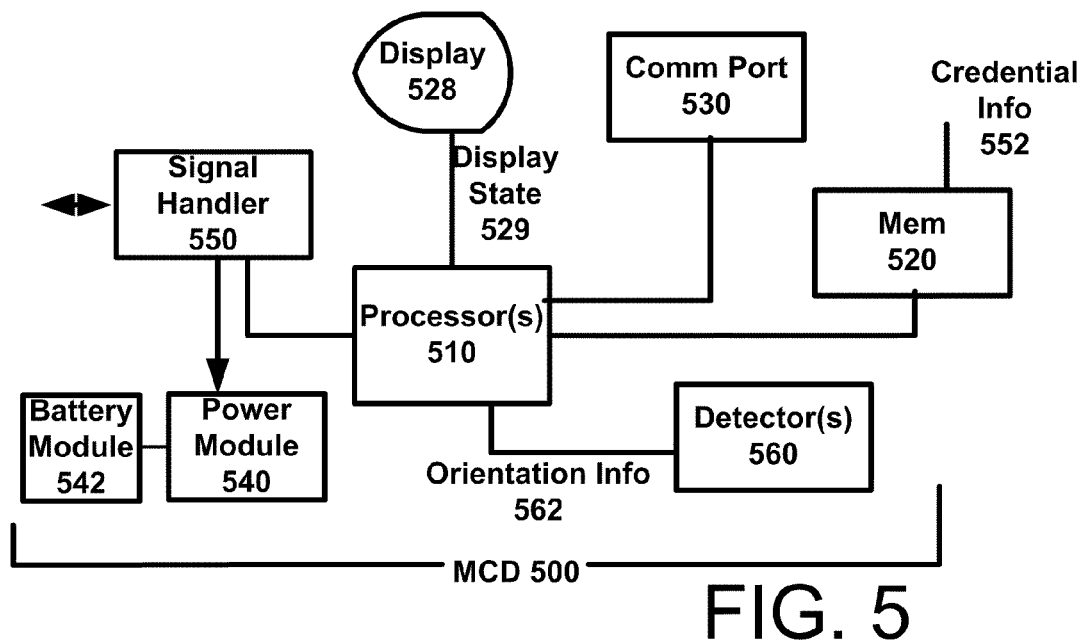
FIG. 5 is a simplified block diagram of a computing device configured in accordance with an embodiment.

FIG. 5 is a simplified block diagram of a MCD, according to an embodiment. A MCD 500 may be configured to include any of the functionalities or capabilities described with other embodiments, including the ability to receive electrical signals (power and/or data) using conductive or inductive signal paths. Thus, as mentioned with other embodiments, the MCD 500 may correspond to, for example, a 'smart phone', a mobile companion, a media player, a digital camera, or a GPS unit (or to a multi-function device that can perform as many of the devices described).

More specifically, one or more embodiments provide that the MCD 500 may correspond to a mobile telephony/data messaging computing device, such as a cellular phone or mobile device with voice-telephony capabilities (sometimes called "smart phone"). A computing device such as described may be small enough to fit in one hand, while providing cellular telephony features in combination with other applications, such as messaging, web browsing, media playback, personal information management (e.g. such as contact records management, calendar applications, tasks lists), image or video/media capture and other functionality. Other examples of functionality that may be provided from the MCD 500 include audio and/or video playback or Global Positioning Services (GPS) as primary or enabled functions. The MCD 500 may have numerous types of input mechanisms and user-interface features, such as keyboards or keypads, multi-directional or navigation buttons, application or action buttons, and contact or touch-sensitive display screens or buttons. In the case of data messaging/communication devices, specific types of messaging or communications that may be performed includes messaging for email applications, Short Message Service (SMS), Multimedia Message Service (MMS), and proprietary voice exchange applications (such as SKYPE). Still further, the MCD 500 may correspond to numerous other types of computing devices, such as to a notebook computer, an ultra-mobile computer, or a personal digital assistant.

According to an embodiment, the MCD 500 includes one or more processors 510, memory resources 520, a display assembly 528, one or more communication ports 530, and a power module 540. In an embodiment, the MCD 500 includes a signal handler resource 550 (or module), which includes hardware and logic for accepting and/or transmitting power or data signals using an inductive communication medium. As another option, the MCD 500 includes one or more detectors 560 (or sensors) for detecting orientation or position of the MCD 500 when the device is docked to the accessory device.

The processor 510 may include or communicate with the signal handling resource 550 to enable some or all of the signal handling capabilities for enabling inductive receipt or transmission of signals. The communication ports 530 may include wireless or wireline ports. Wireless communication ports may be implemented through, for example, local wireless communication protocols such as provided by BLUETOOTH standards, Wireless Fidelity (802.11(b) or (g)). The wireless communication ports may also communicate over a cellular network. More specifically, the MCD 500 may include one or more wireless communication ports to provide wireless connectivity of a particular type (or types) for purpose of carrying out any one or more types of wireless operations. For example, the communication port 530 may include or correspond to (i) a Wide Area Network (WAN) radio module for sending and receiving cellular voice/data, (ii) a local wireless communication port such as Bluetooth or wireless USB, (iii) an infrared port, (iv) a Global Positioning System radio, and/or (v) a WiMAX radio.

The memory resources 520 may, for example, include Flash memory, Random Access Memory, and/or persistent memory (i.e. ROM). The memory resources 520 include instructions and data for implementing functionality and programmatic actions such as provided with any of the embodiments described. Optionally, the memory resources 520 may carry databases or data stores of records that contain active data items (such as described above) for synchronization or communication with a primary computer, and/or enable actions on such data items of saving the data items.

According to an embodiment, the signal handler resource 550 includes hardware for receiving or transmitting a power signal and/or a data signal (either modulated or combined as one signal) to and/or from the dock. Additional details of components and elements for signal handler resource 550 to enable an inductive signal path is detailed with various embodiments described above. In one embodiment, the signal handler resource 550 is configured to receive a power signal for purpose of either powering other components (e.g. display assembly 528) of the MCD 500, or to recharge the battery of the power module 540. In one implementation, the incoming power signal may be treated using circuits and components that are separate from a central processor of the MCD 500. Thus, processor 510 may include more than one unit or resource. In one implementation, for example, the MCD 500 includes both a signal processor (which may be incorporated with the signal handler 550) and a central processing unit (CPU).

As described elsewhere, an embodiment provides that the MCD is configured to use the signal handler resource 550 to convey and/or receive some data that enables subsequent communications between the devices. This data may include credential data 552, which enable subsequent wireless communications using, for example, a local wireless communication link via one of the local wireless communication ports 530. The credential data 552 may be stored within a portion of the memory resources and made available to the processing resources for inclusion or use with functions performed by the signal handling resource 550. In one embodiment, the signal handler resource 550 is capable of inductively communicating at least some of the credential data through a modulated power signal. As an addition or variation, the signal handling resource 550 is capable of recognizing or using the credential data 552, inductively communicated from the dock, to identify and pair with the dock.

In one embodiment, the detectors 560 are provided in the form of sensors that independently detect the orientation of the MCD 500. For example, the detectors 560 may correspond to accelerometers or vertical position sensors that detect the orientation of the MCD 500 at any given instance. In another embodiment, the detectors 560 sense or communicate data or signals to electrical or conductive (or inductive) pads that are positioned on an exposed surface of the dock. Thus, the position of the MCD may be detected by determining which detectors 560 and/or sensors or conductive pads are in contact when the two devices are docked.

Information identifying the orientation of the MCD 500 when docked may affect various operations or modes/states of the MCD and/or its components. The detectors 560 may signal or communicate the orientation information 562 to the processor 510 of the MCD. In one implementation, for example, the processor 510 is configured to use the orientation information 562 to signal a display state 529 to the display assembly 528. The display assembly 528 may, for example, be switched between portrait and landscape mode in response to the signal.

Figure 6:
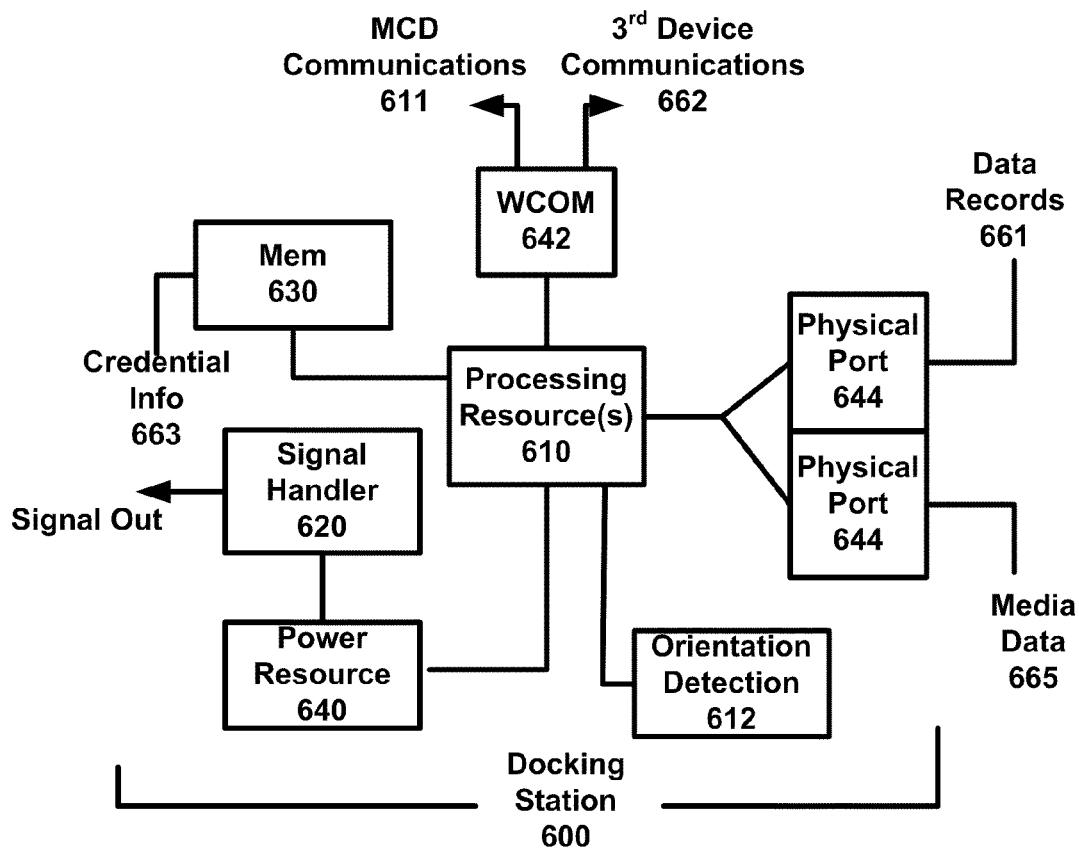
FIG. 6 is a simplified block diagram of a docking station, configured in accordance with an embodiment.

FIG. 6 is a simplified block diagram of a dock, under an embodiment. The dock 600 may correspond to any of the docks described with other embodiments herein. In particular, a dock as described may be used to implement (depending on the embodiment) an inductive signal path for communicating power and data with a MCD such as described with FIG. 6. In an embodiment, the dock 600 includes processing resources 610, a signal handler 620, memory resources 630, and a power resource 640. The dock 600 may also include one or more communication ports, including a wireless communication port 642 and/or one or more wireline communication ports 644.

The processing resources 610 enables intelligent operations, such as authenticating or pairing with the MCD 500 (see FIG. 5) (e.g. over a wireless link) and/or data sharing/synchronization operations (with MCD 500). In one variation, the dock 600 is also capable of interfacing with a computing resource (e.g. other device or computer) to enable synchronization or data sharing operations between the MCD 500 and third device, or between the dock and the third device. In an embodiment, the processing resources 610 correspond to or include a signal processor which is able to receive or transmit data through modulations in the power signal.

The signal handler 620 includes circuits and elements for enabling an inductive coupling with corresponding elements residing within a panel or housing of the MCD. The signal handler 620 may include one or more coils for transmitting and/or receiving power or data. As described, the power signal communicated through the magnetic coil may optionally be modulated in a manner that carries or communicates data. Thus, the signal handler 620 may communicate or receive data using a power signal carried over an inductive signal path.

The power resource 640 handles power received through a standard outlet. As an alternative or addition, the power resource 640 may draw power from another computing device. Still further, the power resource 640 may include batteries that provide power for the dock and other devices.

The wireless communication ports 642 may be provided in the form of a standardized port, such as defined by the BLUE- TOOTH or WIRELESS USB standards. The physical ports may also be standardized, such as provided by USB or FIREWIRE standards.

Optionally, the dock 600 includes an orientation detection mechanism 612 that may detect the orientation of the MCD in the docked position. As an addition or alternative, the orientation detection mechanism 612 detects whether the MCD is present (i.e. docked). As described with other embodiments, the orientation detection mechanism 612 may use information that is indicative of the orientation of the MCD in the docked position to perform or configure a state or mode or operation. Alternatively, the dock 600 may communicate the orientation information to the MCD.

Among possible functions that the dock may perform, the dock may send or receive wireless communications 611 with the MCD. Such communications may accomplish various tasks or operations, including (i) synchronization or communication of data files or records 661 (e.g. synchronize contacts and emails), (ii) establish a paired relationship with the MCD for subsequent operations using credential information 663 and device communications 662, (iii) establish a paired relationship between the MCD and a third computing device connected to the dock (e.g. enable BLUETOOTH or wireline communication with attached personal computer), (iv) serve as a pass-through or data interface with another device (e.g. television of display screen) by forwarding communications 662 to a third computer (e.g. personal computer or laptop), and/or (iv) exchange of data to share or provide resources or extend functionality of the MCD (e.g. enable playback of media data 665 residing on the device by routing audio to speakers connected to dock).

One primary purpose that the dock 600 may serve is to recharge or power the MCD using power communicated through the signal handler 620. Still further, an embodiment provides that the dock 600 detects an orientation of the MCD and then communicates the orientation information to the MCD.

While an embodiment of FIG. 6 is descriptive of an accessory device that corresponds to a dock, it should be apparent that other forms of accessory devices may include similar components or functions. For example, an accessory device may be provided in the form of a "sticky-back" device. Such a device may use, for example, the signal handler 620 to conductively or inductively receive power or data. Such a device may also perform wireless communications with the MCD to synchronize records, perform media playback and/or otherwise share other forms of data (e.g. provide GPS data, receive images etc.)

Thus, with the examples recited, an embodiment provide that the MCD 500 (see FIG. 6) may be configured to (i) receive power from an accessory device, such as a dock 600, and/or (ii) perform wireless communications with the accessory device (i.e. dock 600 or other device) using a local wireless communication port. As an addition, the MCD may use the power signal or the connector-less medium to exchange and perform programmatically at least some of the steps to authenticate or authorize the wireless pairing and communication. In some cases when, for example, the accessory device requires power, the MCD may supply the power using an inductive signal transfer.

Signal Handler on MCD

Figure 7A:
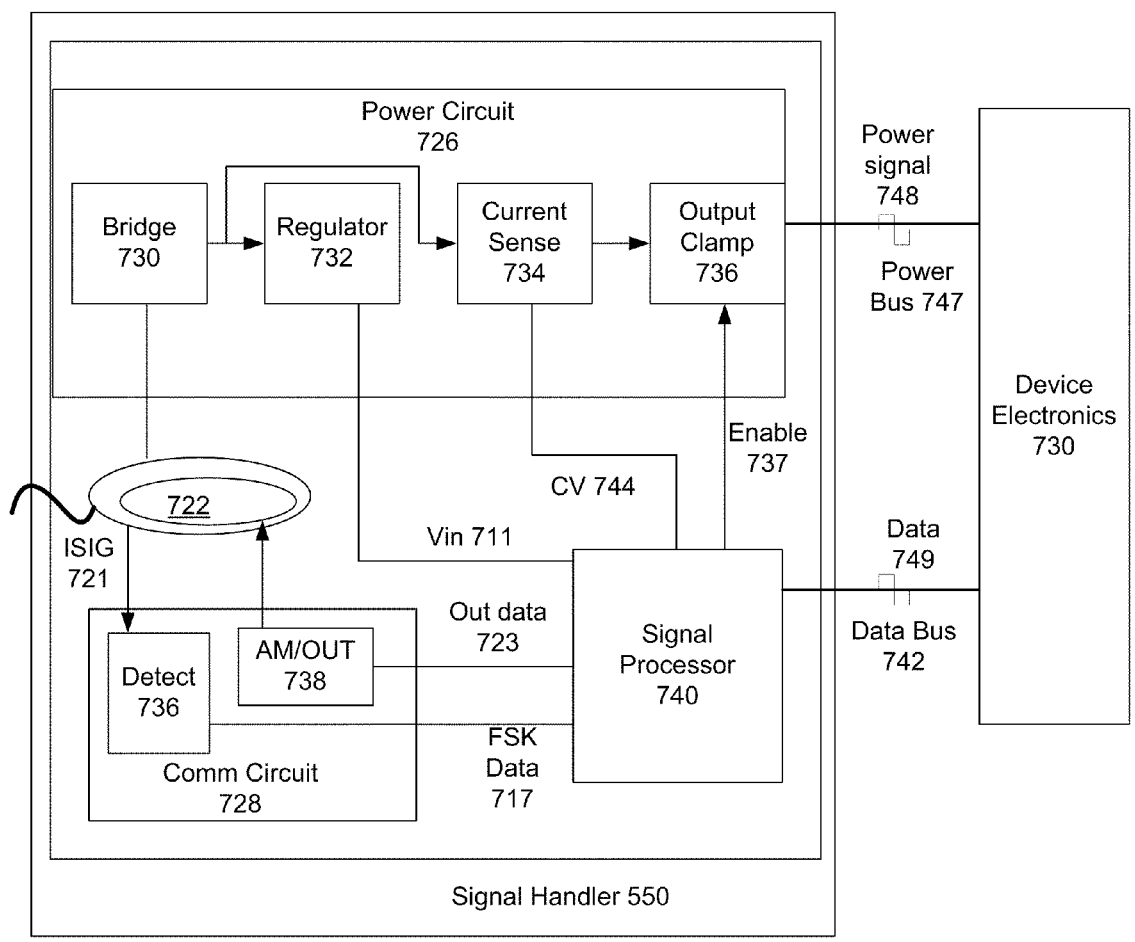
FIG. 7A is a simplified block diagram of a mobile computing device having components for implementing an inductive signal transfer system in combination with another device, according to an embodiment.

FIG. 7A is a simplified block diagram of a mobile computing device (such as described with FIG. 5) having components for implementing an inductive signal transfer system in combination with another device (e.g. a dock such as described with FIG. 6), according to an embodiment. In FIG. 7A, signal handing resource 550 is shown to comprise various components to inductively receive and/or communicate power/data with another device. More specifically, the signal handling resource 550 includes one or more coils 722 that form a terminal of a corresponding inductive signal path. Additionally, the signal handling resource 550 includes communication circuits 728, power circuits 726 and a signal processor 740 (CPU or processing resources) for handling incoming and outgoing signals using the inductive signal path. The processor 740 is programmed to implement a protocol for controlled use of power and exchange of data across the inductive link. More specifically, signal processor 740 (i) implements a protocol by which data may be communicated and/or interpreted through the inductive signal path, enabled in part through the coil 722; and (ii) controls receiving/communicating power. To this end, it may enable power circuits 726 which treat the incoming signal path. The signal processor 740 is powered by voltage 711 received from the coil 722 via a regulator 732. In one implementation, the regulator supplies 732 supplies 3 volts to the processor 740. The signal processor 740 also monitors current (current value 744) to detect current levels of the power signal received over the coil 722. The power circuits 726 supply power signal 748 across a power bus 747 to device electronics 770. In this way, the power signal 748 powers the components of the MCD 500 (FIG. 5) independently. The power signal 748 may also recharge the battery of the device.

According to some embodiments, signal processor 740 signals data 749 across data bus 742 to exchange data with another processing resource (e.g. CPU) of the device. This data may correspond to, for example, credential information, or the information regarding data received from the dock (e.g. confirmation of credential information exchange).

Additionally, the MCD 500 (FIG. 5) may be configured to combine detectors (such as sensors) for detecting external objects (i.e. the dock) as a mechanism to detect information about the dock.

According to one or more embodiments, the power circuits 726 include a synchronous bridge 730, the regulator 732, current sense 734, and output clamp 736. The coil 722 receives an incoming inductive signal 721 from the dock 600 (see FIG. 6) or other accessory device. The synchronous bridge 730 outputs unregulated DC signal to both regulator 732 and current sense 734. As mentioned, one implementation provides that the regulator 732 is a 3-volt regulator, so as to supply a 3-volt power signal to the signal processor 740. The current sense 734 signals current values 744 to the processor 740, which switches on or off the output clamp 736. More specifically, in instances when the supplied inductive signal 721 exceeds desired power levels, the output clamp operates 736 (with enable signal 737 from the processor 740) to turn on and clamp off the over-voltage. The output clamp 736 may act as a voltage regulator or "buck" converter. In this way, the output clamp 736 ensures an output (to power the device 500 or recharge its batteries) is regulated. Thus, in instances when the incoming inductive signal 721 is too high, the signal handler can regulate the voltage to the device electronics.

As mentioned, the incoming signal 721 may be modulated to carry data with delivery of power. The communication circuit 728 (portions of which may be distributed or integrated with the processor or elsewhere) may include a Frequency Shift Key (FSK) detector 716 to detect the signal modulation of the incoming signal 721 over a given duration. FSK modulation is just one type of modulation that can be implemented for the device. For example, the detector may be used to handle AM signal modulation, phase modulation, QAM, CDMA, pole position or various other forms of signal modulation. Such FSK modulation may be consistent with one or more protocols recited herein. Incoming data 717, as detected from the detector is communicated to the processor 740. Incoming data 717 may include protocol data (data to initiate a sequence of protocol events to control power supplied from dock 600 to the MCD 500), or credential or usage data. The processor 740 may communicate some data from the incoming signal 721 over the data bus 742 to the device (e.g. the device's CPU). Other data may be handled to determine protocol responses, or provide/use feedback to tune the characteristics of the power signal 721. The processor 740 may signal data out across the inductive channel using AM modulation (or alternatively FM modulation). In one embodiment, the same coil 722 is used to transmit data out and receive data in on the MCD 500. More specifically, the data out may correspond to protocol data which (i) responds to protocol events, such as signals communicated from the dock 600; (ii) provide feedback, including power supply information (e.g. how much power is needed) or other data to enable the controlled regulation of the incoming power signal 721.

Figure 7B:
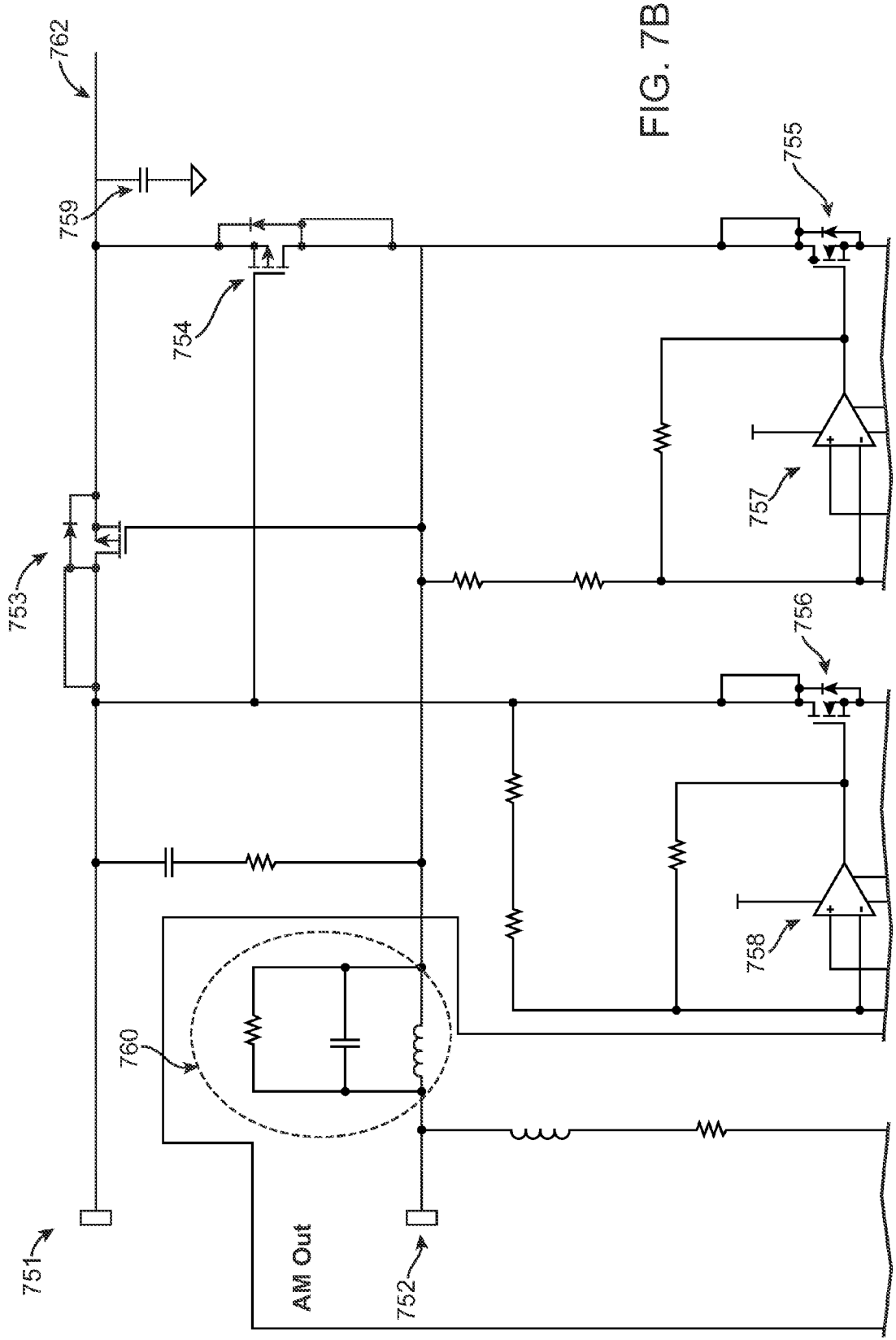
FIG. 7B is a circuit-level diagram illustrating exemplary circuit configurations of a portion of the system shown in FIG. 7A.
Figure 7B:
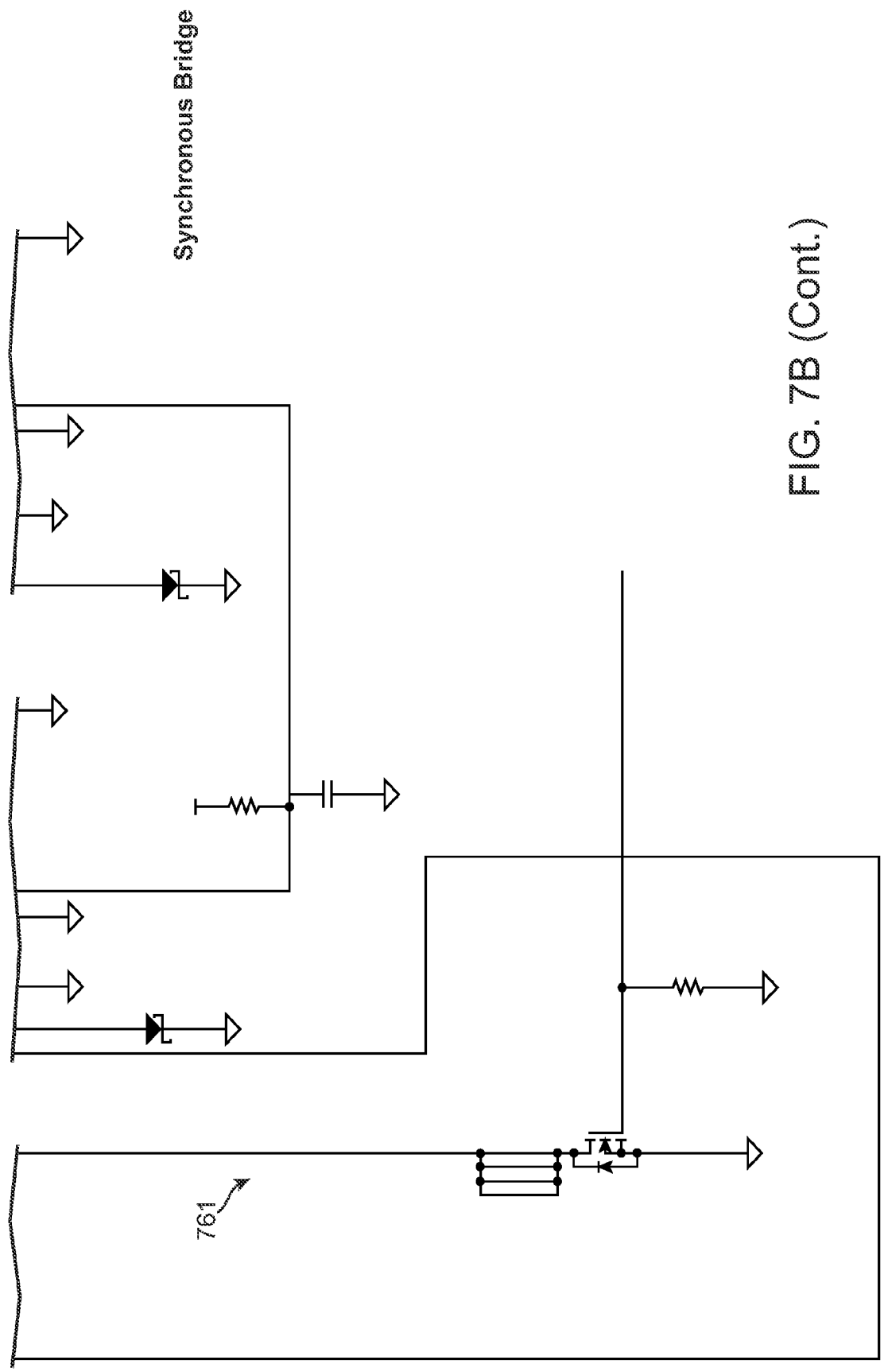

FIG. 7B is a circuit-level diagram illustrating exemplary circuit configurations of a portion of the system shown in FIG. 7A. Circuit elements in FIG. 7B include input/output (I/O) ports 751 and 752, transistor diode pairs 753, 754, 755, and 756, Op Amps 757 and 758, smoothing capacitor 759, decoupling elements 760, output data signal line 761, DC power line 762. I/O ports 751 and 752 may represent coils which may be inductively coupled to receive and transmit data and power. I/O ports 751 and 752 may represent a single inductively-coupled coil, such as coil 722 of FIG. 7A. I/O ports 751 and 752 receive AC signals through inductive coupling. The received AC signals include at least one of a power component and a data component. The power component of the received AC signal is converted to a DC power signal using a synchronous bridge or rectifier formed by diodes 753, 754, 755, and 756. The synchronous bridge corresponds to the synchronous bridge 730 of FIG. 7A. A half-synchronous bridge may alternatively be used.

In each of the transistor diode pairs 753, 754, 755, and 756, a transistor (typically MOSFET) is connected in series with a diode to eliminate voltage drop across the diode when the diode is forward-biased. In transistor diode pairs 755 and 756, the gates of the transistors are controlled by Op Amps 757 and 758, respectively. Op Amp 757 is configured and coupled to output a voltage level to turn on the transistor of transistor diode pair 755 when the diode of transistor diode pair 755 becomes forward-biased. Op Amp 758 is similarly configured to perform the same function on transistor diode pair 756. Transistors of transistor diode pairs 753 and 754 are controlled by voltages through I/O ports 751 and 752, respectively. Smoothing capacitor 759 is coupled to the synchronous bridge to reduce oscillations of the output of the synchronous bridge, DC power line 762. The smoothing capacitor capacitively loads the DC power line 762 so that a smooth DC power output may be achieved. Decoupling elements 760 comprises capacitors, resistors and inductors coupled to decouple circuitry to convert AC power to DC power (synchronous bridge) and output data signal line 761. Output data signal line 761 transmits output data from circuitry within the device to I/O port 752. According to at least one embodiment, output data is a modulated signal.

Figure 8:
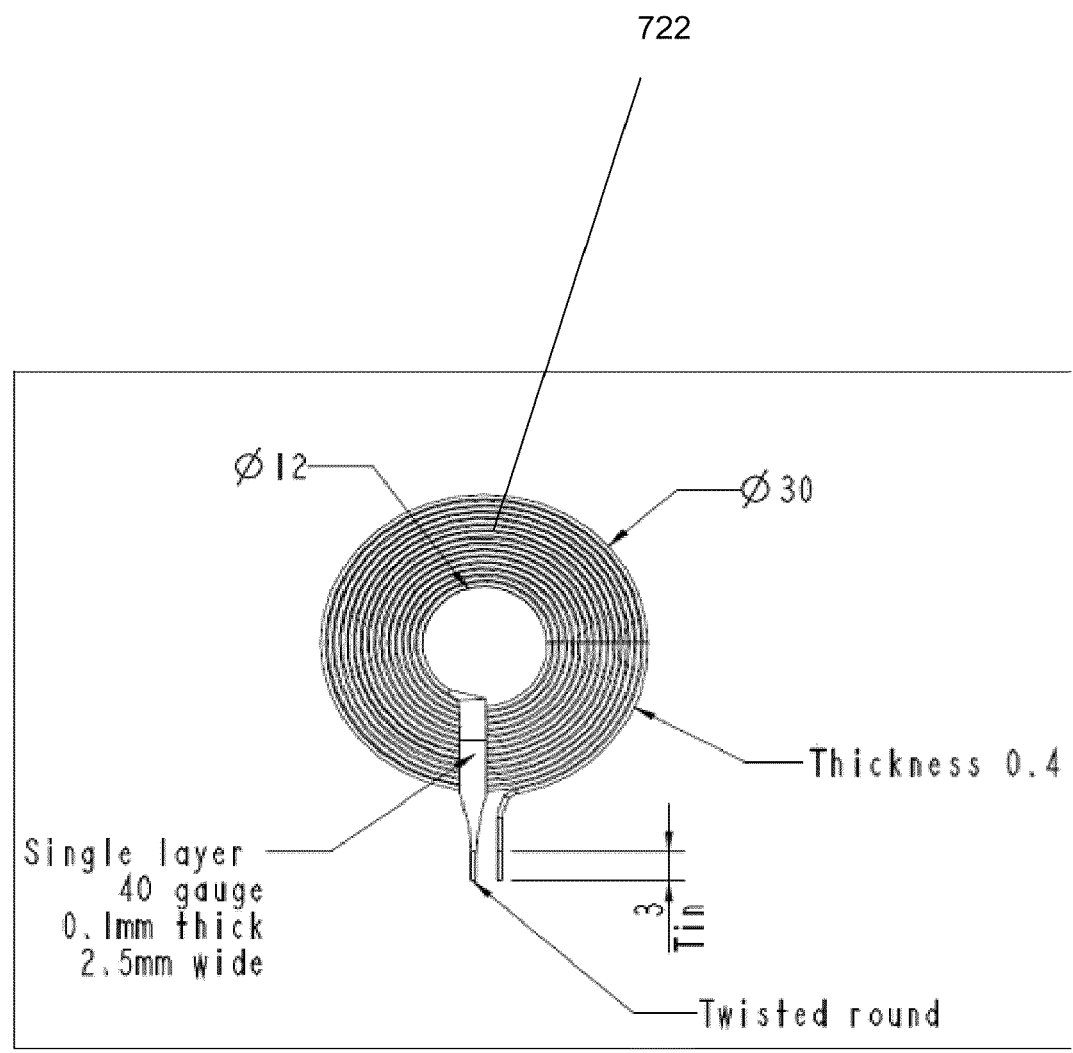
FIG. 8 illustrates details for a magnetic coil that can be used on a computing device, in accordance with one or more embodiments.

FIG. 8 illustrates details for a magnetic coil 722 that can be used on the MCD 500, in accordance with one or more embodiments. In one implementation, the coil 722 includes 16 turns of 24 strands of 40 Gauge insulated Oxygen free copper, with all 24 strands wound simultaneously on a 12 mm diameter core. The coil is backed by material that provides an inductive shield, so as to protect the device electronics and circuits from the magnetic field used to transmit signals onto the device. In one embodiment, a layer of Finemet material is used as backing for the coil 722 of FIG. 7A to provide a magnetic flux conduit.

Signal Handler on MCD

Figure 9A:
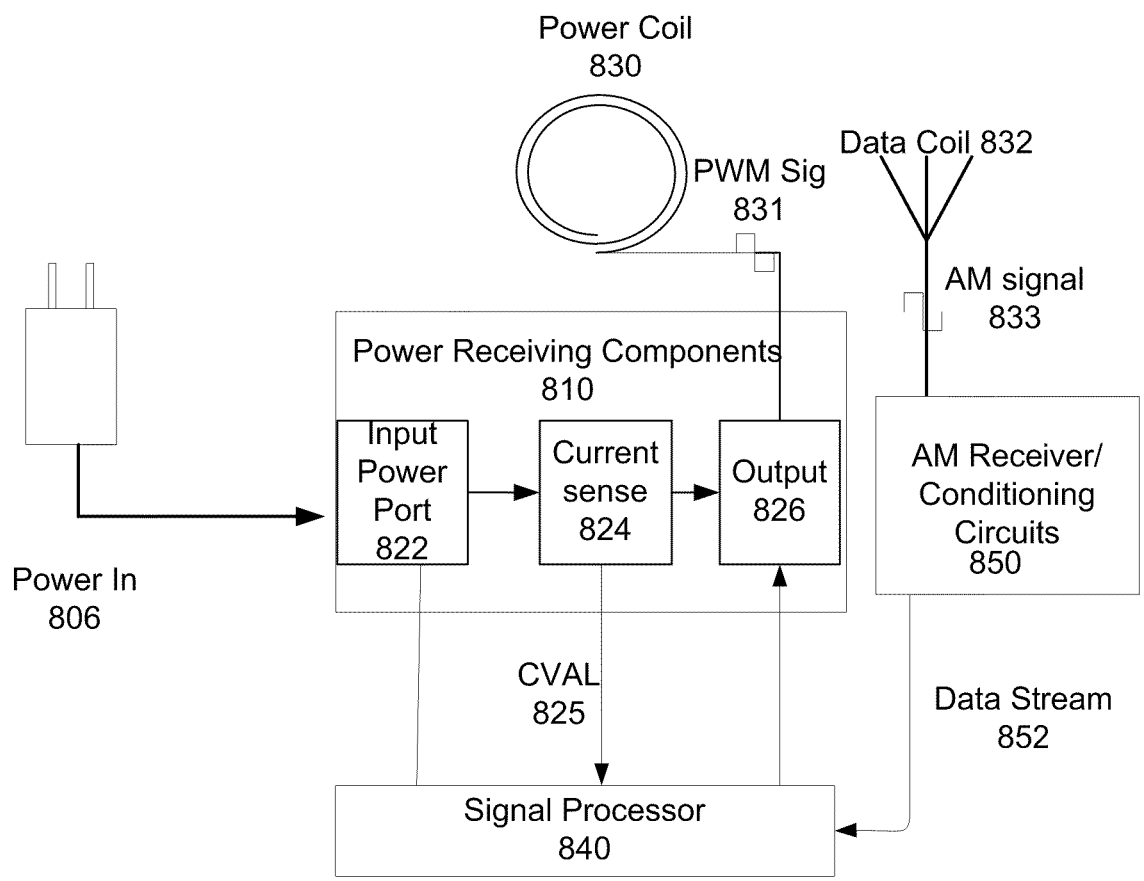
FIG. 9A is a simplified block diagram of a docking station (or other accessory device) having components for implementing an inductive signal transfer system in combination with another device, according to an embodiment.

FIG. 9A is a simplified block diagram of a docking station (or other accessory device) having components for implementing an inductive signal transfer system in combination with another device (e.g. a MCD such as described with FIG. 5), according to an embodiment. In one embodiment, the signal handler 620 of dock 600 includes power receiving components 810 to receive power 806 from an external source, a signal processor 820, a power coil 830, a communication coil 832, and a receiver 850. In one implementation, the power receiving components 810 include a connector port 822 that corresponds to, for example, a USB type connector port (e.g. Micro-USB port). The processor 820 communicates with the connector port 822 to detect the type of power source that is being used. In the implementation shown, the connector port 822 is of a USB type, the connector port 822 is able to distinguish when the connecting device is another computing computer or an electrical outlet adapter (by detecting when the data signal lines D+ and D− are shorted). In addition, the processor 820 communicates with the current sense 824 in order to detect the current levels of the incoming power supply. Specifically, the connector port 822 signals input power to a current sense 824. The current sense 824 detects the current levels and signals a current value 825 to the processor 820. In this way, the processor is able to control the input power supply to the dock 600 (see FIG. 6) to ensure current/power levels are adequate. In one implementation, a minimum of 1 ampere is needed as the current supply from the external source.

The power receiving components 810 include an output section 826 which generates a power signal that drives the power coil 830 to inductively signal PWM signal 831 to the MCD 500. The output section 826 thus includes circuitry to modulate the power signal from the power source. As described elsewhere, the modulation may be in form of Frequency Shift Keying (FSK) to communicate commands, responses and/or acknowledgements to the MCD consistent with a communication protocol such as described with one or more embodiments described herein. The logic for determining the specific commands are data bits originals from the processor 820, which communicates with the output section 826. In one implementation the modulation frequency (as provided by the output section 826) is 125 KHz and used to communicate data using "1" and "0" values that correspond to signal peaks. As described previously, MCD 500 (see FIG. 5) may be equipped to inductively receive the transmissions from the power coil 830.

The dock 600 (FIG. 6) uses the communication coil 832 to receive inbound data signals transmitted over the inductive channel. In one embodiment, the communication back from the MCD 500 is provided by an On-Off Key (OOK) 3 MHz signal (shown as AM frequency inductive signal 833) that is superimposed on the power signal. This signal is detected separately by data coil 832, which is positioned so it does not couple too strongly with the primary power coil 830, as this could adversely attenuate the signal. In one implementation, the communication coil 832 is a six-turn coil positioned sufficiently apart from power coil 830. The data coil 832 forms part of a tuned circuit, which discriminates the 3 MHz signal from the 125 KHz power drive. The MCD 500 signals protocol data (such as responses, power requirements, data for establishing credentials, licenses, state information etc.) to the communication coil 832 of the dock 600 as an AM frequency inductive signal 833. The AM receiver 850 receives and converts the inductive signal 833 into a data stream 852 that is communicated to the processor 820. The processor 820 uses the data stream 852 to control the power output via the power coil 830, in a manner described with embodiments such as described with FIG. 12 and FIG. 13.

Figure 9B:
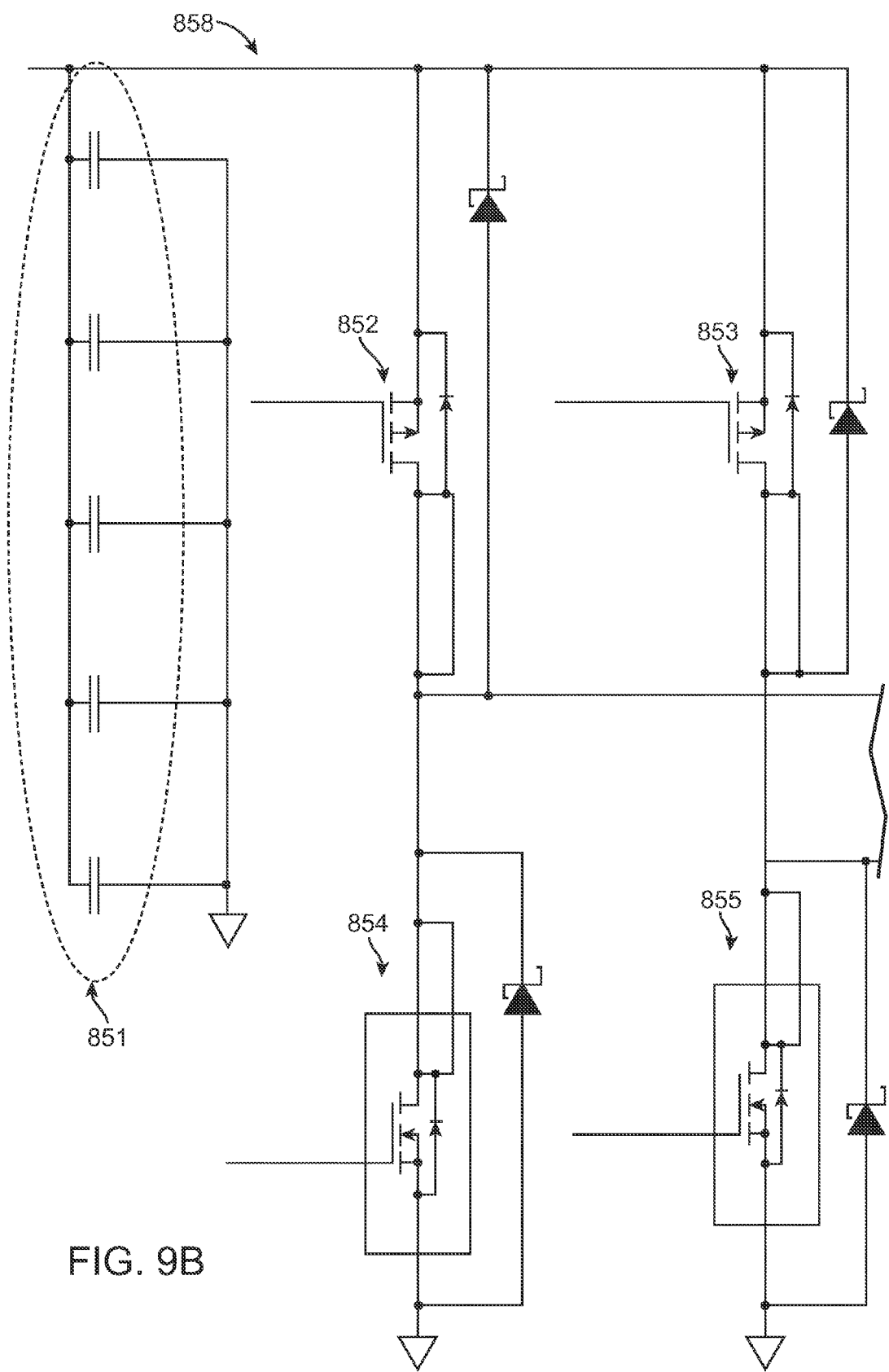
FIG. 9B is a circuit-level diagram illustrating a suitable circuit configuration of output circuitry of a docking station, as described by FIG. 9A, under an embodiment.
Figure 9B:
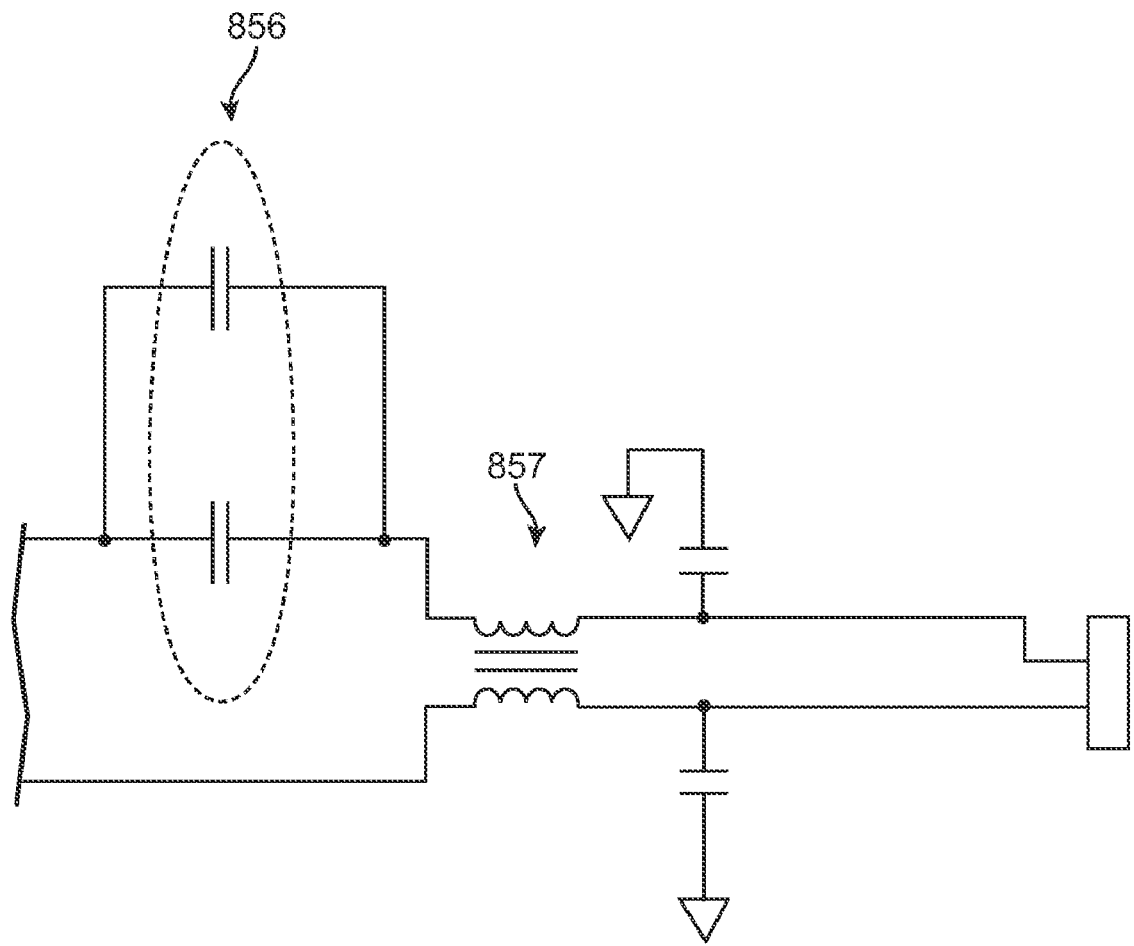

FIG. 9B is a circuit-level diagram illustrating an exemplary circuit configuration of output circuitry 826 of FIG. 9A. Output circuitry includes capacitor bank 851, transistors 852 853 854 and 855, output capacitor 856, choke 857, and DC power line 858. As described, the transistors 852, 853, 854 and 855 form an Bridge for the dock (or power supply device) that can be driven to increase or regulate power output. Capacitor bank 851 is coupled to the DC power line 858. DC power line 858 is further coupled to terminals of transistors 852 and 853, which together with transistors 854 and 855, form an H-bridge which is well-known. The H-bridge operates to convert DC power transferred via DC power line 858 to AC power. Capacitor bank 851 has equivalent capacitance large enough to prevent significant voltage oscillations on the DC power line 858. According to one embodiment, gates of transistors 852, 853, 854, and 855 are controlled by a microcontroller.

Output capacitor 856 is coupled, on one end, to terminals of transistors 852 and 853. Another end of the output capacitor 856 is coupled to the choke 857. According to one embodiment, the output capacitor's 856 capacitance value is designed such that when coil 830 of FIG. 9A is inductively coupled to a receiving coil, the frequency of the output AC power signal is at the desired frequency. According to one embodiment, the frequency of the output AC power signal is 120 kHz when coil 830 of FIG. 9A is inductively coupled, and the frequency of the output AC signal when coil 830 is coupled is 90 kHz.

Output capacitor 856 is designed to have minimal resistance to the desired output AC power signal. According to one embodiment, two capacitors are connected in parallel to form output capacitor 856. One of the two capacitors is a metalized polypropylene film capacitor, which has very low loss characteristics. The other of the two capacitors is an adjustment capacitor which may be polycarbonate film capacitors. The adjustment capacitor has a capacitance value which causes the overall capacitance of the output capacitor to be a desired capacitance value. Choke 857 is an inductor with an inductance value tuned to block out unwanted asymmetric switching transient signal components from the output AC power signal.

Figure 9C:
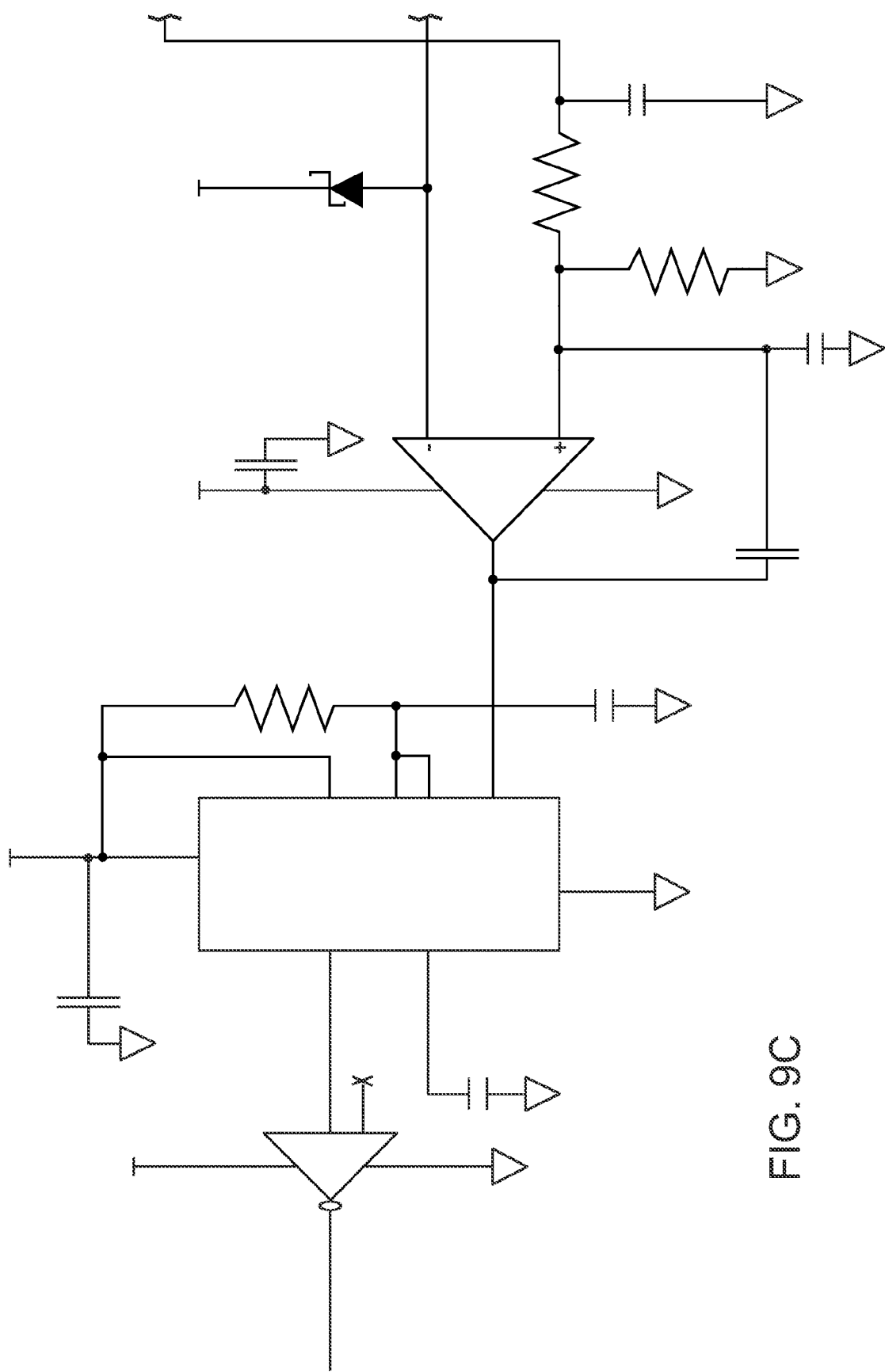
FIG. 9C is a circuit-level diagram depicting a suitable circuit configuration for an inductive receiver on a docking, under an embodiment.
Figure 9C:
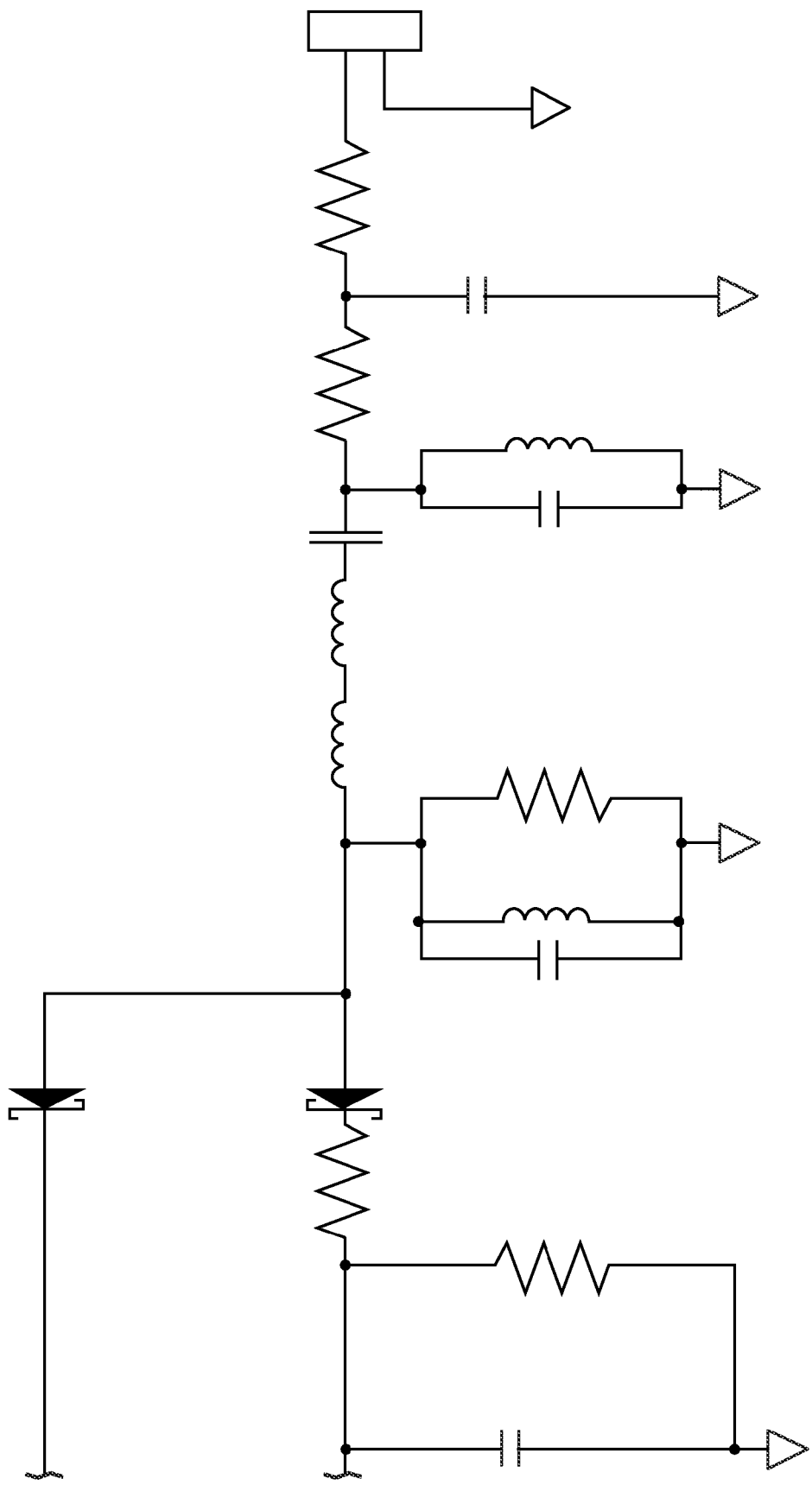

FIG. 9C is a circuit-level diagram illustrating an exemplary circuit configuration of AM Receiver/Conditioning Circuits 850 of FIG. 9A. AM Receiver 850 includes Schottky Diode 861, comparator 862, diode 863, timer circuit 864, inverter 865, and input 866. AM receiver is coupled to receive modulated data signal from coil 832 of FIG. 9A. Received modulated data signal occupies a different frequency range than output signal transmitted from coil 830. According to one embodiment, received modulated data signal has a center frequency of 3 MHz. Coil 832 is positioned in relation to coil 830 to minimize, as much as possible, inductive coupling between the two coils in order to prevent attenuation to the received modulated data signal. According to one embodiment, coil 832 is a 6-turn coil positioned on the side of the top surface of the dock. The received modulated data signal received at input 866 which is coupled to coil 832. The received modulated data signal is then transmitted to Schottky diode 861 and diode 863. Schottky diode 861 generates low frequency signal derived from the amplitude of the received modulated data signal. This low frequency signal is compared with an averaged voltage level generated by diode 863, in conjunction with attached resistive and capacitive circuit elements. The comparison is performed by comparator 862 and the output of the comparator is a demodulated data signal. Before the demodulated data signal is transmitted to the signal processor 820 (FIG. 9C), it is transmitted to a timer circuit 864 and then an inverter in order to adjust the demodulated data signal's timing and voltage levels.

Figure 9D:
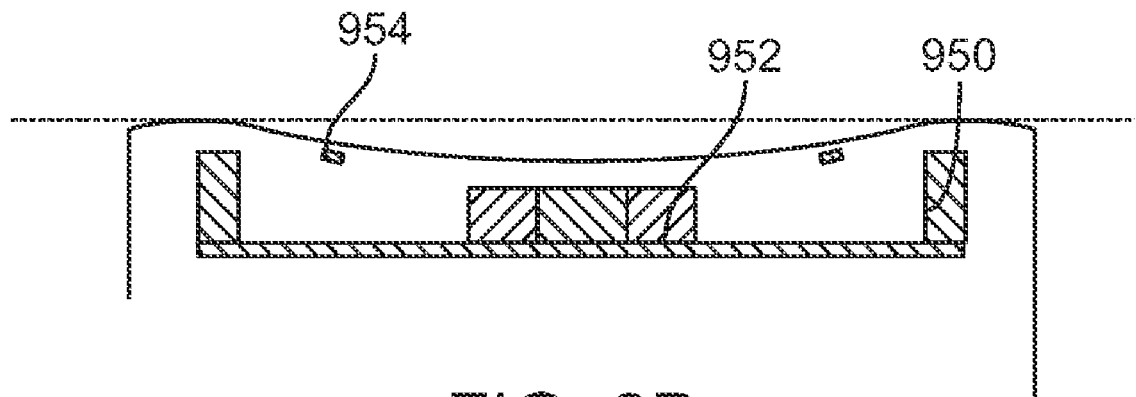
FIG. 9D and FIG. 9E illustrate a coil assembly or subassembly for use on one or both devices, under another embodiment.
Figure 9E:
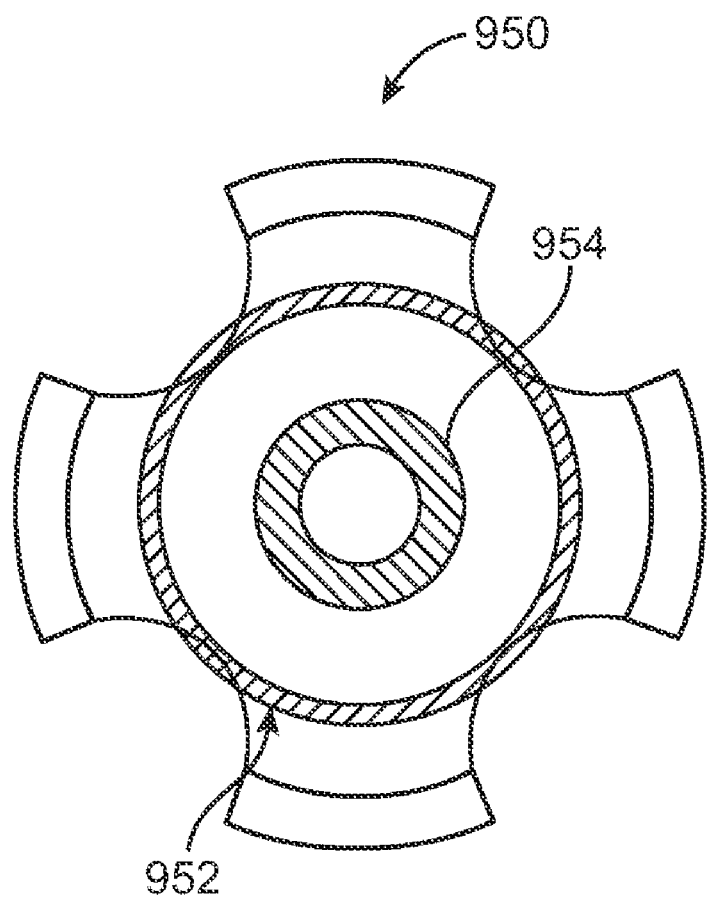

FIG. 9D and FIG. 9E illustrate a coil assembly or sub-assembly for use on one or both devices, under another embodiment. In one embodiment, a two-coil sub-assembly may be implemented on the dock 600 (see FIG. 6), for use in inductive signal transfer to the MCD 500 (see FIG. 5). As shown, the sub-assembly includes a ferrite core 950 having mounted therein a power coil 952. A data coil 954 'floats' on an inner surface of a housing on which the device is received. The ferrite core 950 extends through a center of the power coil 952.

Figure 9F:
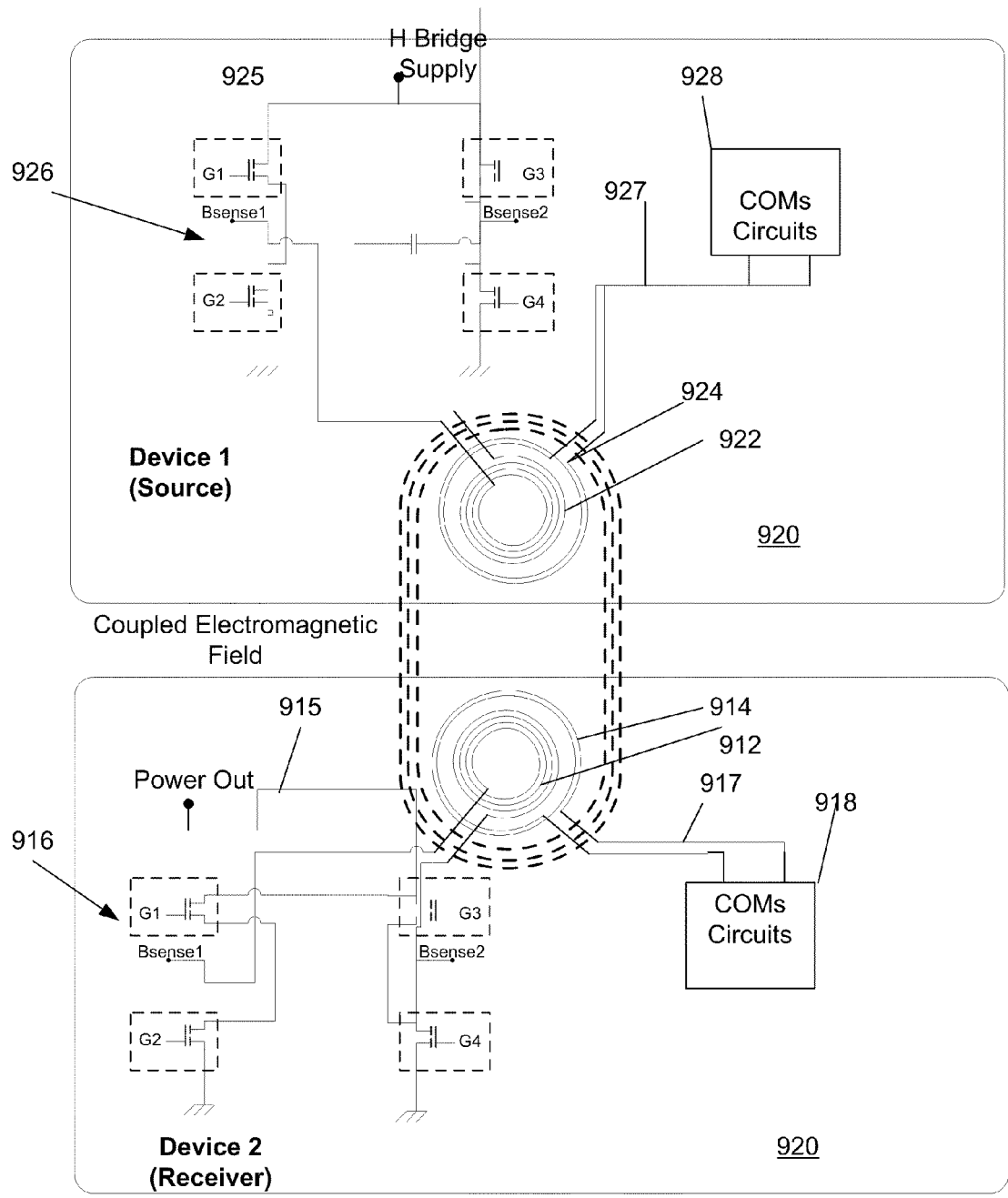
FIG. 9F illustrates an alternative embodiment for inductively coupling a dock and mobile computing device, under another embodiment.

FIG. 9F illustrates an alternative embodiment for inductively coupling a dock and MCD, under another embodiment. In an embodiment shown, each of the MCD 910 and dock 920 includes two coils or coil sections. Specifically, MCD 910 includes power coil 912 and data coil 914, which in the implementation shown, are provided as separate interior (power) and exterior (data) sections of one coil. Similarly, the dock 920 includes power coil 922 and data coil 924, provided as separate interior and exterior sections of a common coil. The MCD's power coil 912 extends to power bus 915 via a bridge type circuit as describe herein. The MCD's data coil 914 extends to data buss 917. Likewise, the dock's power coil 922 extends from power bus 925, and its data coil extends to data buss 927. The power coil 912 of MCD 910 may connect to a sync bridge 916, similar to bridge 730 of FIG. 7A. The sync bridge may supply a power out, which as described in FIG. 7A, may extend to a power buss 747 (FIG. 7A) to the device electronics 770 (FIG. 7A). Data may be carried from the dock 920 to communication circuits 918, where they are then extended to the signal processor 740 (FIG. 7A). The power coil of 922 of the dock may have a power supply extended through an Bridge 926 (as described with output 826 of FIG. 9A), which is driven to supply power to the power coil 912 of the MCD 910. Data on dock 920 may be extended (bi-directionally) through the data coil 924 via communication circuits 928 to corresponding coil 914 on the MCD 910.

Protocol to Control Inductive Power/Data Transfer

Figure 10:
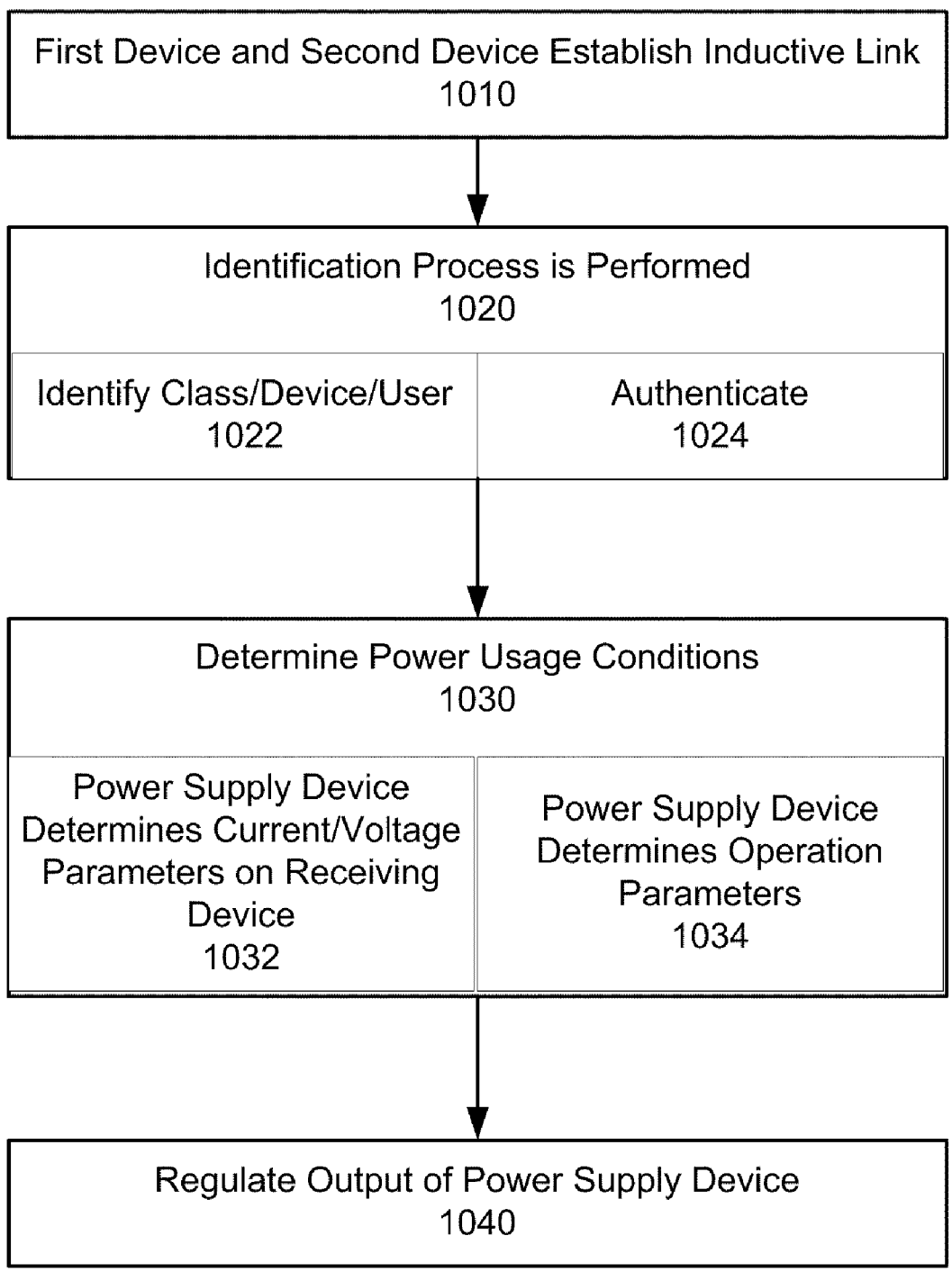
FIG. 10 illustrates a process or method implemented on two computing devices to enable an efficient and safe inductive signaling environment, under embodiment.

FIG. 10 illustrates a process or method implemented on two computing devices to enable an efficient and safe inductive signaling environment, under embodiment. Reference is made to a first device which inductively supplies power, and a second device which inductively receives power and processes it. As described with other embodiments, the two computing devices in the inductive signal transfer may correspond to a mobile computing device and an accessory dock. However, numerous variations and alternatives are possible, such as the use of two similarly designed mobile computing devices in place of the accessory device.

In step 1010, an inductive link is established between two devices. As described with various embodiments, an inductive link may be established by placing magnetic coils of two devices in close proximity to one another. For example, the back façade of the MCD may overlay, or have embedded there, one or more magnetic coils to receive power and/or data from the other device. The other device may correspond to a dock (or another computing device) that includes one or more corresponding coils that inductively transmit/receive signals from the coils of the MCD device when the two devices are placed in contact (or optionally near) one another.

Step 1020 provides that an identification process of one or both devices is performed. In an embodiment, sub-step 1022 provides for one or both of the two devices identifying the other device by class or type. For example, the dock may identify the MCD device by class or type. Likewise, the MCD may identify the dock by class. The identification process may involve, for example, the MCD identifying whether it is being inductively mated to a dock or another device (e.g. another MCD). As another example, the MCD can determine whether it is to supply power exclusively (such as to another accessory device that can only consume power, rather than to the dock).

As an alternative or addition, the process of identification includes one or both of the devices determining the other devices hardware, firmware, or software, including version and compatibility between two devices. For example, software/firmware versions may be determined to identify and/or resolve compatibility issues.

In sub-step 1024, an authentication process identifies whether one or both devices being inductively coupled are authorized to be used. In one implementation, the MCD determines whether the dock is an authorized device. The authorization process may include one or both devices exchanging communications, such as in form of a text-base license agreement. A programmatic exchange of an agreement may implement or confirm authorization. In one variation, the programmatic exchange of an agreement provides consent (from manufacturer of otherwise unauthorized device) to terms/conditions for inductively mating with the other device. In this way, the manufacturer/designer of the technology under the inductive link can implement an authorization step to maintain control over its inductive link technology.

Alternatively, other techniques exist for enabling one device to identify another device by class or type. For example, in one implementation, coils on two inductively coupled devices carry data that identifies that device to another device. As another example, another communication medium, such as a radio-frequency (RF) communication medium (such as BLUETOOTH) may be used to identify two devices to one another.

According to embodiments, the two devices inductively link to transmit/receive power intelligently. In particular, the power receiving device is able to communicate information that is indicative of a voltage or current state of the device. The state may correspond to, for example, (i) over-voltage/current conditions (e.g. the power supply device supplies too much power); (ii) a charge level of a rechargeable battery under the power receiving device; and/or (iii) a load of the power receiving device. Accordingly, in step 1030, power usage conditions are determined for one of the devices that are drawing power from the other. In the implementation where the first device (MCD) receives power from the second device (Dock), power usage conditions are determined for the MCD. The MCD and/or the dock may determine one or more of the power usage conditions. In sub-step 1032, the power receiving device (e.g. MCD) determines power usage conditions corresponding to current/voltage measurements. These measurements may be made on assumption that the power received on the device can or is used to recharge the device's battery. The current/voltage measurements of the power receiving device may correspond to (i) the amount drawn by the battery recharge circuit, (ii) direct measurement of the battery capacity on the power receiving device; (iii) measurement of the load on the power receiving device, including identification of the power level (e.g. high power illumination versus dimmed display) of the device and components that are being operated; and/or (iv) measurement of the output power. In one implementation, the intelligence incorporated with the battery recharge circuit/component identifies the power consumption needs of the power receiving device.

This information is then reported back to the power supply device. The power usage conditions may be reported back through the inductive link, or alternatively, by RF communication (e.g. BLUETOOTH).

As an option, sub-step 1034 may measure or detect power conditions from its own output. In an embodiment, measuring the output of the power supply device can provide a basis for comparison that can be used as a real-time safety check.

On an ongoing basis, step 1040 provides that the transmission of power across the inductive link is regulated in real-time. The power supply device (e.g. dock) may use feedback from the MCD in order to determine power usage conditions on a real-time basis. A real-time control loop corresponds to the power supply device responding to information it determines from the power receiving device (sub-step 1032), in order to enable the power supply to track and adjust its power output to match the needs or power mode of the receiving device. The power supply device may also compare its own output with information determined from the power receiving device as a safety check, to protect against, for example, spurious metal contact or malfunctions. In one embodiment, the power supply device measures local current and voltage values (on power supply device), then compares the measurements to corresponding current/voltage values communicated from the power receiving device. An H-bridge (as described with FIG. 8B) is modulated to drive the power with corrections as determined in real-time from information received from the power receiving device. As described below, the power receiving device may communicate current/voltage readings using AM OOK range for an inductively communicated signal.

Figure 11:
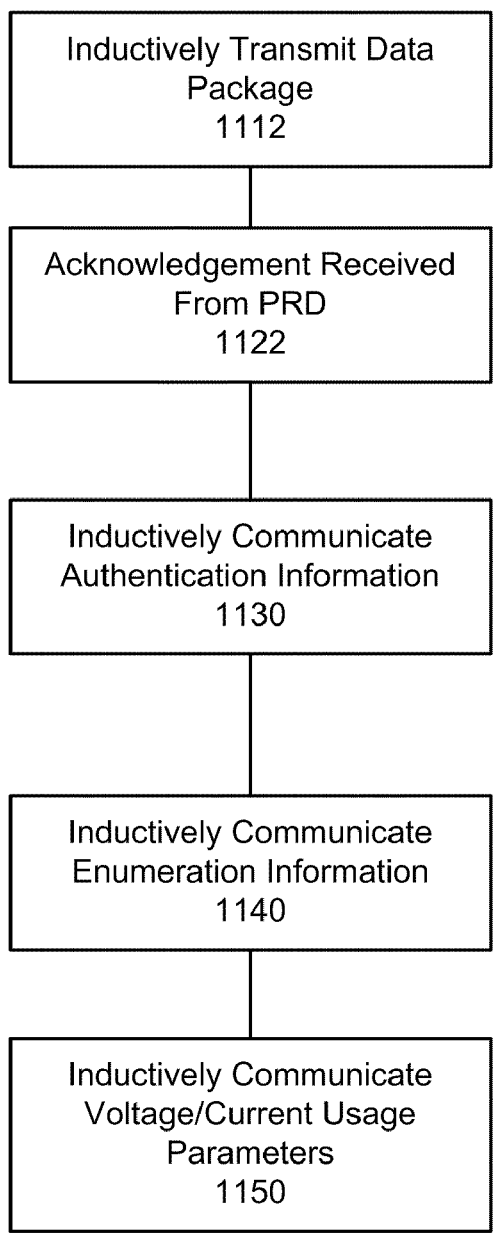
FIG. 11 illustrates steps performed on respective power supply and power receiving devices in enabling two such devices inductively link to one another under a controlled protocol or process, according to an embodiment.
Figure 11:
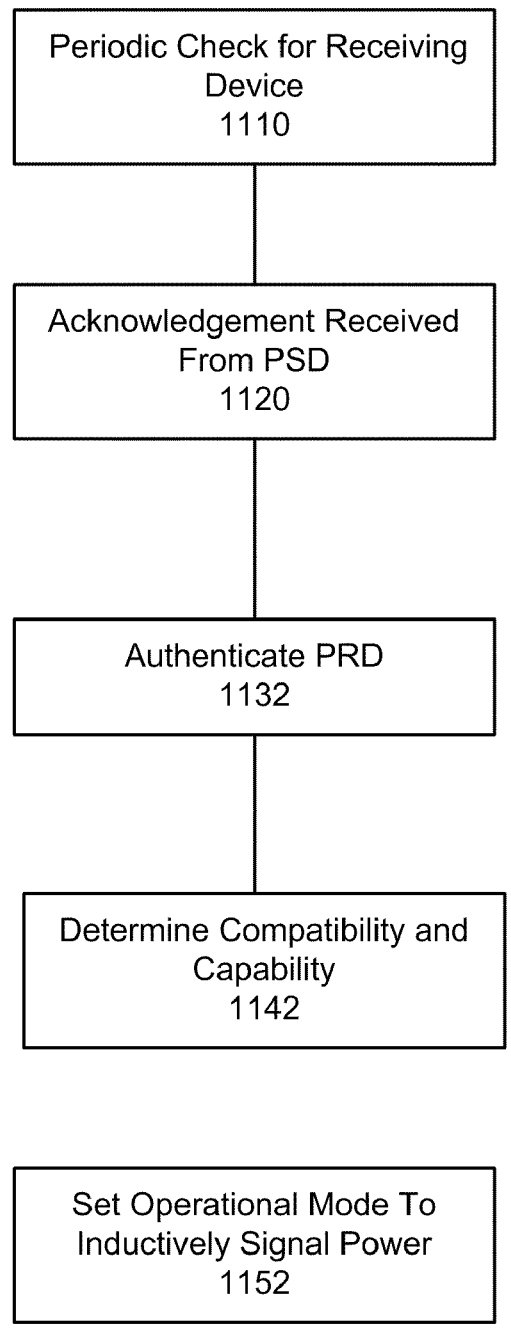

FIG. 11 illustrates steps performed on respective power supply and power receiving devices in enabling two such devices inductively link to one another under a controlled protocol or process, according to an embodiment. An embodiment such as described may be implemented between, for example, a dock (power supply device) and MCD (power receiving device), or between two MCDs, or between a charged MCD (power supply device) and accessory device (power receiving device). As described, two devices are inductively linked, with a series of data communications or exchanges that are communicated across an inductive link in accordance with an inductive communication protocol.

In step 1110, the power supply device makes a periodic check as to whether the power receiving device is inductively linked. For example, power supply device checks to see whether an inductively triggered charge has been triggered on its coil. The check by power supply device is made repeatedly in short periods (e.g. 400 ms), using a fraction (e.g. 25%) of the PWM set at a small interval (e.g. 20 ms). In step 1112, the power receiving device is placed on or near the power supply device, and the power receiving device triggers an inductive signal on the power supply device. As soon as the power receiving device is powered, it sends packets over the inductive communication link (e.g. three packets) until acknowledgement is received (step 1120). Step 1120, the power supply device acknowledges the other device, and the power receiving device processes the acknowledgment.

In step 1130, the power receiving device inductively communicates authentication information to the power supply device. Step 1132 provides that the power supply device signals back corresponding authentication information (precise timing can alternatively be reversed). For example, as described with other embodiments, power supply device may transmit a licensing agreement as part of the authentication information. The power receiving device transmits back acceptance or an accepted licensing agreement.

In step 1140, the power receiving device communicates enumeration information using the inductive link. Likewise, the power supply device communicates its enumeration information. The enumeration information may be used to identify hardware, firmware or software. The information may be used to identify whether compatibility issues exist between the two devices (step 1142). The enumeration information may also enable one or both devices to identify the other device by type of kind. This information may be used to enable devices to select performance level or operations, functionality, communication protocol or other aspects for the two devices to communicate or transfer power.

In step 1150, the power receiving device communicates information about its voltage/current usage. In one implementation, the power receiving device uses a timer interrupt to check power and state parameters repeatedly at short intervals (e.g. 2.2 ms), then communicates this information to the power supply device using the inductive link. These measurements provide the power (or voltage, current) calculations made on the supply device in regulating or controlling power to the receiving device. Accordingly, in step 1152, the power supply device receives the information and regulates its power output based on identifying the needs or power levels of the power receiving device. The exchange of information forms a feedback loop that enables the power receiving device to signal power across the inductive link under a process that is controlled based on information supplied from the power receiving device. In one embodiment, the information is communicated across the inductive link. In another embodiment, the information is communicated across other communication mediums, such as through a RF communication medium.

With reference to embodiments of FIG. 9A through FIG. 9C, one embodiment provides that the dock (acting as the power supply device) continuously takes local current and voltage readings, then compares the local current/voltage readings to values determined from the power receiving device (step 1150, 1152). Adjustments to the power delivery are made through driving bridge (as formed by elements 852, 853, 854, and 855 of FIG. 9B).

Figure 12:
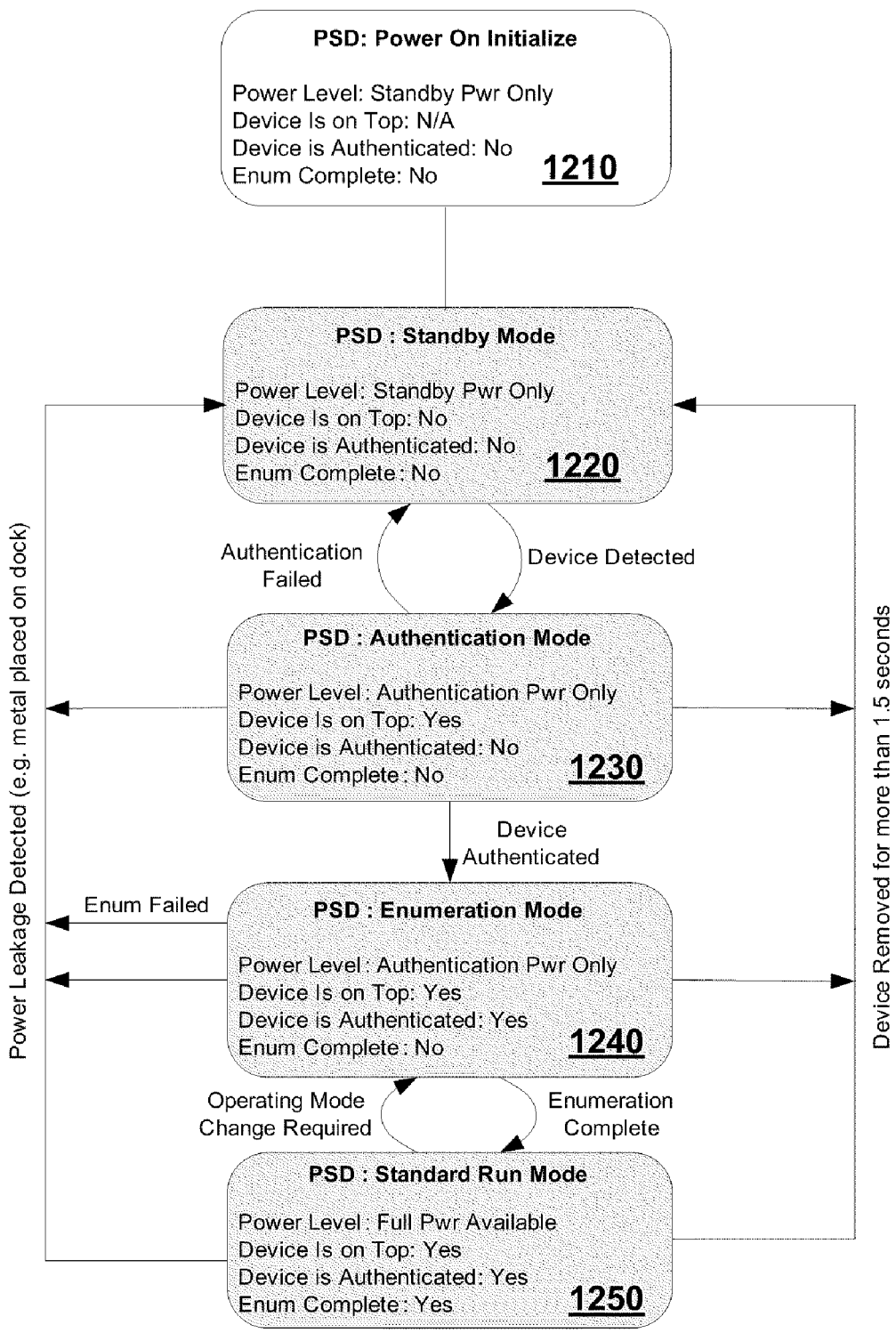
FIG. 12 is a state diagram of the operation status of a power supply device, under an embodiment.

FIG. 12 is a state diagram of the operation status of a power supply device (such as a docking station for an MCD), under an embodiment. As described with other embodiments, the power supply device includes multiple states. The power supply device may operate in four or more modes, based on four or more states. The four states include (i) power level, (ii) whether the power receiving device is present, (iii) whether the power receiving device is authenticated, and (iv) whether the enumeration between the two devices is complete. The modes of the power supply device correspond to power-on-initialize mode 1210, stand-bye mode 1220, authentication mode 1230, enumeration mode 1240, and run mode 1250.

In a power-on-initialize mode 1210, the power supply device carries the following state: (i) power level in stand bye, (ii) state not available, (iii) power receiving device NOT authenticated, and (iv) power receiving device NOT enumerated. In stand-bye mode 1220, the power supply device carries the following state: (i) power level in stand bye, (ii) power receiving device NOT present, (iii) power receiving device NOT authenticated, and (iv) power receiving device NOT enumerated. From standby mode, the power receiving device can move into authentication mode when another device is detected. In authentication 1230, the power supply device carries the following state: (i) power level for authentication mode, (ii) power receiving device present, (iii) power receiving device NOT authenticated, and (iv) power receiving device NOT enumerated. If authentication mode 1230 fails, the device returns to standby mode 1220. Authentication failure may also be indicative of a power leakage condition (e.g. spurious metal). If authentication mode 1230 is successful, the device switches into enumeration mode 1240.

In enumeration mode 1240, the power supply device carries the following state: (i) power level for authentication mode, (ii) power receiving device present, (iii) power receiving device authenticated, and (iv) power receiving device NOT enumerated. The enumeration mode may fail, indicating a power leakage condition (e.g. spurious metal). Otherwise, the enumeration mode is completed, the device mode transitions to stand-bye run mode 1250. The enumeration mode 1240 may after or set the operating mode 1250. In the operating mode, the power supply device carries the following state: (i) power level set by enumeration or protocol (full power available), (ii) power receiving device present, (iii) power receiving device authenticated, and (iv) power receiving device enumerated.

With regard to the modes of operation for the power supply device, anytime the power receiving device is decoupled (e.g. removed from the dock) and then placed back into an inductive engagement, the power receiving device returns to the authentication mode 1230 and progresses to the standard run mode.

In some embodiments, the inductive signal transfer protocol between the dock (or other power supply device) and MCD (are power receiving device) follows a "ping pong" format, where the MCD transmits a packet and the Accessory responds. The packets may not be the same size and may be sent over different modulation schemes. Each round-trip (e.g. MCD initiates and dock responses) may (i) enable regulation of the power transfer signal to the MCD; and (ii) enable peripheral communications between the two devices.

Figure 13:
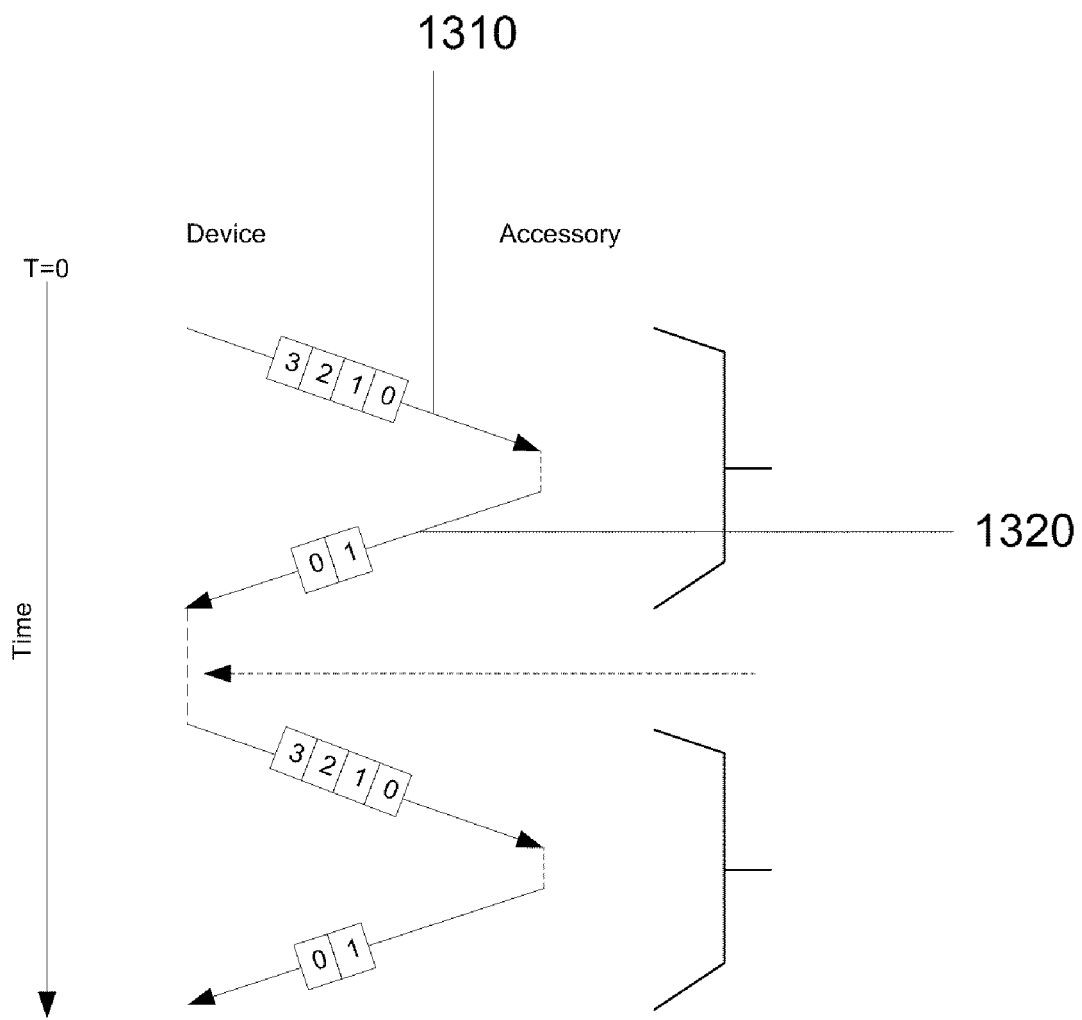
FIG. 13 illustrates communication packets that can be exchanged between devices, according to embodiments described herein.

FIG. 13 illustrates communication packets that can be exchanged between devices, according to embodiments described herein. In describing FIG. 13, reference is made to elements of prior embodiments (specifically MCD 500 and dock 600 of FIG. 5 and FIG. 6 respectively) for purpose of illustration. In particular, FIG. 13 illustrates that the communications between the two devices is asymmetrical, with the MCD communications being longer (and potentially faster) than communications from the dock to the MCD. In FIG. 13, MCD communication 1310 is 4 bytes. As detailed by some prior embodiments, one implementation provides that the MCD communication is signaled as AM OOK 3 MHz. In one embodiment, the signal transfer protocol provides that the dock communication 1320 is 2 bytes and communicated using FSK 110/125 KHz (to signify "1" and "0" values respectively). More defined ranges may alternatively be used (e.g. 113/119 KHz). Each device implements a protocol using the structured data formats (other formats may be used). The protocol's implementations may be provided through programming or configuration of the respective signal processor 740 (FIG. 7A, for MCD), 820 (FIG. 9A) for dock 600 (see FIG. 6).

In an embodiment, the dock 600 (FIG. 6) operates in standby mode during the following conditions (i) no device is detected as being 'docked'; (ii) device has been detected, but a fault condition exists that forces the dock to power down. The latter condition may arise if, spurious metal is placed on the dock or some other fault occurs. Once fault is detected, the dock may periodically attempt to reconnect with the device.

One implementation provides that periodic intervals (400 ms), the dock 600 (FIG. 6) attempts to provide a small amount of power to see if the MCD 500 (FIG. 5) is in range. The MCD may be configured (e.g. via programming of the signal processor 740 in FIG. 7A) to ACK back within a short time period (e.g. 25 ms), else the dock returns to sleep state. Else, if the MCD 500 is detected, the dock enters the authentication state.

From standby mode, authentication mode follows when the dock successfully detects the MCD 500 (FIG. 5). In the authentication mode, the dock attempts to verify that the MCD device detected is in fact a valid, licensed device. In one implementation, the packet format for authentication mode is the same as used in enumeration mode) see following paragraphs) where for MCD communication 1310 corresponds to the command byte and the next 3 bytes contain the Legal Agreement Text (LAT). This packet formatted is repeated until the LAT has been transmitted in full to the dock. The dock performs a check sum analysis. In response to receiving the LAT and performing the check sum analysis, the dock submits a Legal Response text back to MCD 500. An example of the packet format for the MCD 500 (i.e. signaling LAT) is provided as follows:

TABLE 1

Packet format for use by MCD 500.

| Ca (Command) | Aa1 (Auth Value 1) | Aa2 (Auth Value 2) | Aa3 (Auth Value 3) |
| --- | --- | --- | --- |
| Byte 0 | Byte 1 | Byte 2 | Byte 3 |

An example of the packet format for the dock 600 (i.e. signaling Legal Response text) is provided as follows:

TABLE 2

Packet format for use by dock 600.

| Cp (Command) | Ap1 (Auth Value 1) |
| --- | --- |
| Byte 0 | Byte 1 |

Command bytes have the same meaning in the various modes. A list of example commands is provided below.

Enumeration mode is reached after the MCD 500 and dock 600 have passed authentication. One purpose that can be achieved with enumeration is a determination of whether particular combination of hardware and firmware on the two devices are compatible. For example, one device may have a later version of firmware that is not compatible with the other.

During enumeration mode, the communication 1310 from the MCD 500 use the following sequence:

TABLE 3

Enumeration mode sequence from MCD 500.

| x | Ea |
| --- | --- |

The dock 600 returns communication 1320 as follows:

TABLE 4

Enumeration mode sequence from dock 600.

| Cp (Command) | Ep1 (Enum Value 1) |
| --- | --- |
| Byte 0 | Byte 1 |

Table 5 lists descriptors for the communications 1310 that are sent from the MCD 500 during the enumeration mode:

TABLE 5

Enumeration Mode descriptors for MCD 500.

| Byte# | Name | Symbol | Purpose |
| --- | --- | --- | --- |
| 0 | Command_a | Ca | Command byte sent from MCD to Accessory. Contains bit fields with status and instructions. |
| 1 | Enum_Value_from_MCD | Ea1 | MCD data packet used for enumeration. (See modes and enumeration for details) |
| 2 | Enum_Value_from_MCD | Ea2 | MCD data packet used for enumeration. (See modes and enumeration for details) |
| 3 | Enum_Value_from_MCD | Ea3 | MCD data packet used for enumeration. (See modes and enumeration for details) |

Table 6 lists descriptors for the communications 1320 that are sent from the dock 600 during the enumeration mode:

TABLE 6

Table 6: Enumeration Mode descriptors for MCD 600.

| Byte# | Name | Symbol | Purpose |
| --- | --- | --- | --- |
| 0 | Command_p | Cp | Command byte sent from Dock to MCD Contains bit fields with status and instructions. |
| 1 | Enum_Value_from_Accessory | Ep1 | Dock data packet used for enumeration. |

Once enumeration is completed, dock 600 and MCD 500 move to Standard Operating Mode. In this mode, dock 600 provides power to MCD 500 for use in recharging and/or operating that device. During standard operating mode, dock 600 operates a PID loop to regulate the power based on measured current and voltage reported by the MCD 500. In particular, the signal processor 740 (FIG. 7A) of MCD 500 may communicate out over the AM out 738 (FIG. 7A) of the communication circuit 728 (FIG. 7A) data that indicates the measured current/voltage. On the dock, the signal is received on the data coil 832 (FIG. 9A) and converted into bit streams by the receiver 850 (FIG. 9A). The MCD 500 (FIG. 5) reports the measured current/voltage in communication 1310, structured as follows:

TABLE 7

Structure for MCD to communicate current/voltage

| Ca (Command) | Ia (current) | Va (voltage) | Da (A→P) |
|---|---|---|---|
| Byte 0 | Byte 1 | Byte 2 | Byte 3 |

Table 8 displays the packet descriptions of the MCD 500 in the communications 1310.

TABLE 8

Packet descriptions of MCD 500.

| Byte# | Name | Symbol | Purpose |
|---|---|---|---|
| 0 | Command_a | Ca | Command byte sent from MCD to dock. Contains bit fields with status and instructions. |
| 1 | Current_MCD | Ia | Current measurement as reported by the signal processor of MCD (see 740 in FIG. 7A) |
| 2 | Voltage_MCD | Va | Voltage measurement as reported by the signal processor of MCD |
| 3 | Data_from_MCD | Da | MCD data as sent by device host CPU, also enum and authentication info. (Non power related) |

Table 9 illustrates the bit field standard for the communications from the MCD 500 to dock 600, when standard operating mode is in place.
Table 4

TABLE 9

Bit field standard from MCD communications

| | | Bits | | | | | | | |
|---|---|---|---|---|---|---|---|---|---|
| Byte | 0 | | 1 | 2 | 3 | 4 | 5 | 6 | 7 |
| Ca | Turn on PowerFET On | | arb | arb | arb | arb | arb | Dc1 | Dc2 |
| Ia | 8 bit unsigned Current Measurement, 4.7 mA per count | | | | | | | | |
| Va | 8 bit unsigned Voltage Measurement, 3.0 V + 17.6 mV per count | | | | | | | | |
| Da | 8 bit value used for Airboard to Accessory COM (not part of Accessory power) | | | | | | | | |

Table 10 represents a response packet from dock 600. Note that dock 600 may, under one implementation, be restricted in sending a packet if it receives a packet. The size and format of the response packet is also fixed.

TABLE 10

Response packet

| Cp (Command) | Dp (Data P→ A) |
|---|---|
| Byte 0 | Byte 1 |

Table 11 lists illustrative packet descriptors for the dock 600.

TABLE 11

| Byte# | Name | Symbol | Purpose |
|---|---|---|---|
| 0 | Command_p | Cp | Command byte sent from Accessory to Airboard Contains bit fields with status and instructions. |
| 1 | Data_from Accessory | Dp | Accessory data sent by Accessory peripherals, attached accessories or Accessory enum/Authentication info. (Non power related). |

Table 12 illustrates the bit fields for the communications 1320 (dock to MCD).

TABLE 12

| | | Bits | | | | | | | |
|---|---|---|---|---|---|---|---|---|---|
| Byte | 0 | | 1 | 2 | 3 | 4 | 5 | 6 | 7 |
| Cp | PowerFET On | | | | | | | Dc1 | Dc2 |
| DP | 8 bit value used for Airboard to Accessory COM (not part of Accessory power) | | | | | | | | |

Embodiments such as described with FIG. 7A-7B and through FIG. 9A-9C detail hardware and other components for implementing communication packets of the protocol. As mentioned in some prior embodiments, the communication 1310 (from MCD to dock) may be communicated via OOK at 3 MHz. For example, as stated previously, the signal processor 820 (FIG. 9A) of the dock 600 receives an AM demodulated OOK signal which feeds directly into the processor or its hardware (e.g. UART).

The communications from the dock 600 (FIG. 6) to the MCD 500 (FIG. 5) may be communicated using FSK at 110-125 KHz (or other ranges such as 113/119 KHz). For example, the communication from dock 600 may be structured as Binary Frequency Shift Keying (BFSK) with the two tones centered at 110 KHz for Mark and 125 KHz for Space.

As described with the various embodiments, the primary control of PWM power signal from the dock 600 is as a function of (i) the input current and (ii) the voltage and current feedback from the MCD 500. The measured output voltage, as sent back from the MCD 500, will modify the PWM by an amount determined by the Output voltage variance from the required set point.

Figure 14:
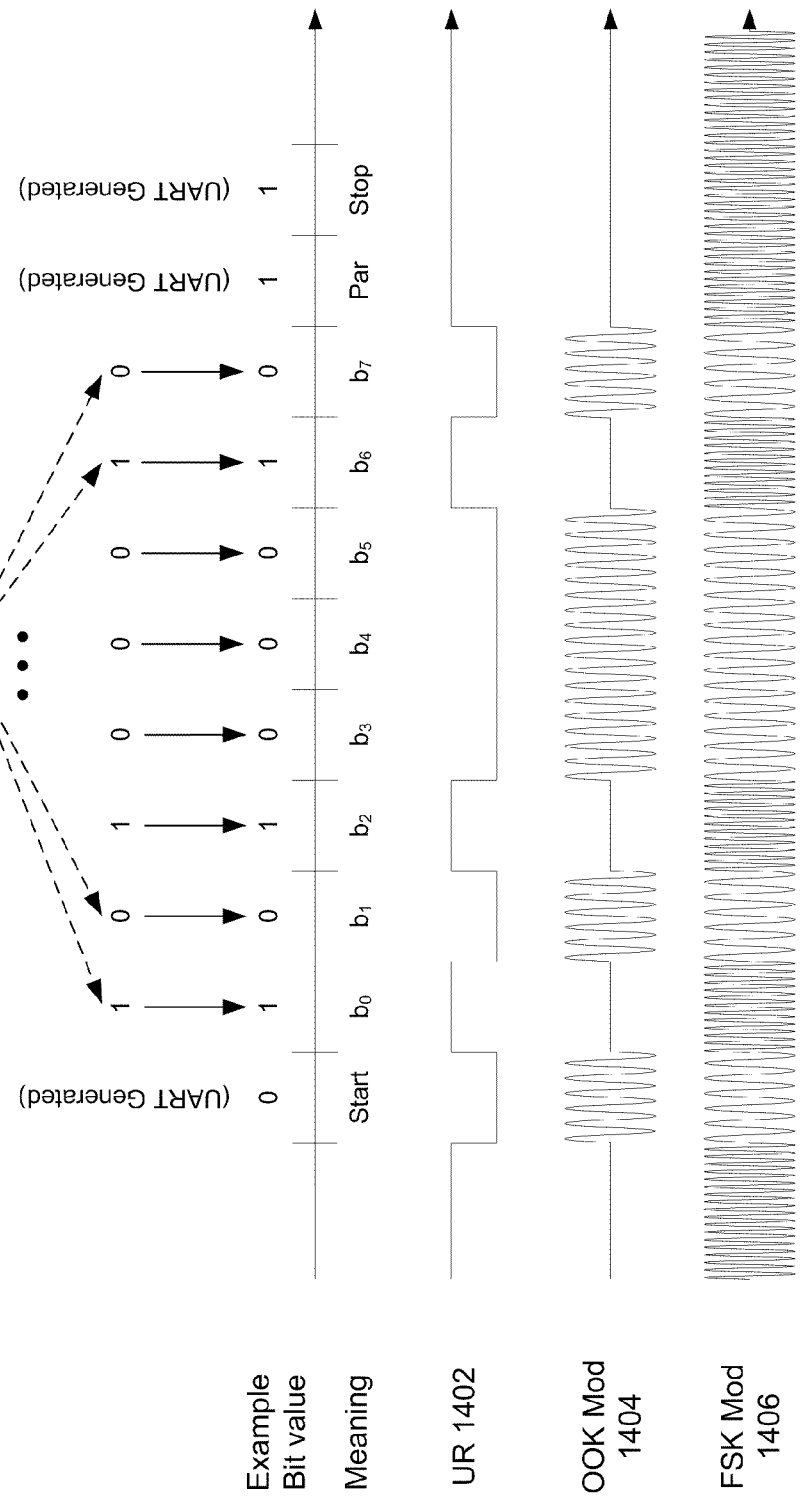
FIG. 14 illustrates various inductive signal modulations, as interpreted in binary form, under an embodiment.

FIG. 14 illustrates various inductive signal modulations, as interpreted in binary form, under an embodiment. In describing FIG. 14, reference again is made to FIGS. 5, 6 and elsewhere. In an embodiment, a standard communication packet exchanged between devices has 11 bits: one bit start, eight bits data, one bit parity, one bit stop. The example provided shows signaling for communication packet that corresponds to a value of 0x85HEX=090091.

A processor on either dock 600 (FIG. 6) (or power supply device) or MCD 500 (FIG. 5) generates or receives the signal structured as square wave 1402.

As mentioned in some embodiments, one signal medium exchanged between two devices corresponds to amplitude modulated (AM) or on-off-key (OOK) modulated data signal format 1404, which can be inductively communicated between two devices. In some embodiments, the signal format 1404 is the medium by which the MCD 500 (FIG. 5)

sends data to the dock 600 (FIG. 6). In the example shown, the OOK modulated data signal format 1404 results in interpretation as illustrated by square wave 1402. The duration of modulation corresponds to a bit value ("1"), and the duration of non-modulation corresponds to another bit value ("0").

As further described by some embodiments, a Frequency Shift Key (FSK) modulation may also be used, particularly in context of signaling data from the dock 600 to the MCD 500. FSK signal 1406 uses durations of high frequency (e.g. 119 KHz) and low frequency (e.g. 113 KHz) to communicate bit values. In the example provided, FSK signal 1406 is equivalent to square wave 1402 as well.

As an alternative, the signal format types exchanged between the two devices may be of the same type. For example, both power supply and receiving device may use OOK modulated data signal format 1404. To enable use of OOK modulated data signal by both devices, the MCD and its signal interface components, as depicted in FIG. 7A may be modified to include an AM receiver (such as depicted in FIG. 9A or FIG. 9C). Alternatively, both devices may use FSK modulated data signal type 1406. This signal type can be implemented without a receiver on either device (or FM receiver may be provided).

Orientation Dependent Functionality of MCD on Dock

With reference to an MCD and a dock in accordance with any of the embodiments described herein, an embodiment provides that the orientation in which the MCD is placed on the dock is selectable by the user, and that the orientation may determine or configure functionality of either device. For example, the orientation of the device when docked may be selected by the user in order for the user to enter a form of input or command as to how one or both devices (either combined or independently) operates.

Figure 15:
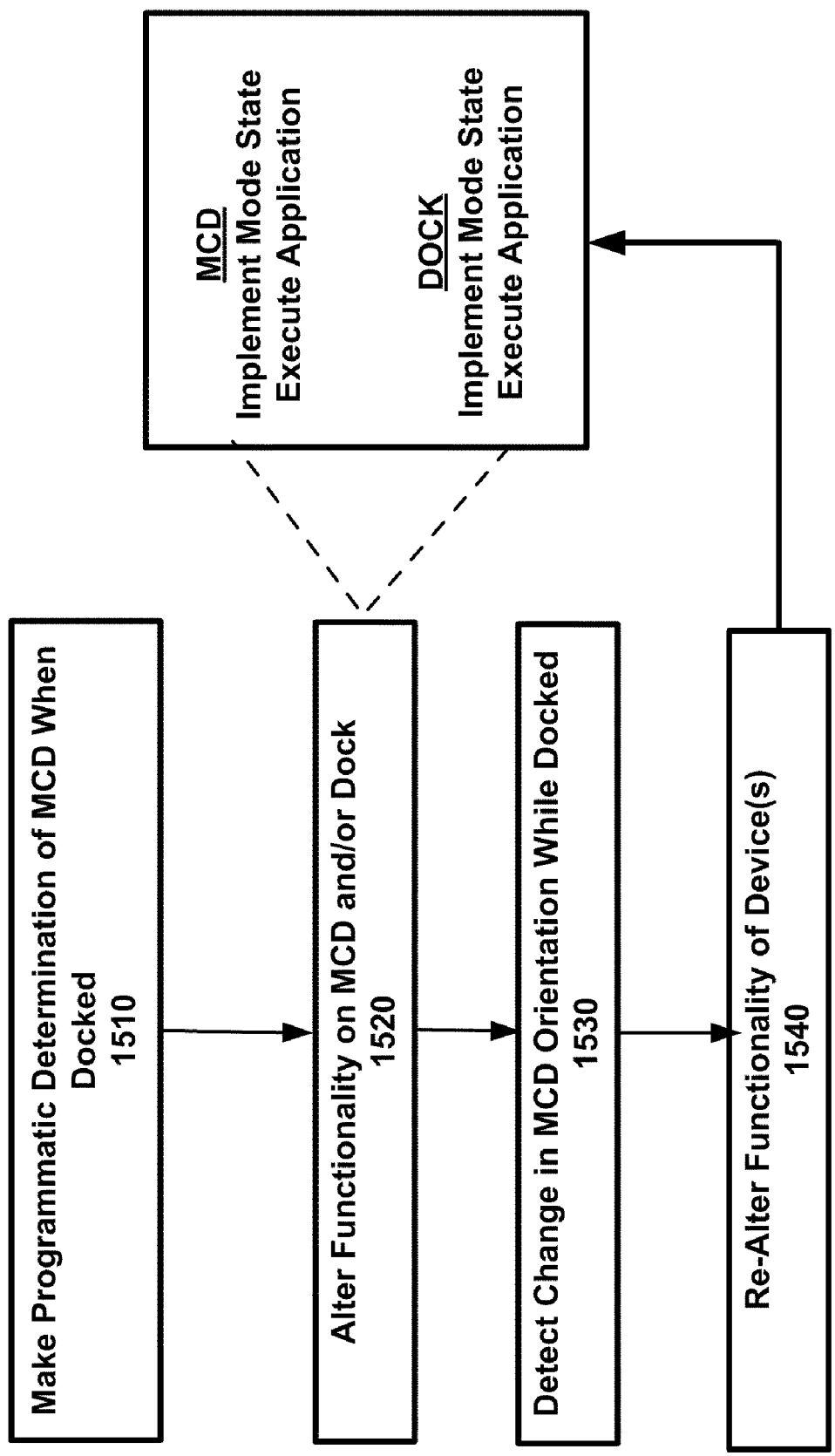
FIG. 15 illustrates a method in which an orientation of a mobile computing device is selectable to affect operations or functionality resulting from one or both docked devices, under an embodiment.

FIG. 15 illustrates a method in which an orientation of an MCD is selectable to affect operations or functionality resulting from one or both docked devices, under an embodiment of the invention. As a precursor, the dock and/or MCD are each physically configured to enable the MCD to have any one of many possible positions when docked. Numerous physical features or designs may be used to enable the device to have more than one orientation.

Figure 16A:
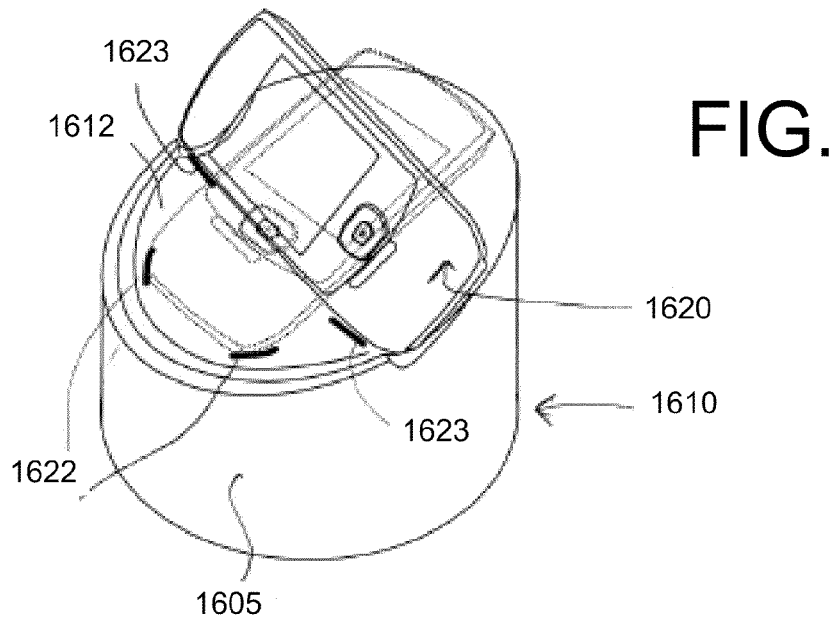
FIG. 16A illustrates an implementation of structural surface features that may be provided with the mobile computing device and/or the dork, under an embodiment.
Figure 16B:
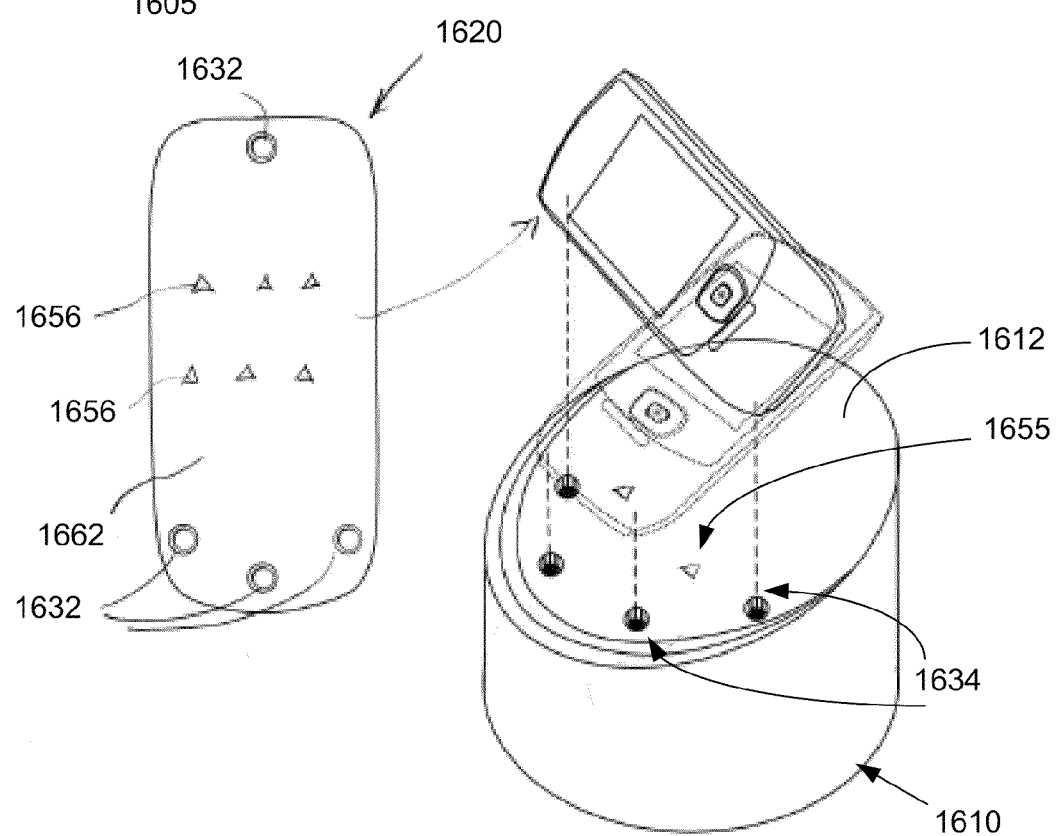
FIG. 16B illustrates an implementation in which structure surface features may be used to mechanically retain a mobile computing device on a platform of a dock, under an embodiment.
Figure 16C:
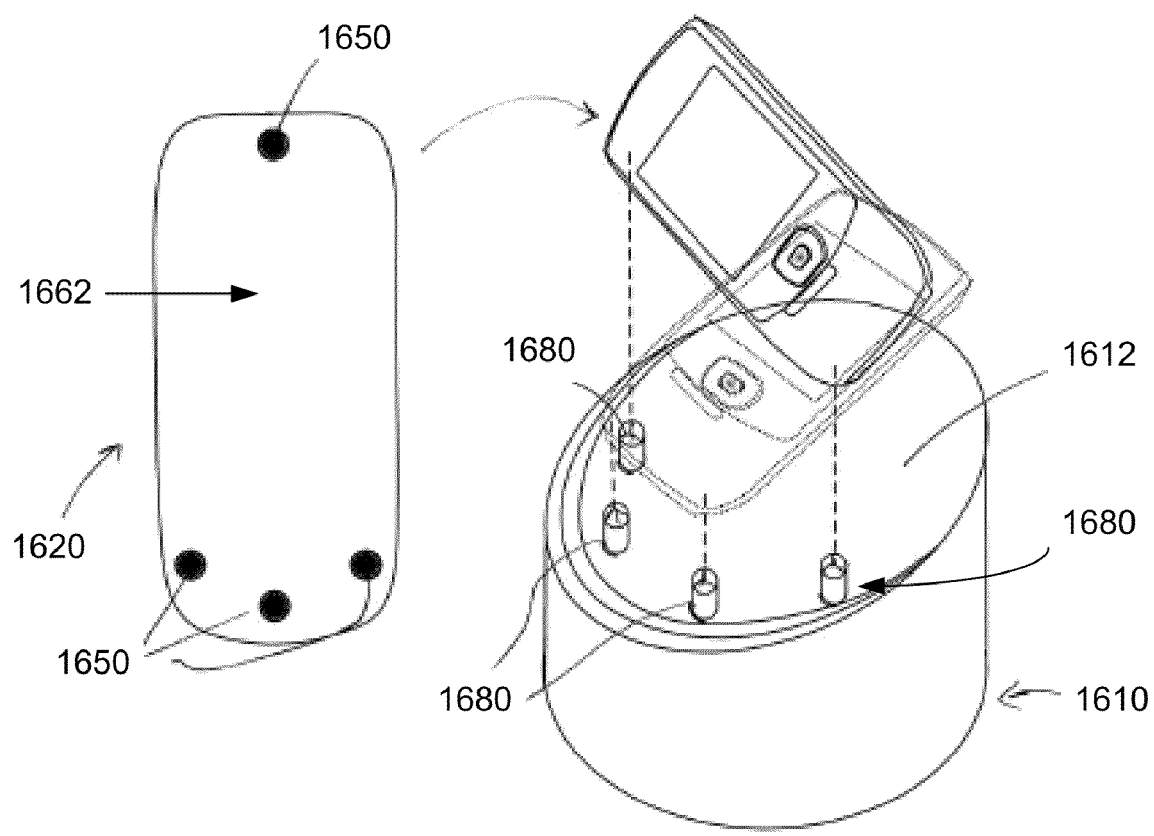
FIG. 16C illustrates an implementation in which a set of insertive clasps may be used to mechanically retain a mobile computing device on a platform of a dock, under an embodiment.

FIG. 16A through FIG. 16C illustrate implementations of structural surface features that may be provided with the MCD and/or the dock, under different embodiments of the invention. More specifically, in embodiments described by FIG. 15 and FIG. 16A through FIG. 16C, an MCD 1620 and dock 1610 are each assumed to include an inductive signal interface that pairs and performs in accordance with any of the embodiments discussed. In an implementation of FIG. 16A, the dock 1610 is configured to include a platform 1612 or shelf so as to receive and support the MCD 1620 in an electrically engaged manner. The platform 1612 may be of any shape, such as elliptical or circular, as shown in FIG. 16A. The platform 1612 may extend from a body 1605 to be partially upright or vertical. While embodiments contemplate a signal transfer interface between the dock 1610 and MCD 1620 that is conductive (see priority application U.S. patent application Ser. No. 12/239,656 for specific examples), numerous embodiments provide for the signal transfer interface to be inductive. Moreover, while mechanical features may be used to retain the MCD 1620 in the engaged position on the dock 1610, some embodiments provide for use of magnetic clasping (see embodiments described below and in U.S. patent application Ser. No. 12/239,656). For example, template structures 1622, 1623 may be provided to retain the MCD 1620 in the engaged position on the dock 1610. In the implementation shown, a first set of template structures 1622 support the MCD 1620 in the portrait (or lengthwise) docked orientation, while the second set of template structures 1623 support the MCD 1620 in the landscape (or widthwise) docked orientation.

Numerous other types of structural or surface features may be used to enable the MCD 1620 to be docked in any one of multiple positions. For example, the dock 1610 may include cut-outs or recess formations that form template retention structures to retain the MCD 1620 in a selected docked position. As an alternative or variation, surface retention features may be used to hold (or facilitate retention of) the MCD 1620 in position.

In more detail, FIG. 16B and FIG. 16C illustrate another implementation in which surface features may be used to mechanically retain the MCD 1620 on the platform 1612 of the dock 1610. In particular, an embodiment such as shown may provide that the back face 1662 of the MCD 1620 (or alternatively the platform 1612 of the dock 1610) includes surface protrusions 1632. The platform 1612 (or alternatively the back façade 1662) may include aligned retention recessions 1634. Two or more sets of protrusions 1632/recessions 1634 may be provided to enable the MCD 1620 to be docked in alternative positions (e.g. portrait or landscape). For example, the platform 1612 may be configured to include indentations that align to receive corresponding protrusions 1632 on the back face 1662 of the MCD 1620. The back face 1662 may include alternative formations to enable the MCD 1620 to be docked in either the landscape or portrait mode.

FIG. 16C illustrates another variation in which the platform 1612 of the dock 1610 includes a set of insertive clasps 1680 which may secure into corresponding receiving apertures 1650 on the back face 1662 of the MCD 1620. As with previous embodiments, the back face 1662 may include different sets of apertures 1650 to enable the device to have alternative docking positions. The clasps may be implemented in any one of many ways. For example, each clasp 1680 may be implemented in the form of opposing tongs that bias when pushed towards one another. When biased, the tongs may be inserted into one of the apertures 1650, where they release and retain. In one implementation, different sets of mechanical clasps may serve to retain the MCD against the dock in portrait or landscape mode.

While mechanical retention features are described with FIG. 16A through FIG. 16C, other embodiments described below utilize magnetic clasps or magnetic retention features. In one embodiment, the dock 1610 includes an arrangement of magnets which retain metal elements in the back face 1662 of the MCD 1620. Embodiments described below describe various other arrangements of magnets which may be combined with one or both devices to retain the two devices in alternating docked positions.

A method such as described with FIG. 15 may be described in context of elements described with other figures, and specifically of FIG. 16A through FIG. 16C. Accordingly, reference may be made to elements of those figures for purpose of illustrating suitable elements for performing a step or sub-step being described. Step 1510 of FIG. 15 provides that a programmatic determination is made to detect an orientation of the MCD 1620 when rested or mounted onto the platform 1612 of the dock 1610. In one implementation, resources on one or both devices may detect the orientation of the MCD 1620, and then respond accordingly. The following illustrate implementations: (i) the MCD 1620 may utilize sensors to detect its own position, then configure its operations (and optionally communicate with the dock 1610) as to the configuration or operations performed; (ii) the MCD 1620 may use detectors that detect alignment with corresponding elements on the docking station, and based on which detectors make contact, determine its own orientation; (iii) the dock 1610 may detect the MCD's position and communicate the position back to the MCD 1620; and/or (iv) the dock 1610 detects information using alignment contacts (see item (ii)) or sensors (e.g. optical sensors) that is then communicated to the MCD 1620 where it is used to detect orientation on the MCD 1620. Thus, for example, under one embodiment, the MCD 1620 includes a sensor or sensor arrangement (e.g. accelerometer) to detect its own position. As another example, the MCD 1620 may include sensors or detectors that detect contact with the dock. Depending on which detectors are active, the orientation may be determined. Similar arrangements may be provided as an alternative or addition on the dock.

Resources for performing orientation detection may vary, depending on implementation or variation. In an embodiment, metal contacts may be provided on the platform 1612 of the dock 1610 and on the back face 1662 of the MCD 1620. For example, optionally, metal contacts 1655 on the platform 1612 align with corresponding contacts 1656 on the MCD 1620. The determination of the docked position may be reflected by which contacts are energized on one or both devices. In one implementation, the same contacts for establishing the continuously conductive signal path between the dock and the MCD may be used to identify the orientation of the MCD in the docked position. For example, the position of the MCD may be reflected by the pattern of metal contacts that are actually in use (or not in use) to pass power or data between the devices.

As an alternative, the MCD 1620 may utilize an accelerometer to determine the tilt and thus the position of the device. As another alternative, magnetic reed switches or Hall effect switches may be provided on the dock to sense the presence and/or orientation of the MCD 1620. Such an implementation may be facilitated when magnets are also used to retain the two devices in the docked position.

In step 1520, functionality of one or both devices is altered by the detected orientation of the MCD 1620 placed on the dock 1610. In an embodiment, one or both of the docked devices includes resources to select, alter or otherwise configure functionality on one or both devices based on the detected orientation of the MCD 1620 when docked. In one embodiment, a processor of the MCD 1620 selects or otherwise configures one or more operations that are to be performed based on its determined docking configuration. On the MCD 1620, the alteration of the functionality may correspond to, for example, (i) execution of an application or set of instructions, and/or (ii) implementation of a hardware and/or software-based mode setting. Likewise, on the dock 1610, similar operations/steps may be performed. When docked, the orientation of the MCD 1620 may be used to configure functionality of the respective docked devices to operate independently of the other docked device, or to combine/share functionality or resources. Numerous examples are recited below.

Optionally, step 1530 provides that the MCD's position on the dock may be altered after the device is docked. In an implementation when, for example, retention and/or mechanical features are used to retain the two devices, the user may move the MCD 1620 from, for example, the portrait position to the landscape position. In another implementation when magnetic clasps are used to retain the two devices together, the MCD 1620 may be moved from the portrait position to 45 degrees of vertical, the landscape position, or one or more positions in between.

In an embodiment, step 1540 provides that functionality of one or both devices is re-altered by the detected orientation of the MCD 1620 docked on the dock 1610, in a manner such as described with step 1520.

As an alternative or variation, the orientation may be altered by removing the device. But the docking action establishes a pairing between the devices that extends to a first instance of the MCD being docked in a first position, then removed and re-docked in a second position.

The following examples are illustrative of how embodiments may be performed to implement states, modes or functionality (either independently or cooperatively) on one or both devices in the docked position. Different states for the device and dock depend on the device's position or orientation. As the orientation or manner in which the device is controlled is user-controlled, the state/mode or functionality of the device(s) may be controlled by the user through manual positioning or orientation of the MCD on the dock.

In one implementation, two orientations may be possible (e.g. landscape versus portrait), and the user's selection of, for example, one state or another is communicated through the selected orientation. For example, the device state for either of the docked devices may be selected by the user simply setting the back face of the MCD 1620 on the receiving surface in either landscape or portrait mode. As another example, the user can set the MCD 1620 down in a portrait position to implement a first functionality, such as the display of a large clock, information from a pre-selected or designated internet site (e.g. weather), or images from a photo-album. The user may alternatively place the MCD 1620 down in the landscape position, to implement another one of the functionalities or modes/states. For example, when the MCD 1620 is placed in the landscape mode on the dock, the MCD 1620 may display a calendar or so-called 'Today' screen.

In one embodiment, the user can switch the position of the MCD 1620 while it is in the docked position. Still further, the changing of the device, while being in the docked position, may in and of itself be a special type of input. For example, the user altering the orientation of the MCD 1620, while docked, may signify a state change that is different than had the user originally placed the device in the dock 1610 in the altered position.

According to one or more embodiments, the MCD 1620 is a telephony device that is capable of receiving incoming calls (e.g. over cellular connection) or placing outgoing calls. In such embodiments, the selected orientation of the device on the dock may affect call handling routines and functionality. In one implementation, the call handling of the device can change when docked—for example, if the MCD 1620 receives an incoming call while docked, the device may configure itself to (i) enable the call to be answered or handled easily without de-docking the device, and (ii) enable the user to leverage resources or capabilities of the dock for use in connection with the incoming call or related tasks. For example, the user may be enabled to lightly tap a display of the MCD 1620 in order to direct the MCD 1620 to enter speaker-phone mode (without dislodging the device from the dock 1610), and optionally use the speakers of (or attached to) the dock.

As another illustration, the device may be configured to enable media playback through the dock 1610. But in call handling mode, the speaker phone mode may automatically suspend any music which is playing on the device, to permit the user to place or answer a call.

As another alternative or additional feature, when the MCD 1620 is docked in a particular orientation, the MCD 1620 may be triggered to perform or display information such as: (i) Internet or network content, such as stock, weather or news; (ii) provide a clock; (iii) display slide show of pictures or images; (iv) display calendar or task lists or event list; or (v) provide generic personalized displays by them, such as for 'work', 'personal' or 'finance'. Still further, state information may be implemented, such as by way of reducing the power consumption and/or switching off select components of the device. For example, when the device is docked, one or more components (display, cellular radio, GPS radio) may be switched on (or alternatively off). As mentioned, the position of the MCD 1620 on the dock 1610 may determine the function, state or mode of operation of the device.

Still further, as another alternative or addition, an orientation of the MCD may be used to indicate a presence or status of the user to receive online or other forms of communications. For example, the user may correlate the orientation of the MCD with an online status for receiving Instant Messages or text messages (e.g. landscape mode means the person is away, while portrait means the person is available to respond or online). Likewise, orientation may be used to determine whether the user is willing to accept incoming phone calls, or whether incoming phone calls should be transferred to voicemail or elsewhere. Still further, a message reply functionality, such as enabling text-message reply to an incoming call, may be switched on, off or configured based on the orientation of the MCD on the dock.

In an embodiment, the position of the MCD 1620 on the dock 1610 may also affect the state or functions performed by the dock 1610. As examples, the orientation of the MCD 1620 in the dock 1610 may signal the dock 1610 to connect to a particular computer via a wireline (e.g. Universal Serial Bus) or wireless connection. As an alternative or addition, the dock 1610 may wirelessly and/or through wireline connect to more than one computer or device. The orientation of the MCD 1620, when docked, may act as a form of selection input to enable the user to select one computer over another to communicate with or access, via the dock 1610 or through credential information received from the dock 1610.

Other examples of functions or mode-settings that may be triggered or otherwise selected from the position of the MCD on the dock include: (i) media playback (audio or video) via a particular input source (e.g. analog input, streaming, wireless communications, via USB or FIREWIRE connector); (ii) media output through dock connections (e.g. dock may be connected to speakers or to large display device); (iii) music streamed from device; (iv) wired keyboard/mouse could be connected to the dock and enabled for use with the MCD when selected.

As mentioned, the user's action corresponding to altering the orientation of the MCD 1620 when docked may in and of itself serve as a form of input. For example, when the device has one orientation, one functionality is enabled or selected for one or both devices. When the user rotates the device on the dock to a new position, the user interface can switch to a default setting. The user can then change the orientation of the MCD 1620 back to an original position (or to a third position) in order to (i) resume, for example, a previous functionality or mode setting, and/or (ii) perform a new function or achieve a new mode setting.

As further examples, MCD 1620 may be in portrait or landscape more, so that the top center of the MCD 1620 is oriented at 0 degrees (portrait), 90 degrees (landscape), 180 degrees (upside down portrait), or 270 degrees (reverse landscape). Still further, dock 1610 may include, for example, a magnet (or other support structure) that can support the MCD 1620 in an intermediate position to any of the portrait/landscape orientations.

Magnetic Clasping

Numerous embodiments described herein provide for an MCD that electrically couples to a dock through surface contact. In such embodiments, there is an absence of connector forces or mechanisms that are traditionally used to retain a device against a dock. For example, one conventional design provides for portable computing devices to integrate connectors into surface edges of the device. The devices may then be placed onto a receiving surface of a docking station so that the device's connector (usually female) receives the extended connector from the dock. These conventional device-to-docking designs require users to align the devices so that the connector ports of the computing device and dock are in alignment. In addition to requiring efforts from a user to align and then insert the device onto the appropriate region of the dock, the manner in which the connectors of the device and dock mate must consider forces that fatigue or break connectors as a result of weight or withdrawal of the computing device from the dock. Additionally, such connectors can occupy significant thickness and dimension in the housing of the MCD.

In contrast to these and other conventional approaches, embodiments described herein enable a connector-less coupling that physically restrains the MCD against the dock, while enabling transmission of power and/or data between the devices. In particular, embodiments described herein facilitate the user's involvement in docking the MCD with the dock, by enabling the user to perform a simple action of placing the MCD on a receiving surface of the dock. The user is not required to make effective a mating of connectors between the MCD and the dock. Thus, requirements of the user to align contact elements or slots is reduced or eliminated. The user does not have to align connectors or force mechanical connections between connectors of the dock and MCD. Moreover, mechanical issues relating to fatigue or breakage of the connectors are eliminated.

The placement of a portable device or an MCD onto a dock may be passive or active, depending on design and implementation. In a passive surface mating scenario, gravity is the primary force that holds the device in position, so that appropriate surfaces on the MCD are in contact with corresponding points of the dock. In particular, embodiments provide for the retention of the MCD and the dock to be effective using any one or more of (i) mechanical retention using support structures and/frictional pressures (with gravity or other forces), (ii) mechanical clasping, and/or (iii) magnetic fields or clamping.

As described previously, mechanical retention may be provided by ledges, platforms, shelves or other surface features. The mechanical retention may be aided or enabled with features for creating frictional pressure. Specifically, frictional pressure may be facilitated by surface features provided on the MCD or dock. Surface features, such as indents, bumps, and/or ledges may be used to align and hold the MCD in position on the receiving surface of the dock. Surface features may also be used to enhance electrical contact between the MCD against the docking.

As an alternative to mechanical retention features, magnetic clasping may be used to firmly grip two devices together in any one of multiple possible or desired positions. Moreover, magnetic clasping enables the user to simply place the MCD onto the receiving surface of the dock.

According to an embodiment, magnets may be combined with the dock (or optionally with the MCD) in order to clasp the two devices together when docked. Such magnetic clasping may offer several benefits, including the ability to enable the orientation, by which the MCD is docked, to be altered. As described elsewhere, some embodiments provide that the orientation of the MCD on the dock may be used to affect the state, mode or functionality of the MCD and/or dock. Additionally, magnetic clasping amongst the devices may enhance the ability to enable connector-less signal exchange between the MCD and the dock, as the MCD may simply be placed on the dock for retention. Thus, under one implementation, when placed within a certain allowable area, the magnets will pull the device into the proper position for the connector-less signal exchange and charging.

Figure 17:
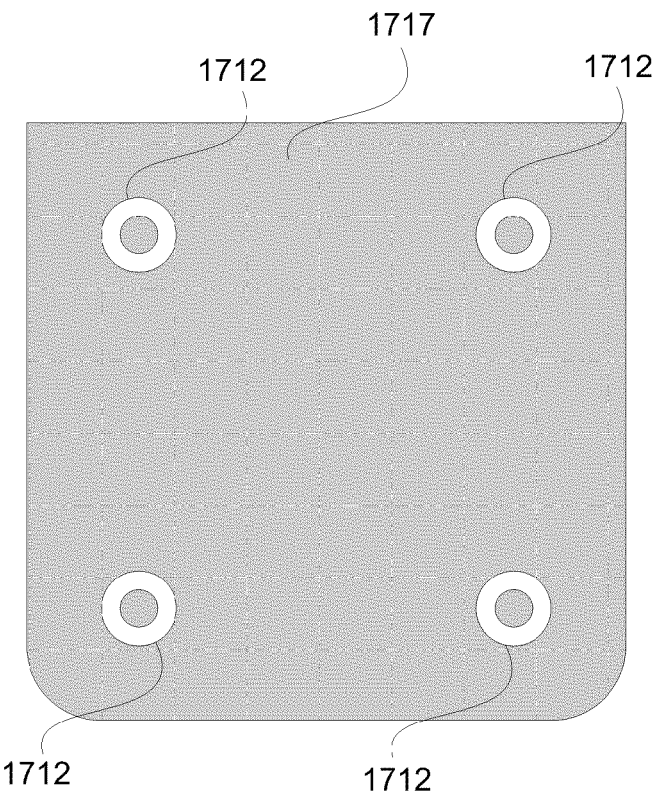
FIG. 17 illustrates a configuration for a back face of a mobile computing device, under an embodiment.

FIG. 17 depicts a configuration for a back face of an MCD, under an embodiment. In one embodiment, a housing surface (i.e. back façade 1717) of the MCD is provided with material that is attracted to magnetic materials. However, to enable the device to be portable and unaffected, an embodiment provides that no magnetic material is provided on the MCD (so as to avoid, for example, collection of debris). Rather, an embodiment provides that the back façade 1717 of the MCD includes ferrous tabs 1712. The ferrous tabs 1712 may be provided on or near an exterior of the back façade 1717. For example, some ferrous material may be combined with a thickness of the housing shell, or glued to an exterior of the housing shell. Various spatial arrangements may be provided for the ferrous tabs 1712. For example, the distribution of the ferrous tabs 1712 may correspond to various geometric shapes. Alternatively, a portion of the back façade 1717 may include a ferrous layer or thickness.

Figure 18:
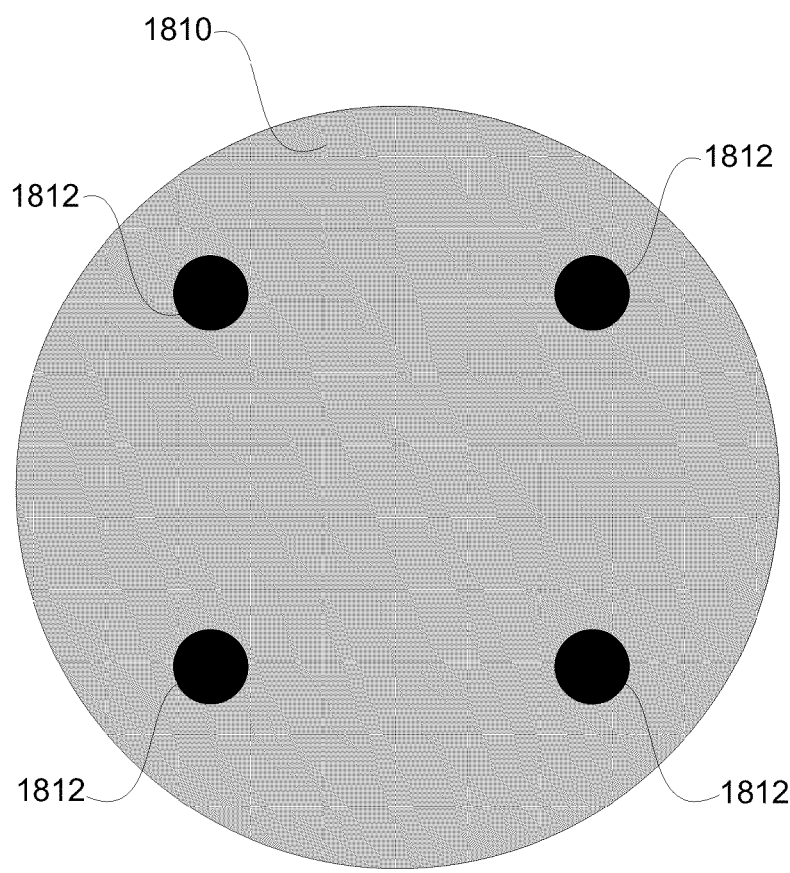
FIG. 18 illustrates a top view of a receiving surface for a dock that includes an arrangement of magnets, under an embodiment.

FIG. 18 depicts a top view of a receiving surface for a dock that includes an arrangement of magnets. In an embodiment, a receiving surface 1810 of the dock includes an arrangement of magnets 1812. In this way, the receiving surface is able to provide a magnetized landing space for receiving and docking with the back façade 1717 (FIG. 17) of the MCD. The receiving surface 1810 may use magnets and/or surface or mechanical features in order align and hold the back façade 1717 of the MCD. In particular, the alignment may make effective the magnetic clasping between magnets 1812 and the ferrous tabs 1712. Among other objectives, in one embodiment, a user may simply place the back façade 1717 on the retention surface in order to make effective the magnetic coupling.

With reference to FIG. 17 and FIG. 18, one or more embodiments provide for the use of an inductive signal path to transfer power and/or data between the two devices. The inductive signal path may be enabled by embedding coils and related components within the back façade 1717 of the MCD and the receiving surface 1810 of the dock. Thus, inductive signal transmission may be enabled through use of magnetic mechanical coupling, as shown and described.

Figure 19:
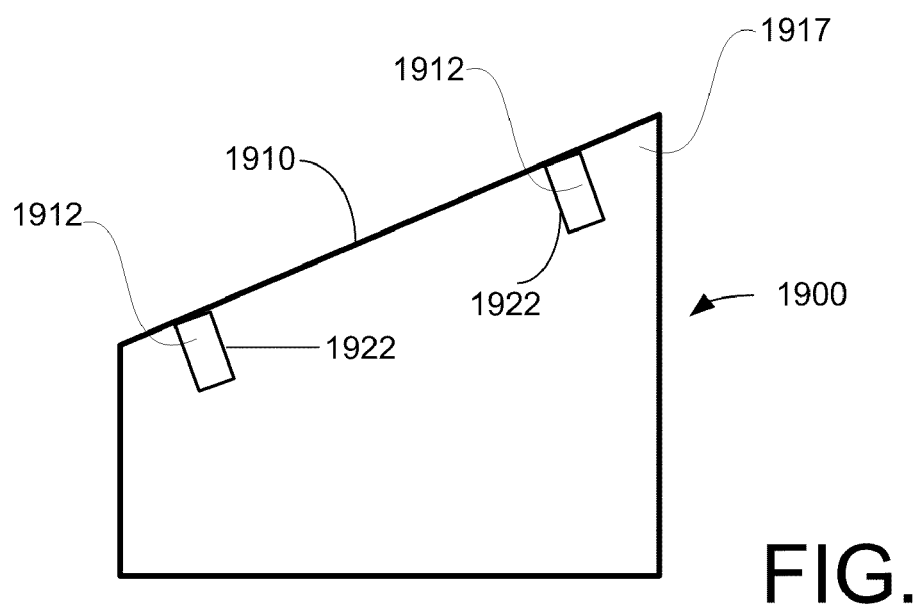
FIG. 19 illustrates a side cross-sectional view of a dock with an arrangement of magnets, under another embodiment.

FIG. 19 is a side cross-sectional view of a dock 1900 with magnets 1912 for providing the receiving surface 1910, under an embodiment. The magnets 1912 may be provided in apertures or openings 1922 just under the receiving surface 1910. This enables the receiving surface 1910 to be smooth, while at the same time enables the receiving surface 1910 to receive and magnetically retain the MCD when it is placed on the receiving surface. A body 1917 of the dock 1900 may align the receiving surface 1910 to receive the back façade 1717 (see FIG. 17) of the MCD. In one implementation, the receiving surface 1910 may be slanted at least partially in a vertical direction, although alternative variations may provide for the receiving surface to be horizontal.

One benefit of using magnetic coupling is that magnets can be distributed to retain the MCD in a manner that enables both (i) multiple coupled orientations (e.g. four positions, eight positions), and (ii) self-alignment of the MCD in one of the multiple possible orientations. In particular, the magnet or ferrous material arrangements may be configured in order to attract the MCD to a particular orientation, and repel it from orientations that are in between attracted positions. Thus, discrete orientations are enabled, and the devices may use magnetic forces to "self-align". By enabling the MCD to occupy different orientations when docked, orientation-dependent functionality, such as described below and with embodiments of FIG. 15, and FIG. 16A through FIG. 16C, may be enabled.

With magnetic coupling, alignment of the desired regions on the back façade 1717 of the mobile computer and the receiving surface 1910 of the dock 1900 are desirable, because the alignment betters or makes effective the magnetic forces to achieve the coupling. Mechanical geometry may be used to achieve desired precision in alignment when two devices are mated, so that the two mated surfaces are aligned for the magnetic coupling to be effective. While embodiments contemplate non-magnetic, mechanical features for use in aligning and/or supporting the MCD in a docked position with use of magnets, the use of non-magnetic features to facilitate magnetic coupling may have some undesirable results. Specifically, surface features and mechanical retention features to facilitate magnetic alignment may preclude or inhibit the ability of the user to after the position of the MCD when docked (as desired with, for example, embodiments of FIG. 15). Additionally, surface features and mechanical retention features prevent the receiving surface of the dock from having a smooth and aesthetically appealing surface.

In order to facilitate alignment, it is also possible to use strong magnets on both the receiving surface 1910 and the back façade 1717 of the MCD. However, for many applications, the containment of magnets in the MCD is undesirable (e.g. for devices that are carried in pockets of persons). Using magnets on both sides allows magnetic polarity to further restrict the allowable orientations for the placement of the MCD on the dock.

Figure 20:
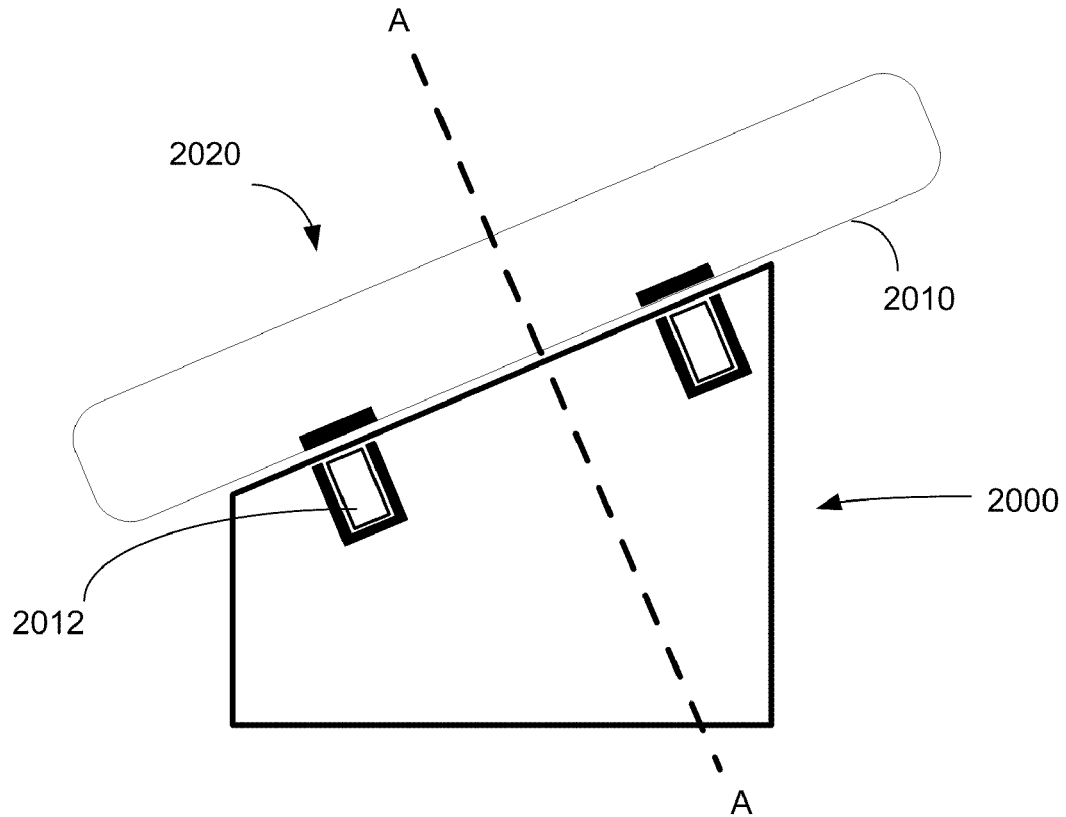
FIG. 20 illustrates a mobile computing device docked onto a dock using magnetic clasping, under an embodiment.

FIG. 20 illustrates a MCD 2020 docked onto the dock 2000 using magnetic clasping, according to another embodiment. In the example provided, the MCD 2020 is assumed to have a portrait orientation, although alternative orientations are possible (e.g. landscape, 45 degrees from vertical, 30 or 60 degrees from vertical), particularly when magnetic clasping is used. In an embodiment shown, the dock 2000 includes using magnets 2012 in anyone of the configurations described to retain the MCD 2020.

Because the backing material 2010 of the MCD 2020 attaches to the dock 2000 via magnetic clasping rather than mechanical latching, the receiving surface of the backing material 2010 may be made relatively smooth. For example, the backing material 2010 and/or the surface of the dock 1910 (from FIG. 19) may be made of a slippery material such as Teflon, PFA, FEP, Acrylic, Dacron, Nylon, PVC, fluoropolymers, and/or Rulon. Thus, the user may dock the MCD 2020 by simply placing the backing material 2010 of the device onto the receiving surface 1910 of the dock 2000.

Figure 21:
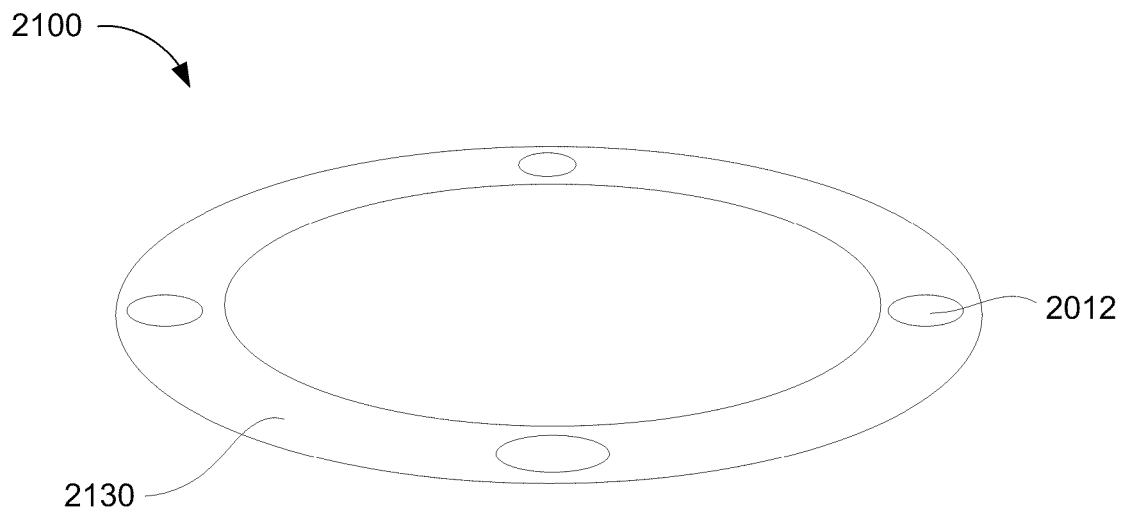
FIG. 21 illustrates a perspective view of a ring interface for a magnetic clasp, according to an embodiment.

FIG. 21 illustrates a perspective view of a ring interface for a magnetic clasp, according to an embodiment. The magnetic clasp 2100 includes four magnets 2012 (also depicted in FIG. 20) that are positioned in a circular configuration around a ring 2130. The magnetic clasp 2100 may be implemented on a corresponding dock 2000 (FIG. 20), such that when the backing material 2010 (FIG. 20) of a MCD 2020 (FIG. 20) makes contact with the dock 2000, the magnets 2012 "lock on" (i.e., are attracted to) a ferrous ring (and/or plates) on a housing of the MCD 2020 to hold the device in place.

While in contact with the dock 2000, the MCD 2020 may be re-oriented to a desired presentation (e.g., either portrait or landscape). For example, the ferrous ring on the backing material 2010 may be rotated in a circular manner, over the magnetic clasp 2100, while in constant overlap with the ring 2130 (i.e., while maintaining contact with each of the four magnets 2012). According to an embodiment, the magnetic clasp 2100 may be flush with the receiving surface 1910 (FIG. 19) of the dock 2000 (FIG. 20). Alternatively, the magnetic clasp 2100 may protrude from the receiving surface 1910 to allow for easier alignment and/or contact with the ferrous ring of the housing of MCD 2020.

Figure 22:
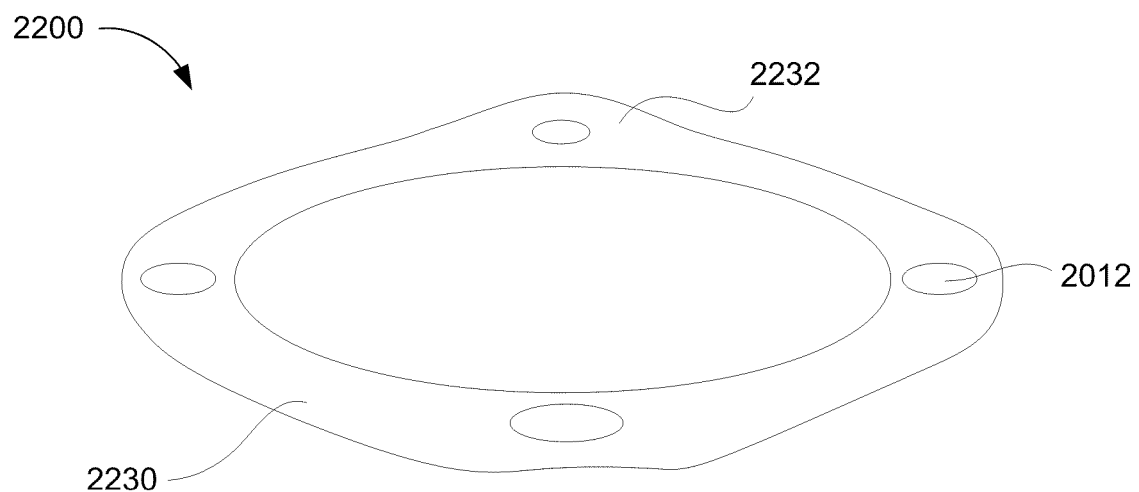
FIG. 22 illustrates a perspective view of a ring interface with mechanically proud areas, according to an embodiment.

FIG. 22 illustrates a perspective view of a ring interface with mechanically proud areas, according to an embodiment. The magnetic clasp 2200 is similar to the magnetic clasp 2100 (FIG. 21), with the exception that the ring 2230 includes four mechanically "proud" regions 2232, surrounding each of the four magnets 2012. These proud regions 2232 provide a larger surface area for which the housing of the MCD 2020 may make contact with the magnets 2012. In addition, the ratchet-like design of the magnetic clasp 2200 may be useful in orienting or positioning the MCD 2020 relative to the dock 2000.

In the embodiments shown in FIGS. 21 and 22, the four magnets 2012 are positioned equidistant to one another, in a "diamond" (or "square") formation. However, the spacing and/or positioning of the magnets 2012 may vary depending on device configuration. For example, in alternative embodiments, any of the following geometric configurations may be used: (i) with one magnet in each of the upper left, upper right, lower left, and lower right orientations; (ii) in a trapezoidal formation; and (iii) with a combination of two magnets (positioned 180 degrees apart) and four magnetic tabs spaced evenly around the ring 2130.

When docked, one or more embodiments provide for conveyance of power signals from the dock to the MCD 2020 (FIG. 20) through use of conductive or inductive signal paths, such as described with other embodiments. In addition to the power signals, one or more embodiments provide for conveyance of data concurrently with or through use of the power signal. Still further, in the docked position (and shortly thereafter), the MCD 2020 (FIG. 20) and the dock 2000 (FIG. 20) may communicate data using a local wireless communication link.

Figure 23:
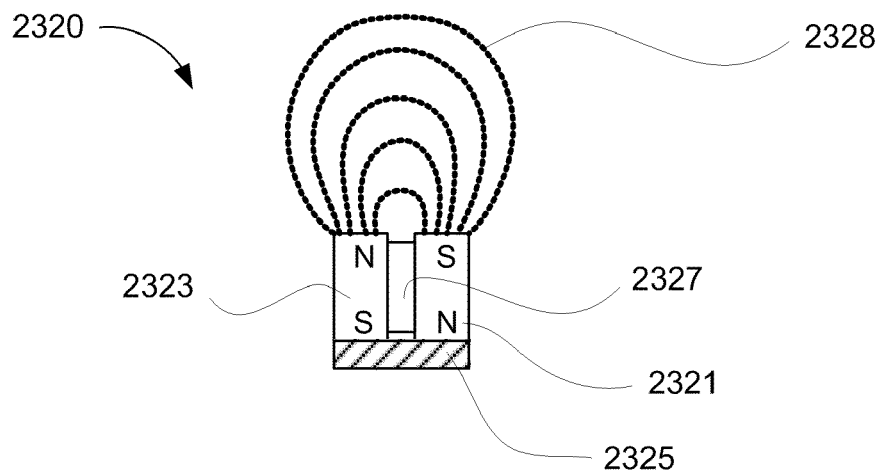
FIG. 23 illustrates an embodiment of a magnetic element which may be used for magnetic clasping, under an embodiment.

FIG. 23 illustrates an embodiment of a magnetic element which may be used for the magnetic clasping as described in any of the above embodiments. The magnetic element 2320 is made up of two bar magnets, 2321 and 2323, provided on top of a base layer 2325. The base layer 2325 may be constructed of a low reluctance material, to allow high magnetic permeability. The bar magnets 2321 and 2323 are separated by a non-magnetic spacer 2327, and are arranged in parallel with opposite polarities facing up. For example, the magnet 2321 is oriented with its "north" pole facing the base layer 2325, and its "south" pole facing upward. In contrast, the magnet 2323 is oriented with its "south" pole facing the base layer 2325, and its "north" pole facing upward. Thus, the magnetic element 2320 effectively functions as a "horseshoe" (or U-shaped) magnet. In certain embodiments, one of the bar magnets 2321 or 2323 may be longer (or shorter) than the other.

The magnetic element 2320 may correspond to, and therefore perform the functions of, any of the magnets 1912 (See e.g. FIG. 19) in the embodiments described above. As described in greater detail below, the magnetic properties of the magnetic element 2320 provide several advantages when magnetically clasping a MCD 2020 to a dock 2000. For example, the pairing of two bar magnets in parallel yields a much stronger magnetic attraction (e.g., double the magnetic force of a single bar magnet).

The horseshoe configuration further allows for the magnetic field 2328, emanating from the magnetic element 2320, to be more locally concentrated (i.e., towards the top of the magnetic element 2320). Reducing the overall spread of the magnetic field 2328 may, in turn, mitigate the occurrence and/or effects of magnetic interference in the dock 2000 and the MCD 2020.

For example, magnetic fields produced by the magnets 1912 (See FIG. 19) may induce undesired currents in the electrical components of the MCD 2020 (FIG. 20) and/or the dock 2000 (FIG. 20). This issue may be further complicated during communications between the MCD 2020 and the dock 2000, especially when the dock inductively communicates with the MCD. Because such communications depend on inducing an electromotive force (EMF), changes in the induced EMF (e.g., caused by magnetic fields from the magnets 1912 may after or adversely affect the data being communicated. Localizing the magnetic field 2328 produced by the magnets 1912 may thus allow for more robust communications between the MCD 2020 and the dock 2000.

It should be noted that, in certain embodiments described herein, the horseshoe magnet assembly 2320 may be substituted for an "actual" horseshoe magnet. The actual horseshoe magnet may be unitarily constructed from a single piece of magnetized material. For example, the actual horseshoe magnet may correspond to a single bar magnet that is bent or formed into the U-shape configuration.

Figure 24:
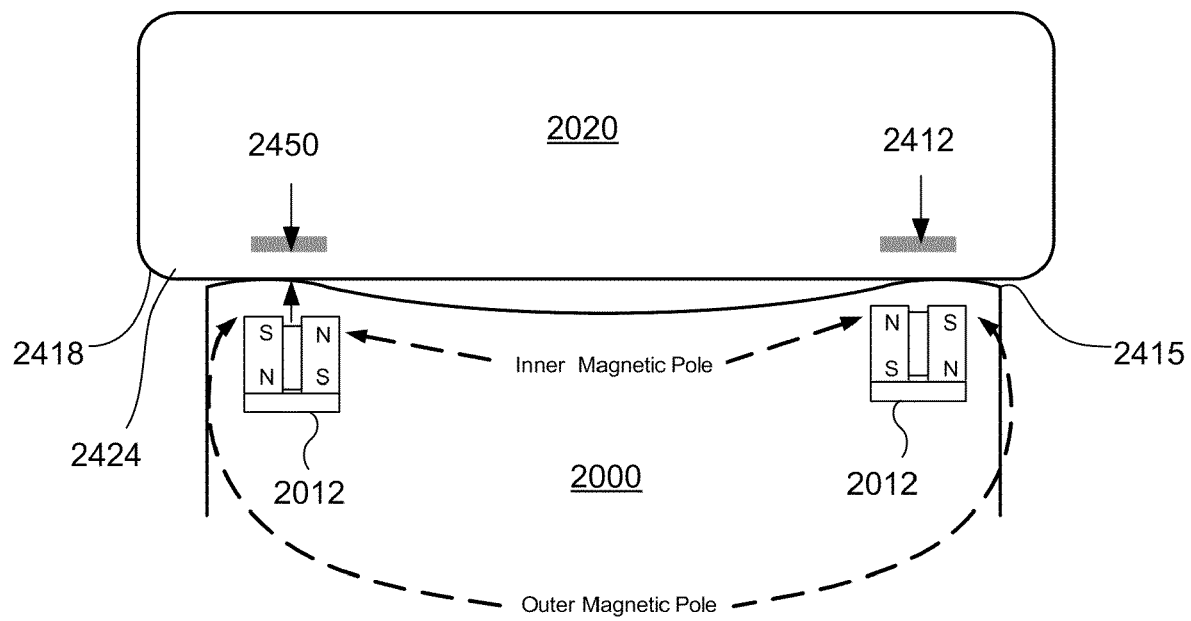
FIG. 24 illustrates a cross-sectional view of a dock and a mobile computing device, under an embodiment.

FIG. 24 illustrates a cross-sectional view of the dock 2000 and MCD 2020 along lines A-A of FIG. 20, according to one or more embodiments. The dock 2000 may include magnets 2012 that have a horseshoe or U-shape configuration. In alternative embodiments, the horseshoe magnet assemblies 2012 may be substituted for actual horseshoe magnets.

In the particular arrangement shown, the inner magnetic poles of the magnets 2012 have the same polarity, and the outer magnetic poles of the magnets 2012 have the same polarity. For example, the magnets 2012 are configured such that each of the inner bar magnets are oriented with their north poles facing upward, and each of the outer bar magnets are oriented with their south poles facing upward. Alternatively, the inner bar magnets may be oriented such that their south poles face upward, and the outer bar magnets may be oriented such that their north poles face upward.

The configurations for the embodiments described, with respect to FIG. 24, have several advantages. For example, the horseshoe configurations of the magnets 2012 provide a very strong attractive force (e.g., double the magnetic force of a single bar magnet). Thus, ferrous tabs 2412 may be set further from a surface of MCD housing 2418, to allow a substantial gap 2450 between the ferrous tabs 2412 and the receiving surface 2415 (FIG. 24) of the dock 2000 (FIG. 20) when a surface of the MCD housing 2418 is brought into contact with the receiving surface 2424 of the dock 2000.

The deeper placement of the ferrous tabs 2412 may allow for more versatility in the overall design and construction of the housing 2418 and/or the MCD 2020. For example, the ferrous tabs 2412 may be substantially hidden (or "invisible") when viewed from the outside of the housing 2418. Furthermore, the surface of the housing 2418 may be constructed to be substantially uniform and/or flush with an outer façade of the MCD 2020.

Additionally, configuring the magnets 2012 (FIG. 20) such that their inner magnetic poles are all of the same polarity results in a lower DC magnetic flux through the center of the device. For example, if the magnets 2012 were arranged such that the inner magnetic poles have opposite polarities (e.g., one with north facing up and the other with south facing up), then a magnetic field would be created across the center of the dock 2000, from one of the magnets 2012 to the other. As described above, the magnetic flux through the center of the device could have an adverse effect on other circuitry within in the dock 2000 and/or the MCD 2020. Thus, the arrangement of magnets 2012, in the current embodiment, provide for more robust communications within (and between) the dock 2000 and/or the MCD 2020.

In alternative embodiments, the horseshoe magnet assemblies (or actual horseshoe magnets) may be implemented on both the dock 2000 and the MCD 2020 (e.g., in lieu of ferrous tabs). In addition to the advantages already described above, with respect to FIG. 36, such embodiments provide for a much stronger magnetic coupling between the dock 2000 and the MCD 2020. Accordingly, this allows the corresponding magnets in the dock 2000 and the MCD 2020 to be set even further apart (i.e., further from the surfaces of their respective housings) while continuing to maintain a relatively strong magnetic association with one another.

In another embodiment, the receiving surface 2015 may be contoured inward. The back façade 2424 of the MCD 2020 may include ferrous tabs 2412 that align with horse-shoe magnets. The result may include a magnetic coupling such as described with any of the embodiments provided herein.

Sticky-Back Accessory Device

Figure 25:
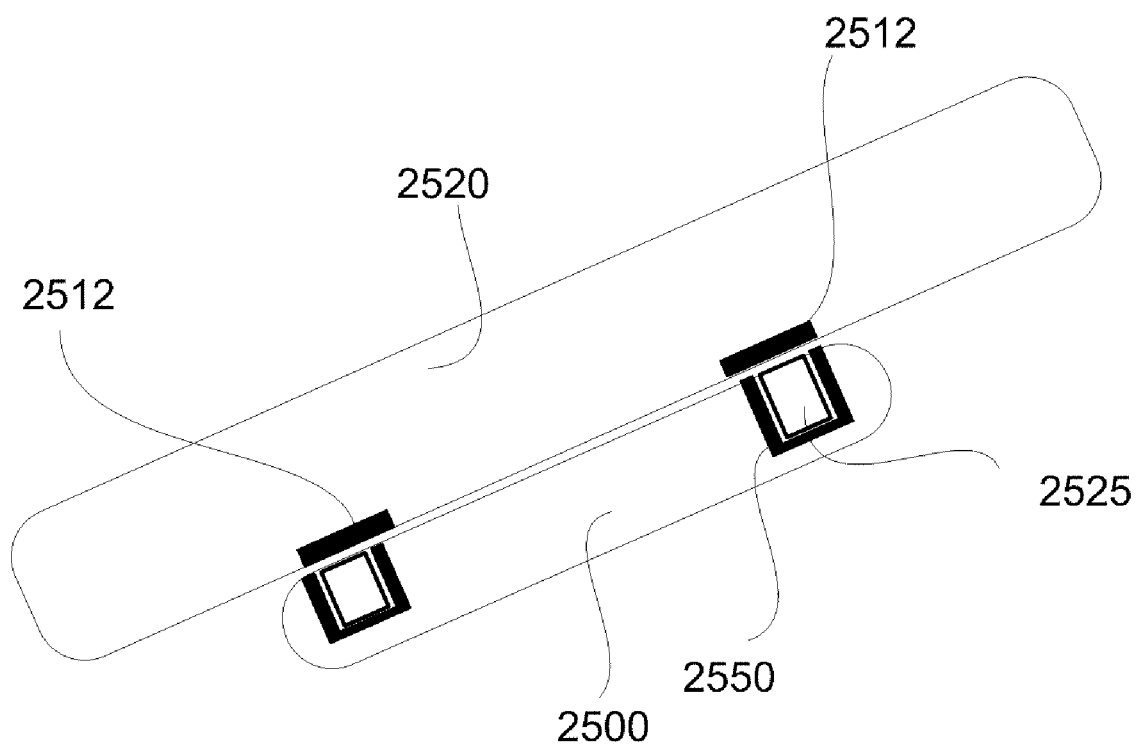
FIG. 25 illustrates an embodiment in which the mobile computing device may couple to a sticky-back accessory device.

While numerous embodiments described above provide for the dock to serve as a base for the MCD, FIG. 25 illustrates an embodiment in which the MCD 2520 may couple to a sticky-back accessory device 2500 across an inductive signal interface, in accordance with other embodiments described herein. In an embodiment, magnetic cups 2550 may contain magnets 2525 on or near a mating surface of the accessory device 2500. For example, the magnets 2525 may correspond to horseshoe magnet assemblies (or actual horseshoe magnets), as described in any of the above embodiments. As with other embodiments, tabs 2512 may be provided on the façade (such as shown with housing 2418 as shown in FIG. 24) of the MCD 2520. The sticky-back accessory device 2500 may magnetically clasp to the back side of the MCD 2520 and thus function as a portable accessory for use with the MCD 2520. Functionality and features described with any of the embodiments above may apply to the construction and use of the accessory device 2500.

Portable Power Supply and Holster Applications

According to some embodiments, a portable power supply device may include resources to inductively signal power to another computing device. In an embodiment, a portable power supply device is provided as an accessory to both carry and charge the mobile computing device (MCD). As described herein, such a portable power supply device may include an inductive signal interface (as described with one or more other embodiments) to inductively signal power to a MCD that is carried or otherwise retained by the portable power supply device.

Figure 26:
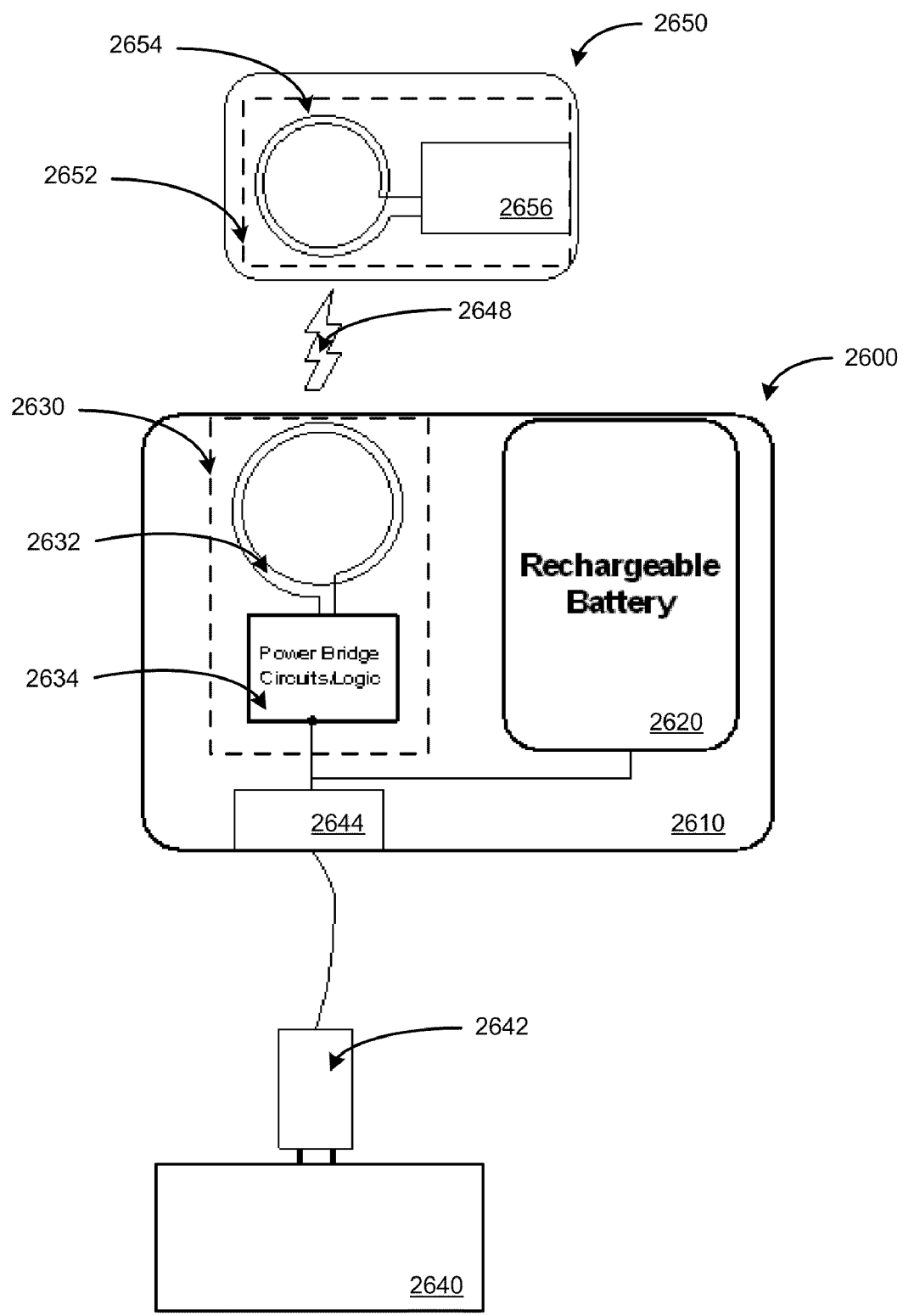
FIG. 26 illustrates a power supply device, according to an embodiment.

FIG. 26 illustrates a power supply device, according to an embodiment. A power supply device 2600 includes a housing 2610 including a power supply unit (shown as rechargeable battery module 2620), and an inductive signal interface 2630. The inductive signal interface 2630 includes one or more coils 2632 and circuits/logic 2634 that includes power bridge circuitry (such as described with prior embodiments). The inductive signal interface 2630 is operable to generate an inductive power signal 2648. The power supply device 2600 is constructed to be both portable (so as to be carried on the person) and capable of carrying or retaining a mobile computing device (MCD) 2650. In FIG. 26, the MCD 2650 is shown to be inductively coupled with the power supply device 2600 when carried or otherwise retained by the power supply device 2600. The MCD 2650 is compatible; i.e., it includes a corresponding inductive signal interface 2652 comprising one or more coils 2654 and power bridge circuitry 2656. The inductive signal interface 2652 of the MCD 2650 can handle the incoming inductive power signal 2648. The housing 2610 may be provided in various configurations. Some of these configurations include: (i) a structure that latches or actively retains the MCD 2650 in an inductively engaged position; or (ii) a pouch or pocket to hold the MCD 2650.

The power supply device 2600 is capable of receiving power from an external power source 2640. For example, a power adapter 2642 may be used to receive power from a wall adapter. The power from the external power source 2640 may be used to recharge the battery module 2620. In some embodiments, the power supply device 2600 is capable of supplying power from the external source to the MCD 2650. A power input interface 2644 may handle power from the external power source 2640 and route the power to the MCD 2650 under designated conditions.

In operation, the power supply device 2600 discharges power from the rechargeable battery module 2620 to the MCD 2650 using the inductive signal interface 2630. The power supply device 2600 may also supply power from the external power source 2640 to the MCD 2650 (or to the rechargeable battery module 2620) when the external power source 2640 is connected and the MCD 2650 is retained by the housing 2610.

Figure 27:
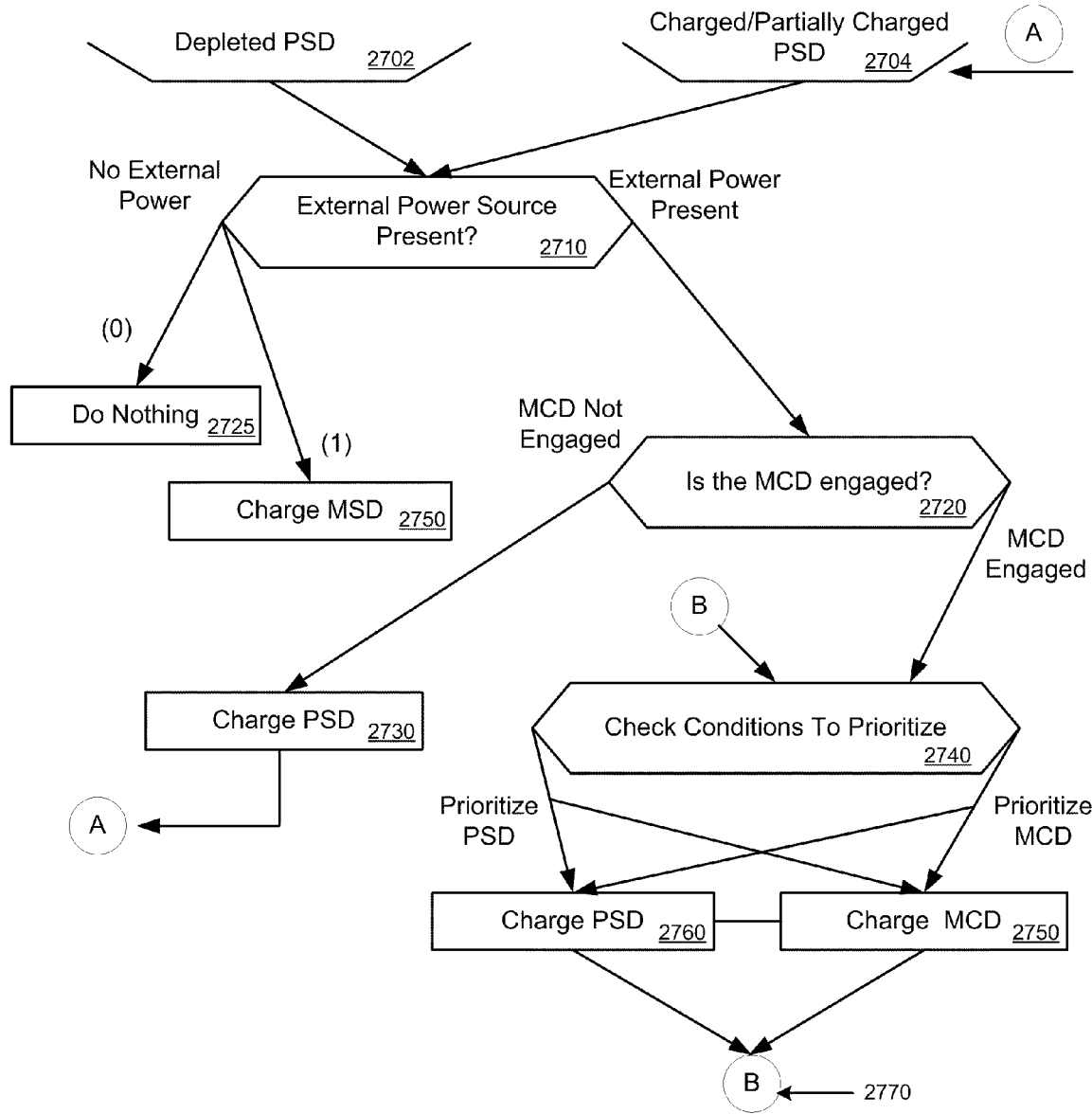
FIG. 27 illustrates a method for operating a power supply device, according to an embodiment.

FIG. 27 illustrates a method for operating the power supply device, according to one or more embodiments. In describing a method of FIG. 27, reference is made to elements of FIG. 26 for purpose of illustrating suitable elements or components for implementing a step or sub-step being described.

A method such as described by FIG. 27 may initiate with the power supply device 2600 in one of at least two states: depleted state 2702 (where power supply device 2600 carries insufficient charge to charge MCD 2650); or fully/partially charged state 2704. Under one embodiment, the power supply device 2600 repeatedly makes two determinations independent of one another. In step 2710, the power supply device 2600 determines whether the external power source 2640 is present. This determination corresponds to, for example, whether a wall adapter of the power supply device 2600 is plugged into an outlet.

In step 2720, a determination is made as to whether the MCD 2650 is engaged with the power supply device 2600. By being engaged, the MCD 2650 is retained by the power supply device 2600, and the inductive signal interface 2652 of the MCD 2650 is positioned proximate (or sufficiently proximate) to the inductive signal interface 2630 of the power supply device 2600 (so as to be able to inductively signal power to the MCD 2650). The determinations of step 2710 and 2720 may be made independent of one another. More specifically, the determination as to whether the power supply device 2600 is receiving power from the external power source 2640 (step 2710) may be performed independent of the determination as to whether the MCD 2650 is engaged with the power supply device 2600 (step 2720). In one implementation, the steps are performed repeatedly as checks for external power source 2640 or the MCD 2650. For brevity, the determination as to whether MCD 2650 is engaged is shown to follow the determination as to whether external power source 2640 is connected to the power supply device 2600. However, this is not a requirement.

If external power source is not detected (step 2710), and the power supply device 2600 is initially depleted (step 2702), then no further steps are performed until the external power source 2640 is detected (step 2725).

If external power source is not detected (step 2710), the power supply device 2600 is initially charged (step 2704), and power supply device 2600 makes the determination that MCD 2650 is engaged (step 2720), then step 2750 provides that the charge of the power supply device 2600 is used to charge the MCD 2650. This may correspond to one of the primary usage scenarios for the power supply device: the user charges the rechargeable battery module 2620 of the power supply device 2600, and engages the MCD 2650 with the power supply device 2600 (e.g. as a carrying holster) to recharge or maintain charge on the MCD 2650.

If the external power source is detected (step 2710), but the MCD 2650 is not engaged (step 2720), then step 2730 provides that the power supply device 2600 uses the incoming power from the external power source 2640 to recharge its battery module 2620. For example, the user may separately charge the power supply device 2600 and MCD 2650. Supplying power to the power supply device 2600 places or maintains the power supply device 2600 in partial or fully charged state 2704.

If the external power source is detected (step 2710), and the MCD 2650 is engaged (step 2720), then according to some embodiments, a prioritization scheme is enabled to distribute the incoming power signal between the power supply device 2600 and the MCD 2650. For example, in a simple prioritization scheme, the MCD 2650 is fully charged first (step 2750), and then the power supply device 2600 is charged in step 2760. In a more intelligent or complex scheme, a determination is made in step 2740 to check conditions for supplying some or all of the incoming power to the MCD 2650. The conditions may be predetermined, set by design parameters and/or set by user preference. As described with prior embodiments, the conditions may correspond to, for example, a determination of voltage/current levels or needs of the MCD 2650. For example, the power supply device 2600 may be set to charge MCD 2650 first if the charge level of the MCD's batteries are below 50% (or some other charge level amount), or if the charge level of the MCD's battery module is less than that of the power supply device 2600. In one embodiment, if the power consumption conditions exist, at least some of the power is supplied to the MCD 2650 (step 2750). If the conditions do not exist (e.g., MCD 2650 is fully charged), then some or all of the incoming power is routed to the power supply device 2600 (step 2760). In an embodiment, the power consumption conditions of the power supply device 2600 are repeatedly checked (step 2770) to ensure the optimal implementation of the prioritization scheme.

According to some embodiments, once the MCD 2650 is determined to be engaged to the power supply device 2600 (step 2720), an inductive communication protocol is implemented so that the inductive transfer of power from the power supply device 2600 to the MCD 2650 is controlled and responsive to power requirements of the receiving device. As mentioned with some prior embodiments, the control protocol may be implemented by signaling data across the respective inductive signal interfaces of each of the power supply device 2600 and the MCD 2650. The data signaled inductively from the MCD 2650 may reflect current voltage/current/power values or needs. The communication protocol may also be implemented to determine whether the power consumption conditions of the MCD 2650 (step 2740) exist.

As an alternative to the inductive signal interfaces, data may be communicated from MCD 2650 to the power supply device 2600 through use of another communication medium, such as RF (e.g. Bluetooth).

The following example illustrates an embodiment such as described with FIG. 27. In one implementation, MCD 2650 is depleted in charge and holstered with the power supply device 2600. The power supply device 2600 transfers power from battery module 2620 to the MCD 2650 through inductive coupling. Subsequently, the combined device (the MCD 2650 holstered with power supply device 2600) is charged by interfacing the power supply device 2600 with a power outlet. The power input interface 2644 may route power from the outlet to the MCD 2650 directly, until the MCD 2650 is charged, or until the MCD 2650 is partially charged to some designated level. The power input interface 2644 may then route the input power to the battery module 2620 of the power supply device 2600.

As an alternative or variation to embodiments described with FIG. 26 and FIG. 27, one or more embodiments may provide for the power supply device 2600 to be configured to inductively receive power from another suitably configured device, such as a docking station described with any of the prior embodiments. Thus, the inductive signal interface 2630 can be used to both (i) receive power, in to order to supply power to the rechargeable batteries, and to supply power to the rechargeable battery module 2620; and (ii) deliver power from the rechargeable battery module 2620 to the MCD 2650. The act of receiving power inductively may be accomplished in any manner described with prior embodiments. For example, a real-time control protocol may be implemented in order to inductively receive power on the power supply device 2600.

Figure 36:
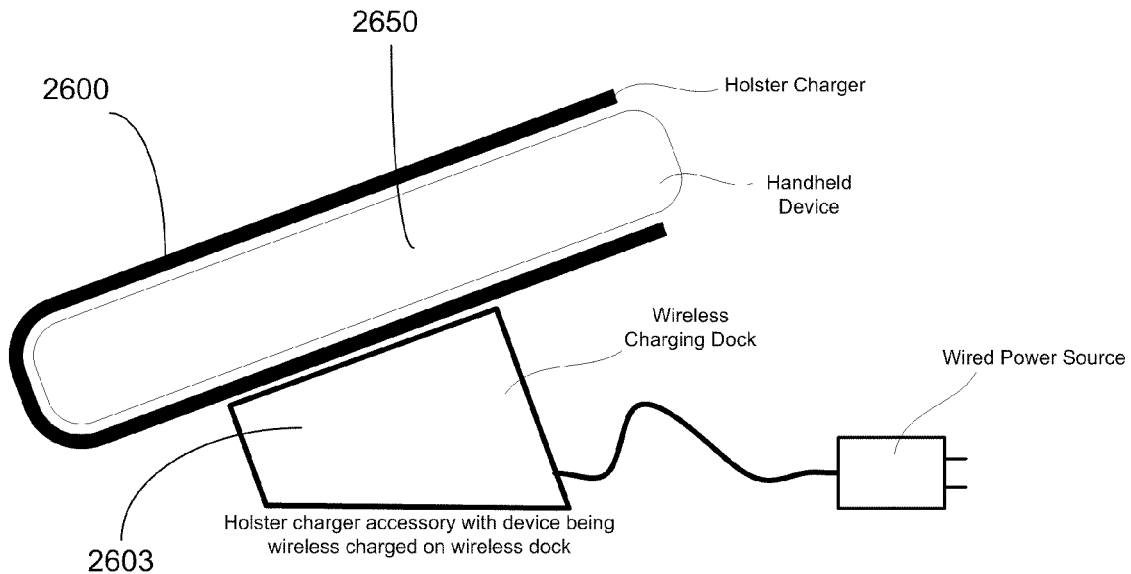
FIG. 36 illustrates an embodiment in which a power supply device is configured to concurrently and inductively receive and supply power to another device, according to an embodiment.

With reference to FIG. 36, the power supply device 2600 may inductively receive charge from another inductive docking station 2603 while retaining MCD 2650. In such an embodiment, the inductive signal interface 2630 of the power supply device is both receiver and supplier of power to the MCD 2650. More than one inductive signal interface and/or coil may be used on the power supply device to concurrently inductively receive and transmit power.

Figure 28A:
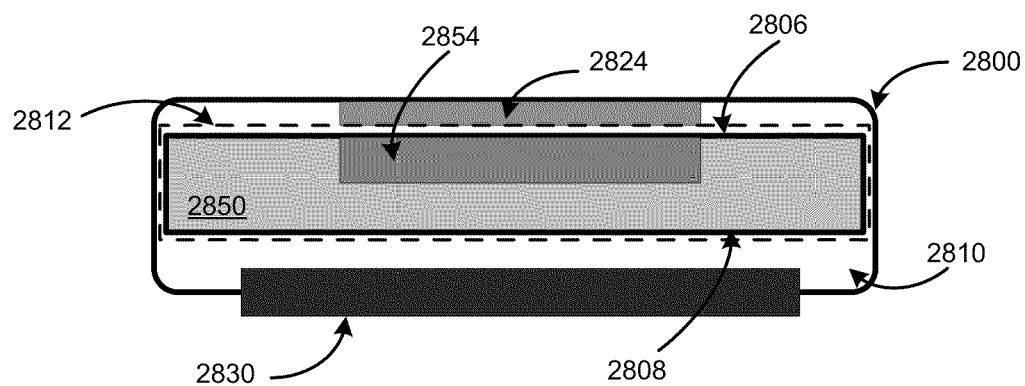
FIG. 28A illustrates a top cross-sectional view of a power supply device that retains and engages a mobile computing device, under an embodiment.
Figure 28B:
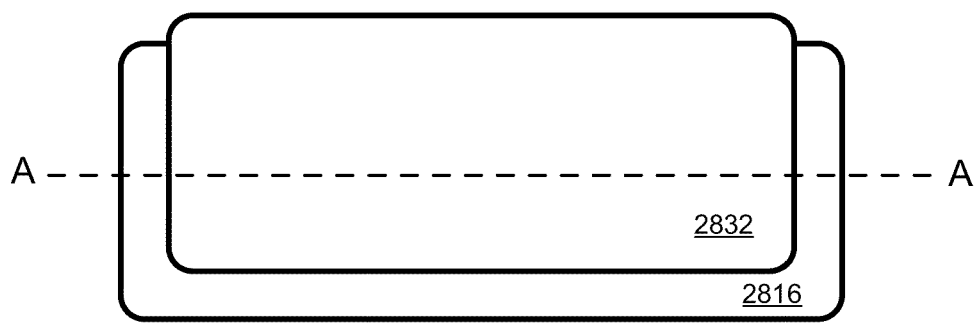
FIG. 28B illustrates a front view of a power supply device retaining a mobile computing device, under an embodiment.
Figure 28C:
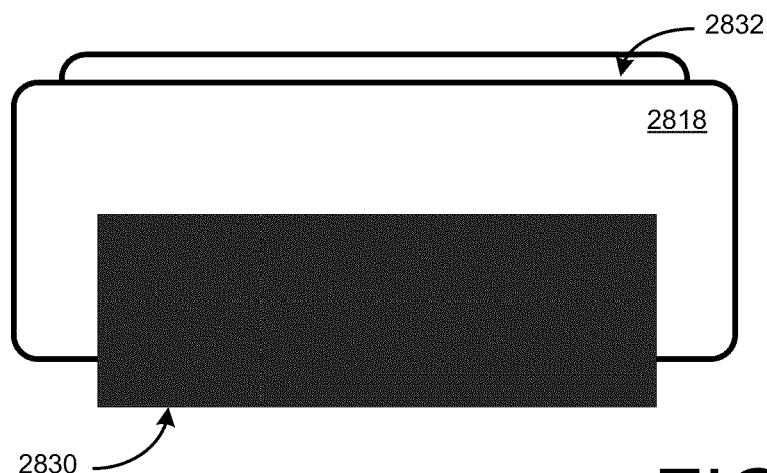
FIG. 28C illustrates a back view of the power supply device retaining the mobile computing device, as illustrated in FIG. 28B.

FIG. 28A through FIG. 28C illustrate a power supply device configuration, under an embodiment. FIG. 28A depicts a top cross-sectional view (along lines A-A of FIG. 28B) of a power supply device that retains and engages an MCD, according to some embodiments. In an embodiment, the power supply device 2800 is in form of a holster that includes a carriage 2810 as its structure for retaining the MCD 2850 in an inductively engaged orientation. A "carriage" refers to a structure that is used to carry another device (such as a mobile computing device). The carriage 2810 may have a pouch or pocket structure, having an opening 2812 to receive MCD 2850. In the configuration shown, the opening 2812 exceeds the length of the device, enabling the MCD 2850 to be inserted into the carriage 2810 sideways. In one implementation, carriage 2810 is formed from, for example, cloth, leather, rubber, plastic, vinyl, microfiber, polyurethane or from a combination of materials. In other implementations, the carriage 2810 is formed from a rigid material, such as plastic or metal.

According to some embodiments, the carriage 2810 includes carry-on features 2830 to enable the carriage to secure or clasp to a person that carries the carriage 2810. The carry-on features may correspond to a belt-strap, belt clip, clip-on, Velcro fastener or other holster type feature to enable some form of securement of the carriage 2810 to the person using it.

FIG. 28B and FIG. 28C illustrate front and back views of the carriage 2810 retaining MCD 2850. The inductive signal interface 2824 of the power supply device 2800 is integrated with a flap structure 2832 that is extendable from a back side 2818 of the carriage 2810, over the opening 2812, and into an engaged position with the MCD 2850. As an alternative, the flap structure 2832 does not exist. In an embodiment, as illustrated in FIG. 28A, the inductive signal interface 2824 of the power supply device 2800 is integrated with a front side 2816 of the carriage, oriented opposite to the carry-on features 2830.

Figure 28D:
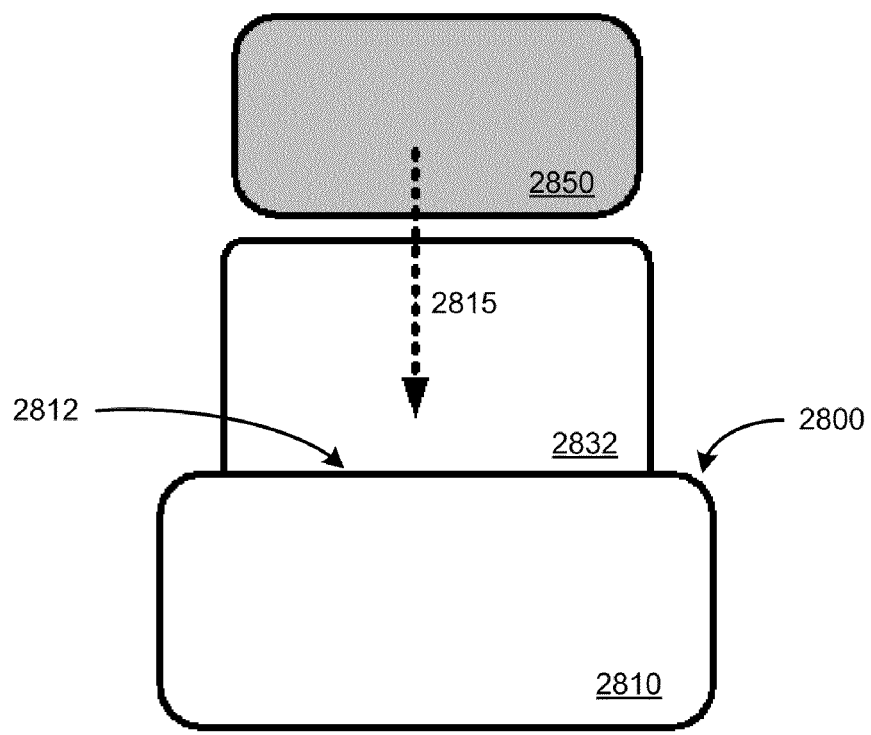
FIG. 28D illustrates a mobile computing device being inserted into the carriage of a power supply device, in an embodiment.
Figure 28E:
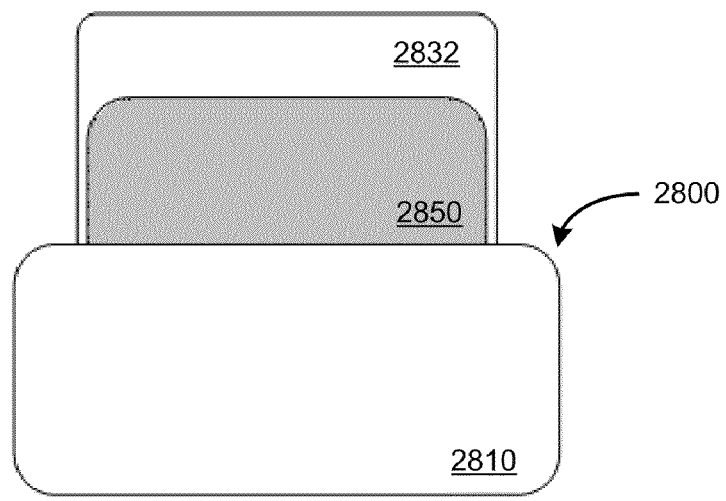
FIG. 28E illustrates another view of a mobile computing device being inserted into the carriage of a power supply device, in an embodiment.

FIG. 28D and FIG. 28E illustrate MCD 2850 being inserted into the carriage 2810 of the power supply device 2800. In an embodiment shown, flap structure 2832 is lifted to not occlude opening 2812. The MCD 2850 is inserted in direction 2815 and the flap structure 2832 is closed on top of the MCD 2850. As shown by embodiments illustrated in FIG. 32 and FIG. 33, the inductive signal interface of the power supply device may be carried on the inside of the flap structure to abut the rear façade of the MCD 2850. In another embodiment, as discussed above, the carriage 2810 does not include a flap structure 2832.

Referring back to FIG. 28C, carry-on features 2830 is provided at or near a back side 2818 of the carriage 2810. In a configuration illustrated in FIG. 28A, MCD 2850 is inserted into the carriage 2810 so that (i) its back face 2806 (or the face that includes the inductive coils) is faced outward, away from the user (or the carry-on features 2830); and (ii) its front face 2808 is oriented towards the user (or the carry-on feature 2830). In order for the MCD 2850 to be retained and engaged by the power supply device 2800, a respective inductive signal interface 2824 of the power supply device 2800 is oriented to abut or be positioned adjacent to the inductive signal interface 2854 of the MCD 2850 (as described with some prior embodiments, the inductive signal interface 2854 of the MCD 2850 may be provided on its rear façade).

Figure 29A:
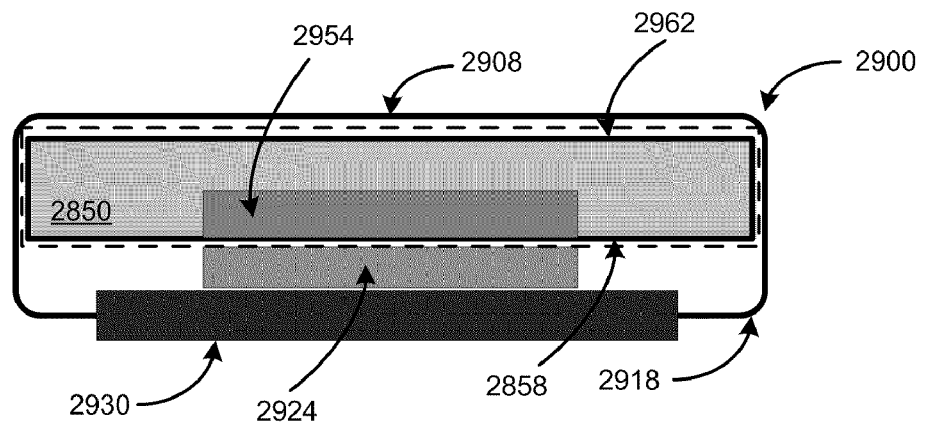
FIG. 29A is a side cross-sectional view of a power supply device including a mobile computing device, under an embodiment.
Figure 29B:
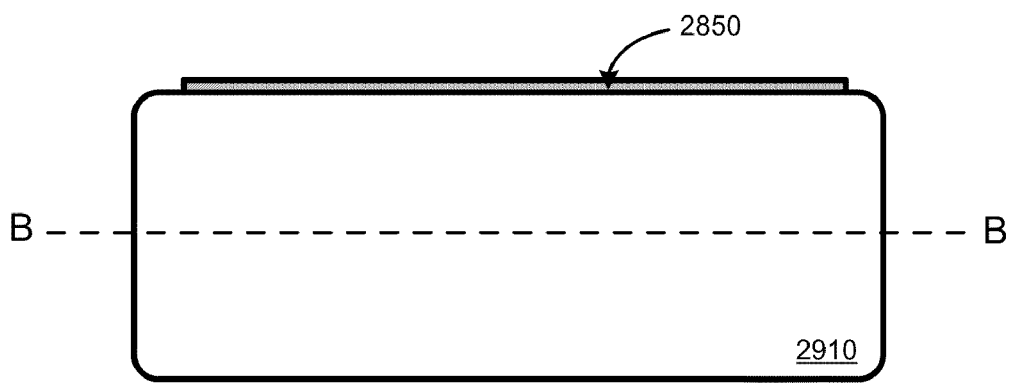
FIG. 29B illustrates a front view of the power supply device including the mobile computing device of FIG. 29A, in an embodiment.
Figure 29C:
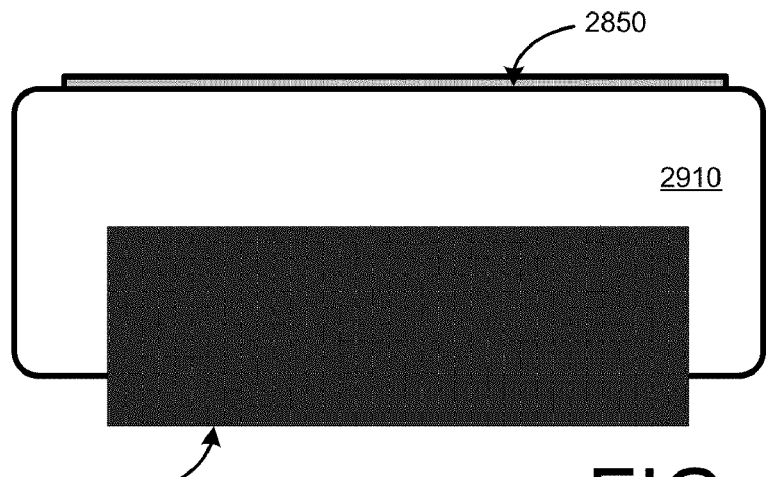
FIG. 29C illustrates a back view of the power supply device including the mobile computing device of FIG. 29A, in an embodiment.

FIG. 29A through FIG. 29C illustrate a power supply device in accordance with another embodiment. The power supply device includes an inductive signal interface, such as described with one or more prior embodiments. FIG. 29A is a side cross-sectional view of the power supply device 2900 including the MCD 2850, as cut along lines B-B of FIG. 29B. FIG. 29B and FIG. 29C illustrate respective front and rear views of the power supply device 2900. In one embodiment, the inductive signal interface 2924 of the power supply device 2900 is integrated with the back side 2918 of the power supply device 2900. The power supply device 2900 shown by FIG. 29A through FIG. 29C is constructed to receive and engage the MCD 2850 in an orientation in which (i) the MCD 2850 is positioned with its rear façade abutting the back side 2918 of the power supply device 2900, and (ii) the front façade 2962 of the MCD 2850 is oriented outward to abut a front face 2908 of the power supply device. This orientation would enable the inductive signal interface 2854 of the MCD 2850 to be positioned proximate (or sufficiently proximate) to the inductive signal interface 2924 of the power supply device 2900.

FIG. 29B and FIG. 29C also illustrate an embodiment of the power supply device without a flap structure. The power supply device includes an inductive signal interface, such as described with one or more prior embodiments. As illustrated in FIG. 29B and FIG. 29C, the carriage 2910 of the power supply device 2900 receives the MCD 2850 without the use of a flap structure (e.g., element 2832 in FIG. 28B). The power supply device 2900 can also include carry-on features 2930.

Figure 30A:
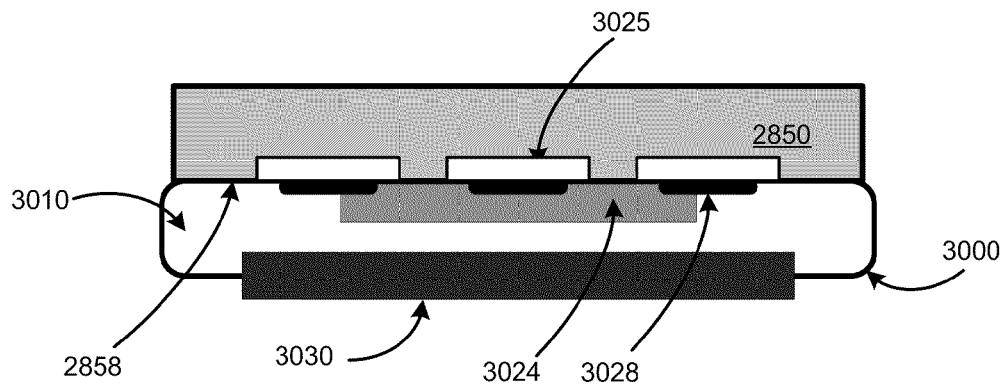
FIG. 30A is a side cross-sectional view of a power supply device including a mobile computing device, under an embodiment.
Figure 30B:
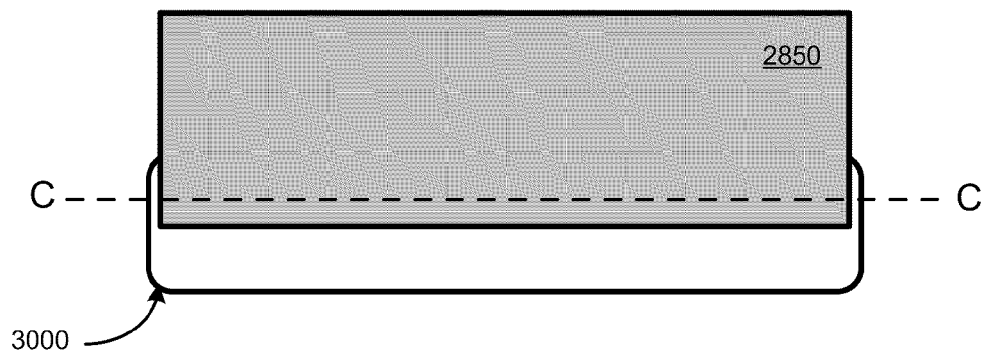
FIG. 30B illustrates a front view of the power supply device including the mobile computing device of FIG. 30A, in an embodiment.
Figure 30C:
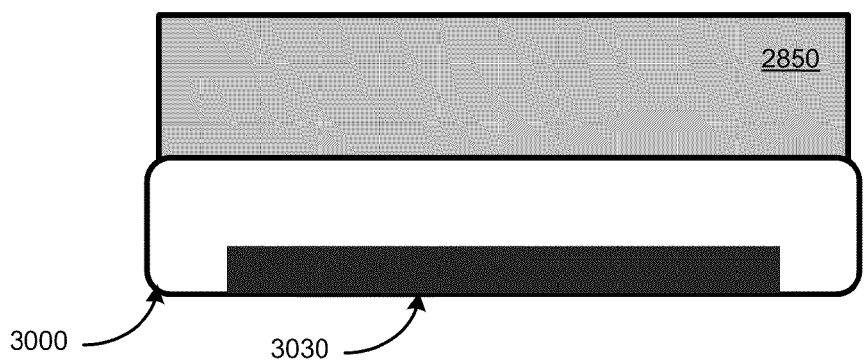
FIG. 30C illustrates a back view of the power supply device including the mobile computing device of FIG. 30A, in an embodiment.

FIG. 30A through FIG. 30C illustrate a power supply device in accordance with another embodiment. Similar to an embodiment of FIG. 29A through FIG. 29C, the power supply device includes an inductive signal interface. FIG. 30A is a side cross-sectional view of the power supply device 3000 including the MCD 2850, as cut along lines C-C of FIG. 30B. FIG. 30B and FIG. 30C illustrate respective front and rear views of the power supply device 3000. As shown, power supply device 3000 includes a retention structure 3010 that is not a pouch or pocket carriage. Rather, the retention structure 3010 includes coupling mechanisms that actively couple and retain the MCD 2850 in the engaged orientation. In one embodiment, the power supply device 3000 includes magnets 3028 that actively couple to ferrous or magnetic tabs 3025 on the back façade 2858 of MCD 2850. An inductive signal interface 3024 may be provided on a front side of the retention structure 3010. Carry-on features 3030, such as a belt-strap, belt clip, clip-on, Velcro fastener or other holster type feature, may be provided with the retention structure 3010 in order to enable the power supply device 3000 to be portable and carried on the person.

Figure 31A:
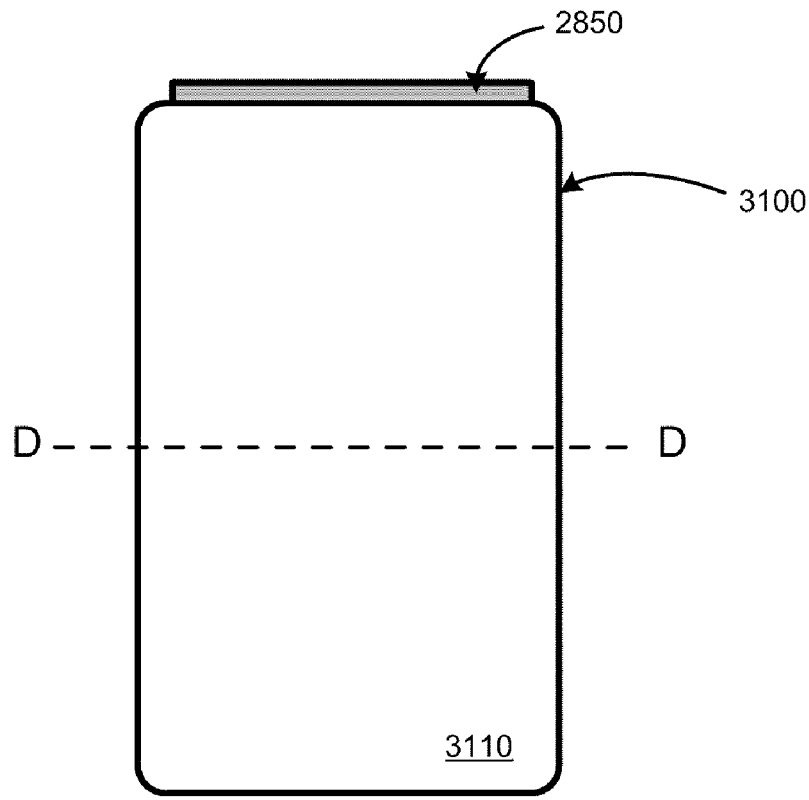
FIG. 31A illustrates a front view of a power supply device according to an embodiment.
Figure 31B:
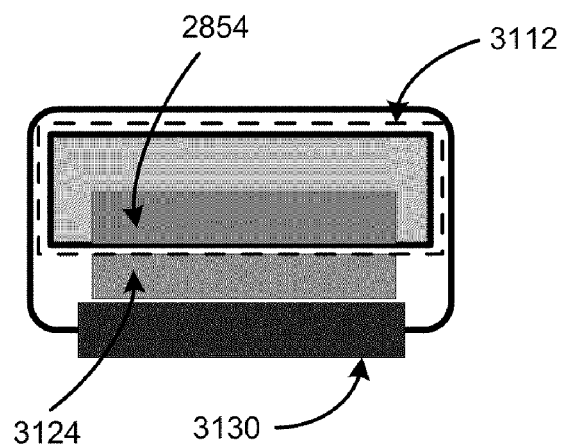
FIG. 31B is a cross-sectional view of the power supply device including a mobile computing device of FIG. 31A.

FIG. 31A is a front view illustrating a power supply device according to another embodiment. FIG. 31B is a cross-sectional view along lines D-D of FIG. 31A. In an embodiment, the power supply device 3100 includes a pocket carriage 3110 that receives the MCD 2850 in a given orientation. An opening 3112 of the pocket-carriage may include a form-factor or polarization structure to force the user to properly align the MCD 2850 before insertion into the pocket carriage 3110. In the example shown, MCD 2850 is inserted vertically in the opening 3112. When properly aligned, the inductive signal interface 2854 of the MCD 2850 is aligned to engage the inductive signal interface 3124 of the power supply device 3100.

As discussed above, the carriage 3110 of power supply device 3100 can also include carry-on features 3130, in an embodiment. The power supply device 3100 may also include a flap structure (see FIGS. 28A-28C).

Figure 32:
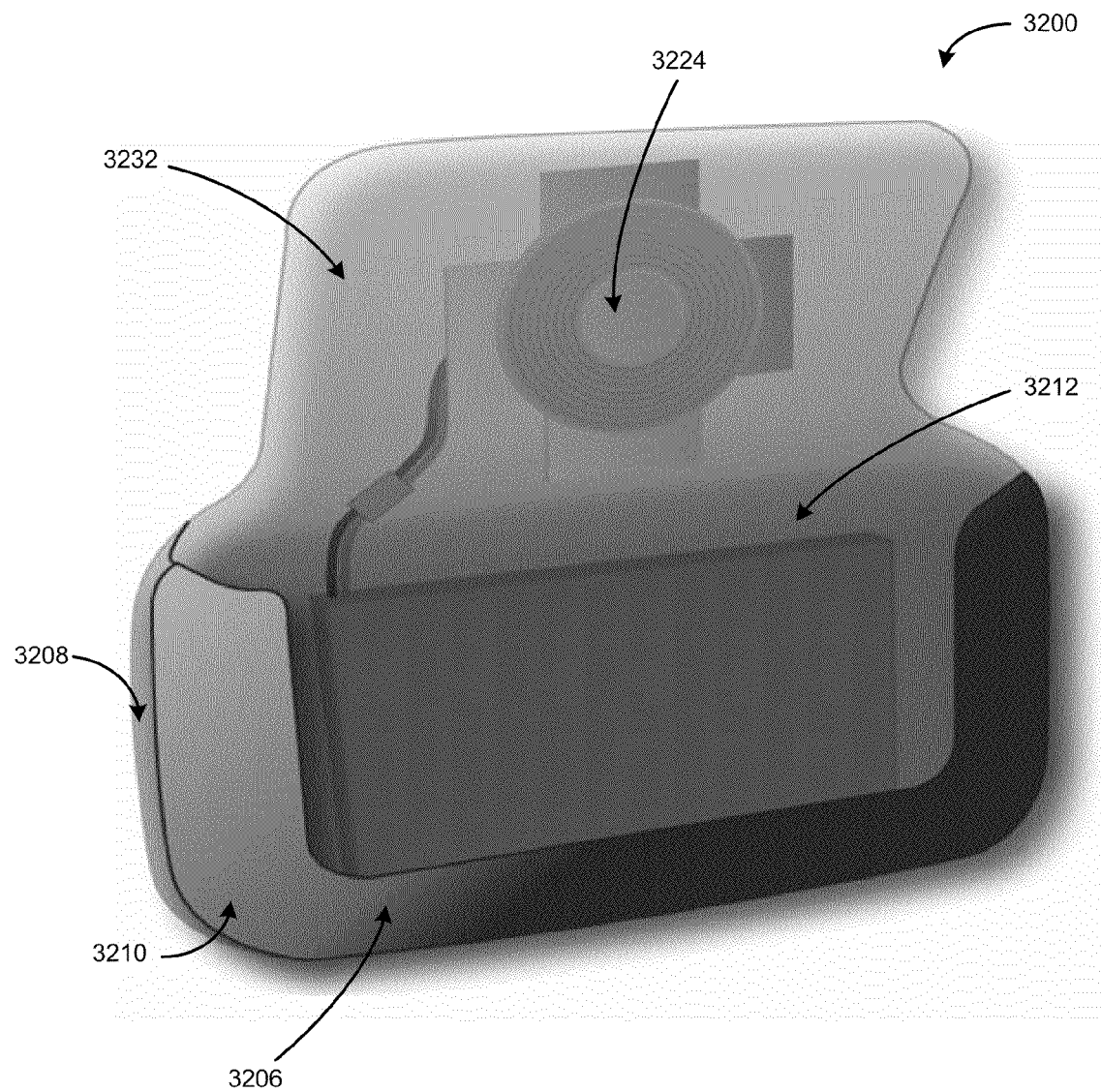
FIG. 32 is a front isometric view of a power supply device with an inductive signal interface, in an embodiment.

FIG. 32 is a front isometric view of a power supply device with an inductive signal interface, in accordance with one or more embodiments. A power supply device 3200 may include a flap construction similar to that described with an embodiment of FIG. 28A through FIG. 28C. Accordingly, power supply device 3200 includes a carriage 3210 including opening 3212 that receives an MCD 2850 (not shown in FIG. 32). The carriage 3210 includes a front façade 3206 and an exterior rear façade 3208. A flap structure 3232 extends from the rear façade 3208 and can extend over the opening 3212. An inductive signal interface 3224 is integrated or embedded in the interior surface of the flap structure 3232, so that when the MCD is inserted, the flap structure 3232 can be positioned on the inductive signal interface of the MCD 2850.

Figure 33:
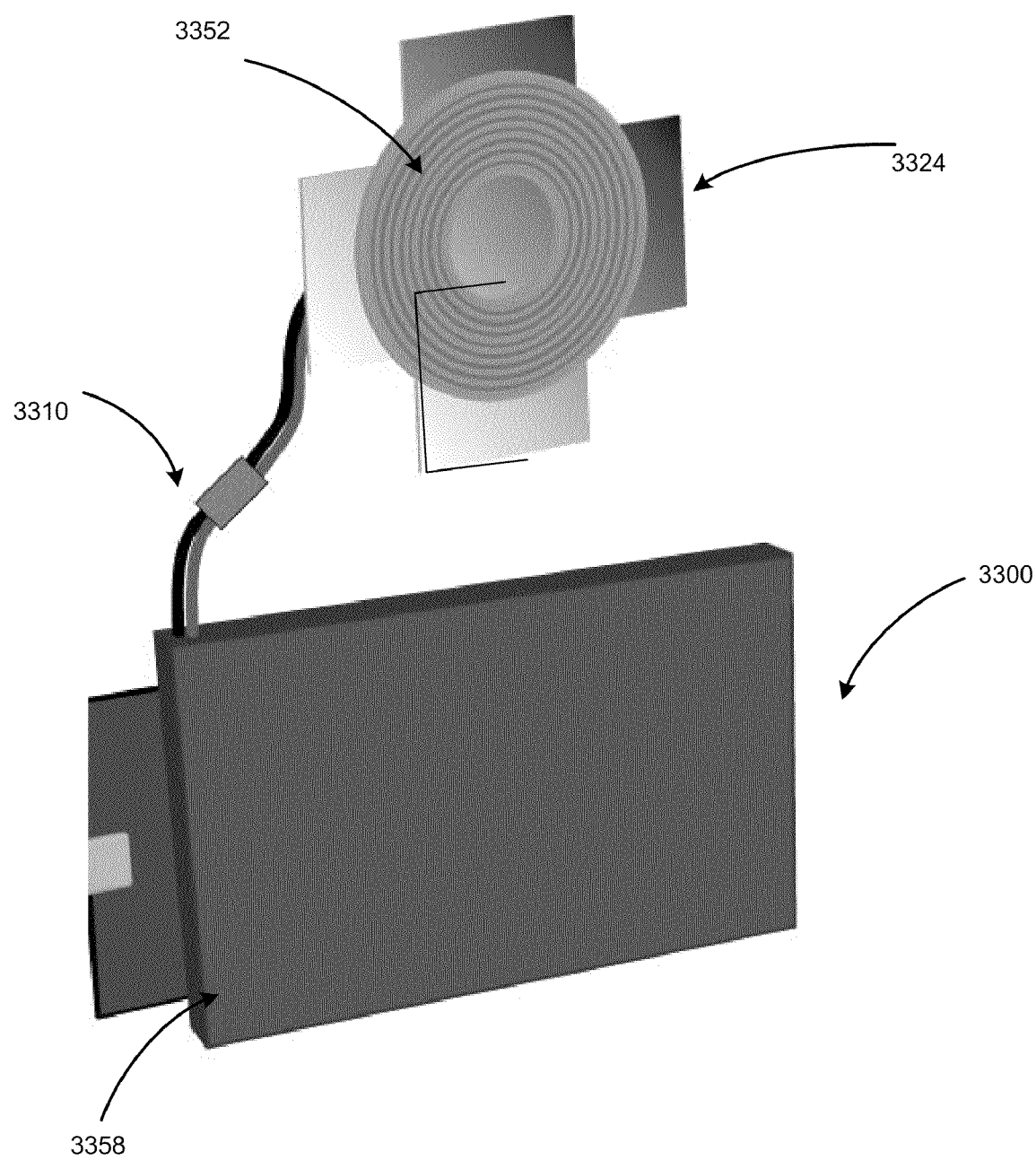
FIG. 33 is an isolated view of components that include the inductive signal interface, in an embodiment.

FIG. 33 is an isolated view of components that include an inductive signal interface, such as shown or used by an embodiment of FIG. 32. The inductive signal interface 3324 may include one or more coils 3352. A separate structure 3300 may carry circuit elements, logic and processor(s) or resources for (i) enabling inductive data/power transfer with a compatible device, and/or (ii) receiving incoming power via a power input interface 3358 to an external power source. The structure 3300 may also include rechargeable batteries for the power supply device. The rechargeable batteries may dispense power from the power supply device to the MCD when the MCD is engaged with the power supply device, although the reverse path (dispensing power from the MCD to the rechargeable batteries) is also possible. A flex cable 3310 enables structure 3300 to be separate from the one or more coils 3352 of the inductive signal interface 3324. This may enhance or facilitate optimization parameters of the carriage 3210 (FIG. 32), in that the one or more coils 3352 may be integrated or embedded with the flap structure 3232 (FIG. 32).

Figure 34A:
FIG. 34A illustrates a front view of a carriage for a power supply device, under an embodiment.
Figure 34B:
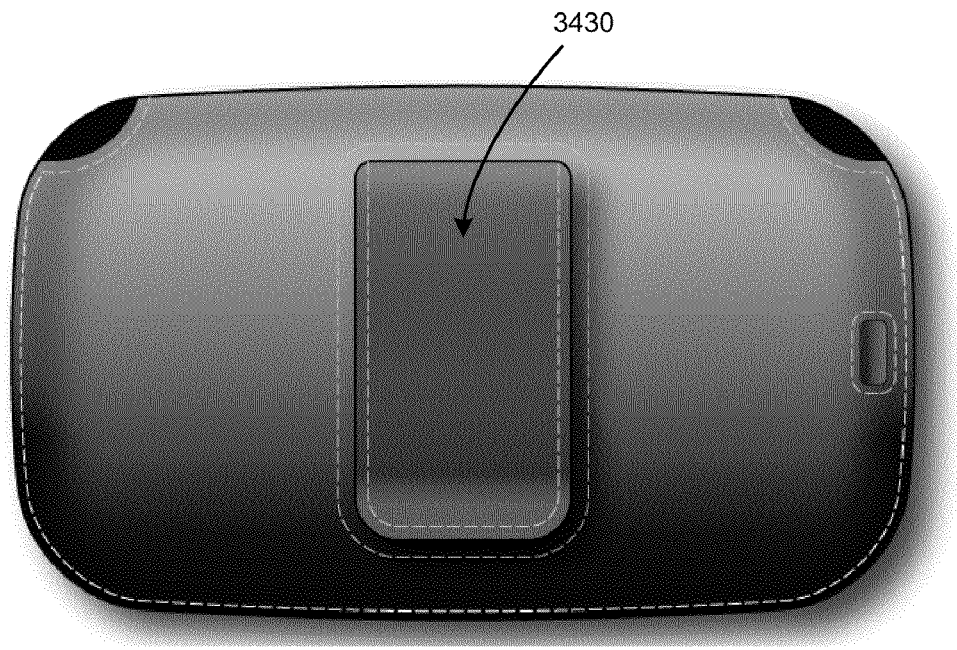
FIG. 34B illustrates a back view of the carriage for the power supply device of FIG. 34B.

FIG. 34A and FIG. 34B are respective front and rear views of a carriage for a power supply device, in accordance with one or more embodiments. A carriage 3410, such as shown, may be combined with an inductive signal interface and/or associated circuits/elements (such as shown by FIG. 33) in order to form the power supply device. As shown in FIG. 34A, the carriage 3410 may include a form-factor that accommodates an MCD. In one embodiment, the carriage 3410, including the carriage flap structure 3420, can be formed from material such as plastic, cloth, or leather. As shown by FIG. 34B, the carriage 3410 can also include carry-on features 3430. In this example, the carry-on features 3430 is in the form of a belt clip.

Coil Orientation

Embodiments recognize that in many cases, some handedness may be associated with the placement of coils that comprise the inductive signal interface of the device being holstered (or inserted into the carriage of the power supply device). For example, the coil of the MCD may be positioned on an upper portion of the MCD's rear façade. If the power supply device holsters the MCD in a sideways fashion, the inductive signal interface of the MCD can be oriented on the left or the right, depending on how the user inserts the MCD into the holster (i.e., inserted into the carriage of the power supply device). Likewise, if the power supply device holsters the MCD in longitudinal fashion, the inductive signal interface of the MCD can be positioned on either a top or bottom segment of the holster, depending on the orientation of the MSD when the user inserts it.

Accordingly, embodiments recognize that the inductive signal interfaces of the respective MSD and power supply device may not align unless provisions are in place to ensure alignment takes place.

In some embodiments, an opening of the carriage is polarized so that the MSD can only be inserted in a particular orientation. The polarized opening may restrict insertion of the MSD. For example, the polarized opening may restrict insertion to one alignment that specifies whether the MSD faces outward or inward, and whether its top is oriented leftward or downward (depending on whether the opening requires sideways or longitudinal placement).

Figure 35A:
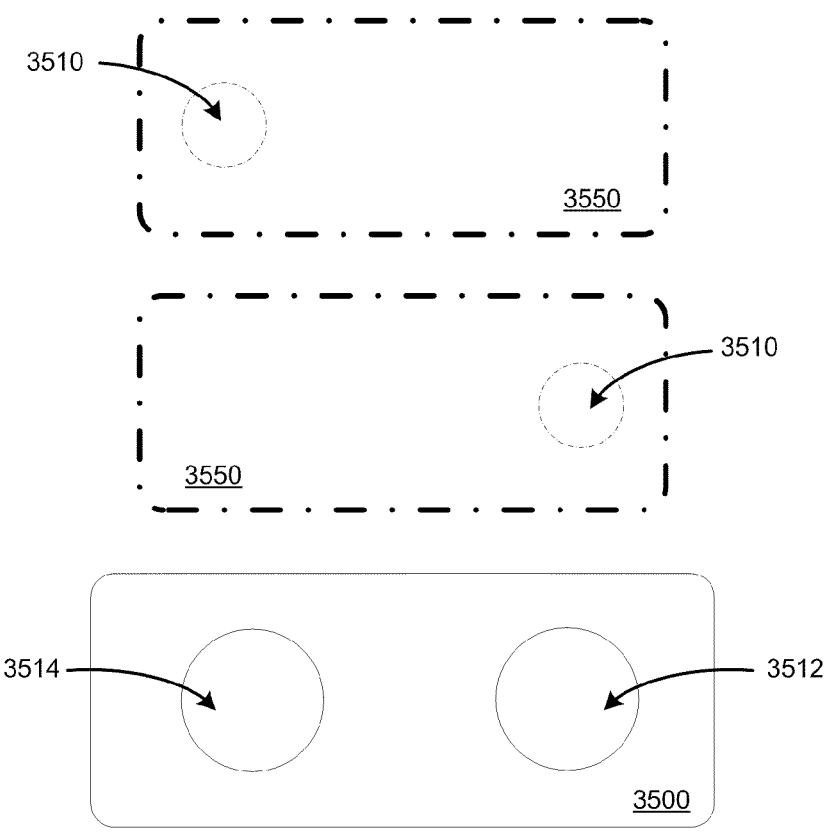
FIG. 35A illustrates alternative orientations of a mobile computing device that can be inserted into a power supply device, in an embodiment.

As an addition or alternative, the power supply device includes a coil configuration that enables the MCD to be inserted in more than one orientation. FIG. 35A illustrates alternative orientations of a MCD 3550 inserted into a power supply device 3500. The power supply device 3500 may include a coil configuration that accommodates the coil 3510 of the MCD 3550, regardless of whether the MCD 3550 is inserted with its top being oriented left-to-right or right-to-left. Specifically, in an embodiment of FIG. 35A, the coil configuration of the power supply device 3500 includes multiple coils 3512, 3514 positioned to engage the coil 3510 of the MCD 3550 regardless of the orientation in which the MCD 3550 is inserted.

Figure 35B:
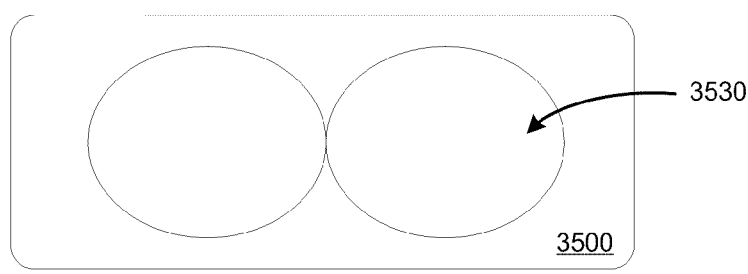
FIG. 35B illustrates an alternative coil configuration for a power supply device, under an embodiment.

FIG. 35B illustrates an alternative coil configuration for power supply device 3500, under another embodiment. In FIG. 35B, the power supply device 3500 includes a "figure 8" arrangement of coils 3530. Each coil of the "figure 8" arrangement is positioned to meet the coil 3512 of the MCD 3550, so that the MCD 3550 can be inserted in either sideway orientation (left-to-right or right-to-left).

Figure 35C:
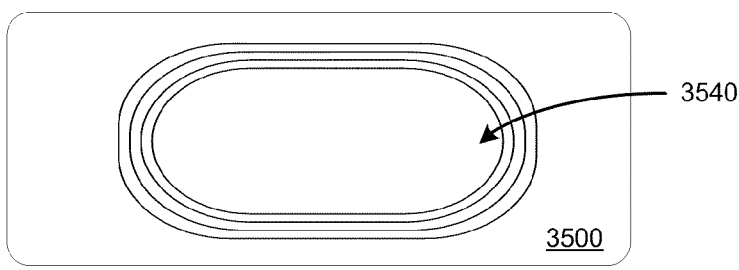
FIG. 35C illustrates another embodiment of a coil configuration for a power supply device.

Still further, FIG. 35C illustrates another embodiment in which the coil configuration of the power supply device 3500 is a single coil 3540 having an oblong shape that extends to positions for engaging the coil 3512 of the MCD 3550 in either of the insertion directions. In the configuration shown by FIG. 35B, the coil 3540 has a racetrack orientation (rectangular center, rounded ends).

Accessory Functionality and Enhancements

Figure 37:
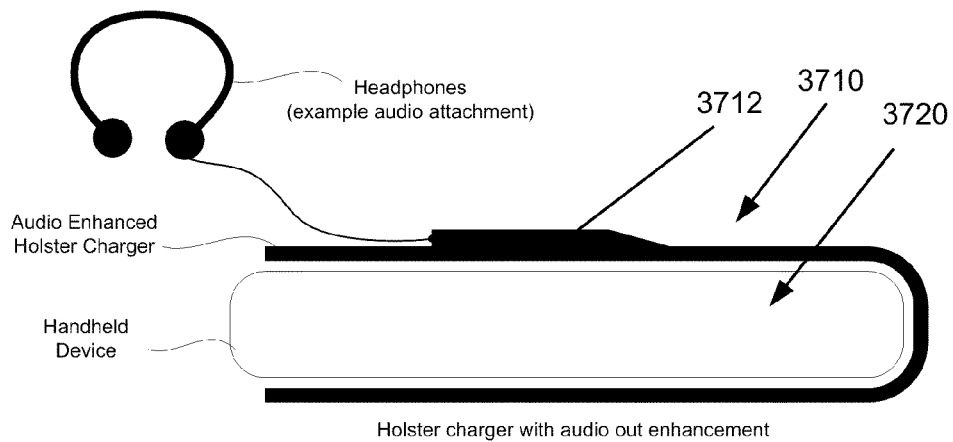
FIG. 37 illustrates a power supply device that integrates hardware and logic functionality to enable performance of functions in connection with use of a mobile computing device, according to one or more embodiments.

In addition to supplying power, embodiments provide that a power supply device, as described with numerous embodiments, may include hardware and/or logic to integrate additional functionality to enhance the usability of the MCD that it is to carry. With reference to FIG. 37, power supply device 3710 retains MCD 3720. The power supply device 3710 includes hardware features 3712 that enable the power supply device to enhance the overall functionality of the MCD 3720. In the example show, the hardware features 3712 correspond to audio output jacks or speakers for enabling audio to be output to the user. The source of the audio may originate from the MCD 3720 via an inductive data connection, a wireless radio-frequency (e.g. Bluetooth) connector, wireline connector (e.g. plug-now shown), radio receiver independent of MCD 3720, or from memory (not shown) integrated into the power supply device. Other examples of functionality that can be provided from the power supply device, include: (i) Global Positioning System functionality (e.g. the power source device may carry hardware for receiving GPS signal (e.g. GPS receiver and communicate the data to the MCD 3720; (ii) data storage device (e.g. mass storage device) to hold data captured or used on the MCD 3720. As with the other examples, data between the power supply device and the MCD can be communicated using one or more of an inductive data connection, a wireless radio-frequency (e.g. Bluetooth) connector, or a wireline connector.

Although illustrative embodiments have been described in detail herein with reference to the accompanying drawings, variations to specific embodiments and details are encompassed herein. It is intended that the scope of the invention is defined by the following claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

We claim:

1. A portable power supply device for a mobile computing device, the portable power supply device comprising:
   a retention structure to retain the mobile computing device;
   a power source; and
   an inductive signal interface to inductively signal at least power from the power source to a corresponding inductive signal interface of the mobile computing device,
      wherein the retention structure comprises a carriage to retain the mobile computing device in sufficient proximity to the inductive signal interface to enable an inductive link to be formed between the portable power supply device and the mobile computing device,
      wherein the carriage comprises a pocket structure to retain the mobile computing device, the pocket structure including an opening to receive the mobile computing device, and
      wherein the carriage further comprises a flap that extends from or near the opening, and wherein the flap includes one or more coils that comprise at least a portion of the inductive signal interface.

2. The portable power supply device of claim 1, wherein the flap is extendable over the opening to position the one or more coils adjacent to a façade of the mobile computing device that houses one or more coils of the corresponding inductive signal interface.

3. The portable power supply device of claim 2, wherein the flap (i) extends from a back wall of the pocket structure, and (ii) is extendable over the opening to position the one or more coils adjacent to the façade of the mobile computing device.

4. The portable power supply device of claim 2, wherein the flap (i) extends from a back wall of the pocket structure, and (ii) is insertable inward into the opening to position the one or more coils adjacent to the façade of the mobile computing device.

5. The portable power supply device of claim 1, wherein the flap is extendable over the opening to at least partially enclose the mobile computing device.

6. The portable power supply device of claim 1, wherein the one or more coils are circular or oblong.

7. The portable power supply device of claim 1, wherein the one or more coils have a racetrack shape.

8. The portable power supply device of claim 1, further comprising one or more personal attachment mechanisms to enable the portable power supply device to be holstered.

9. The portable power supply device of claim 1, wherein the portable power supply device includes logic to implement a power supply protocol to supply power to the mobile computing device based on a power supply need of the mobile computing device.

10. The portable power supply device of claim 9, wherein the inductive signal interface is to exchange data, including to receive data that indicates a power requirement of the mobile computing device.

11. The portable power supply device of claim 9, further comprising logic that operates with the inductive signal interface to inductively transmit data that can be used by the mobile computing device to at least one of authenticate and enumerate the portable power supply device.

12. The portable power supply device of claim 9, further comprising logic that operates with the inductive signal interface to inductively receive data from the mobile computing device, the logic using the inductively received data to at least one of authenticate and process enumeration information from the mobile computing device.

13. A power supply comprising:
a power source;
an inductive signal interface to inductively signal power from the power source to a mobile device having a corresponding inductive signal interface; and
a receiving surface to receive the mobile device,
wherein the power supply is to sense the orientation of the mobile device with respect to the receiving surface and communicate information regarding the orientation of the mobile device with respect to the receiving surface to the mobile device; and
wherein the mobile device is to conduct orientation-dependent functionality based at least in part on the information regarding the orientation of the mobile device with respect to the receiving surface received from the power supply.

14. The power supply of claim 13, further comprising at least one magnet to retain the mobile device on the receiving surface.

15. The power supply of claim 13, further comprising at least one sensor to sense the orientation of the mobile device with respect to the receiving surface.

16. The power supply of claim 13, wherein the power supply is to determine a device to connect to based at least in part on the orientation of the mobile device with respect to the receiving surface.

17. The power supply of claim 13, wherein the power supply comprises one or more of a speaker, an antenna, and a storage medium.

18. The power supply of claim 13, wherein the orientation-dependent functionality comprises at least one of adjusting an audio setting of the mobile device, adjusting a display setting of the mobile device, and adjusting a mode of the mobile device.

19. The power supply of claim 13, wherein the power supply is to conduct functionality based at least in part on the orientation of the mobile device with respect to the receiving surface.

20. A power supply comprising:
a power source;
an inductive signal interface to inductively signal power from the power source to a mobile device having a corresponding inductive signal interface; and
a receiving surface to receive the mobile device when the device is placed on the power supply,
wherein the power supply is to receive the mobile device in more than one orientation on the receiving surface and enable the mobile device to detect the orientation of the mobile device on the receiving surface and initiate orientation-dependent functionality, and
wherein the power supply is to receive information regarding the orientation of the mobile device on the receiving surface from the mobile device.

21. The power supply of claim 20, wherein the orientation-dependent functionality comprises adjusting an audio setting of the mobile device based on the orientation of the mobile device with respect to the power supply.

22. The power supply of claim 20, wherein the orientation-dependent functionality comprises adjusting a display setting of the mobile device based on the orientation of the mobile device with respect to the power supply.

23. The power supply of claim 20, wherein the orientation-dependent functionality comprises adjusting a mode of the mobile device based on the orientation of the mobile device with respect to the power supply.

24. The power supply of claim 20, wherein the inductive signal interface is further to inductively signal data between the power supply and the mobile device.

25. The power supply of claim 20, wherein the power source comprises a rechargeable battery module.

26. The power supply of claim 20, further comprising a coupling mechanism to detachably secure the mobile device to the receiving surface.

27. The power supply device 26, wherein the coupling mechanism comprises one or more magnets to magnetically couple with a magnetically attractive material of the mobile device.

28. A portable power supply device for a mobile computing device, the portable power supply device comprising:
a retention structure to retain the mobile computing device;
a power source comprising a rechargeable battery module;
a power input interface to receive power from an external source and to charge the rechargeable battery module; and
an inductive signal interface to inductively signal at least power from the power source to a corresponding inductive signal interface of the mobile computing device,
wherein the retention structure comprises a carriage, and
wherein the power input interface includes logic and circuits to charge the mobile computing device when power is received from the external source while the mobile computing device is operatively received in the carriage, and wherein the logic is configured to prioritize charging the mobile computing device over the rechargeable battery module of the power supply device when power is received from the external source while the mobile computing device is operatively received in the carriage.

29. The portable power supply device of claim 28, wherein the logic is to prioritize charging the mobile computing device over the rechargeable battery module of the power supply device by charging the mobile computing device to a designated threshold before initiating charging of the rechargeable battery module of the power supply device.

30. The portable power supply device of claim 28, wherein the inductive signal interface is further to inductively signal data to the mobile computing device.

* * * * *